US010531542B2

(12) United States Patent
Rodinger et al.

(10) Patent No.: US 10,531,542 B2
(45) Date of Patent: Jan. 7, 2020

(54) SYSTEMS AND METHODS FOR CONNECTING AND CONTROLLING CONFIGURABLE LIGHTING UNITS

(71) Applicant: Nanogrid Limited, Sheung Wan (CN)

(72) Inventors: Tomas Rodinger, Vancouver (CA); Aliakbar Juzer Eski, Mississauga (CA); Henry Chow, Toronto (CA); Arash Sadr, Toronto (CA); John Anders Ohrn, Vancouver (CA); Gimmy Chu, Mississauga (CA)

(73) Assignee: NANOGRID LIMITED, Sheung Wan (HK)

( * ) Notice: Subject to any disclaimer, the term of this patent is extended or adjusted under 35 U.S.C. 154(b) by 0 days.

(21) Appl. No.: 16/095,637

(22) PCT Filed: Apr. 21, 2017

(86) PCT No.: PCT/CA2017/050500
§ 371 (c)(1),
(2) Date: Oct. 22, 2018

(87) PCT Pub. No.: WO2017/181291
PCT Pub. Date: Oct. 26, 2017

(65) Prior Publication Data
US 2019/0132928 A1 May 2, 2019

Related U.S. Application Data

(60) Provisional application No. 62/441,720, filed on Jan. 3, 2017, provisional application No. 62/359,068, filed
(Continued)

(51) Int. Cl.
*H05B 37/02* (2006.01)
*F21S 2/00* (2016.01)
(Continued)

(52) U.S. Cl.
CPC .......... *H05B 37/0254* (2013.01); *F21S 2/005* (2013.01); *F21V 21/005* (2013.01);
(Continued)

(58) Field of Classification Search
CPC .............. F21Y 2115/10; F21Y 2113/13; F21Y 2105/00; F21Y 2115/15; F21Y 2113/00;
(Continued)

(56) References Cited

U.S. PATENT DOCUMENTS 7,824,073 B2 * 11/2010 Hsieh ...................... F21S 2/005
362/249.02
8,974,085 B2 * 3/2015 Loraing ................. F21S 2/005
362/249.14
(Continued)

OTHER PUBLICATIONS

Extended European Search Report for European Patent Application No. 17785213.4 dated Nov. 12, 2019, 8 pages.

*Primary Examiner* — Vibol Tan
(74) *Attorney, Agent, or Firm* — Norton Rose Fulbright US LLP

(57) ABSTRACT

In some embodiments, a configurable lighting device, connectors, controllers, and methods for layout detection are provided. The configurable lighting devices, suitably connected, form an assembly of configurable lighting devices that can be removably connected with one another and re-arranged. Connectors are provided that form mechanical and electrical connections between configurable lighting devices such that a flow of electricity and control signals may be propagated without the need for direct connection between every configurable lighting device and a controller. The controller or devices connected to the controller are configured to perform layout detection such that pleasing visualizations may be rendered across the assembly that are rendered using at least the detected layout. When the configuration of the configurable lighting devices changes, the layout detection is automatically updated.

19 Claims, 34 Drawing Sheets

Related U.S. Application Data on Jul. 6, 2016, provisional application No. 62/326,484, filed on Apr. 22, 2016.

(51) Int. Cl.

| | |
|---|---|
| *H05B 33/08* | (2006.01) |
| *F21V 21/005* | (2006.01) |
| *F21V 23/06* | (2006.01) |
| *F21Y 113/00* | (2016.01) |
| *F21Y 115/10* | (2016.01) |
| *F21Y 113/10* | (2016.01) |
| *F21Y 105/18* | (2016.01) |

(52) U.S. Cl.
CPC ......... *F21V 23/06* (2013.01); *H05B 33/0842* (2013.01); *F21Y 2105/18* (2016.08); *F21Y 2113/00* (2013.01); *F21Y 2113/10* (2016.08); *F21Y 2115/10* (2016.08)

(58) Field of Classification Search
CPC .. F21Y 2105/10; F21Y 2105/18; F21S 2/005; F21S 2/00; F21S 4/22; F21V 23/06; F21V 23/002; F21V 21/002; F21V 21/096; F21V 23/003; F21V 15/01; F21V 19/001; H05K 2201/10106; F21K 9/20; H05B 33/0842; H05B 33/0863; H05B 33/0803; H05B 37/036; H01L 2251/5338; H01L 2251/5361

See application file for complete search history.

(56) References Cited

U.S. PATENT DOCUMENTS

| | | | |
|---|---|---|---|
| 9,521,713 B2* | 12/2016 | Niebert | F21S 2/005 |
| 10,047,940 B2* | 8/2018 | Grunzweig | A63H 33/046 |
| 2002/0044066 A1* | 4/2002 | Dowling | A63J 17/00 |
| | | | 340/815.46 |
| 2007/0150702 A1* | 6/2007 | Verheyen | G06F 15/7832 |
| | | | 712/34 |
| 2012/0224373 A1 | 9/2012 | Snijder et al. | |
| 2012/0287627 A1* | 11/2012 | Campbell | F21V 29/004 |
| | | | 362/235 |
| 2013/0250569 A1* | 9/2013 | Campbell | F21V 29/004 |
| | | | 362/231 |
| 2013/0322082 A1* | 12/2013 | Hollander | F21S 2/005 |
| | | | 362/249.02 |

\* cited by examiner

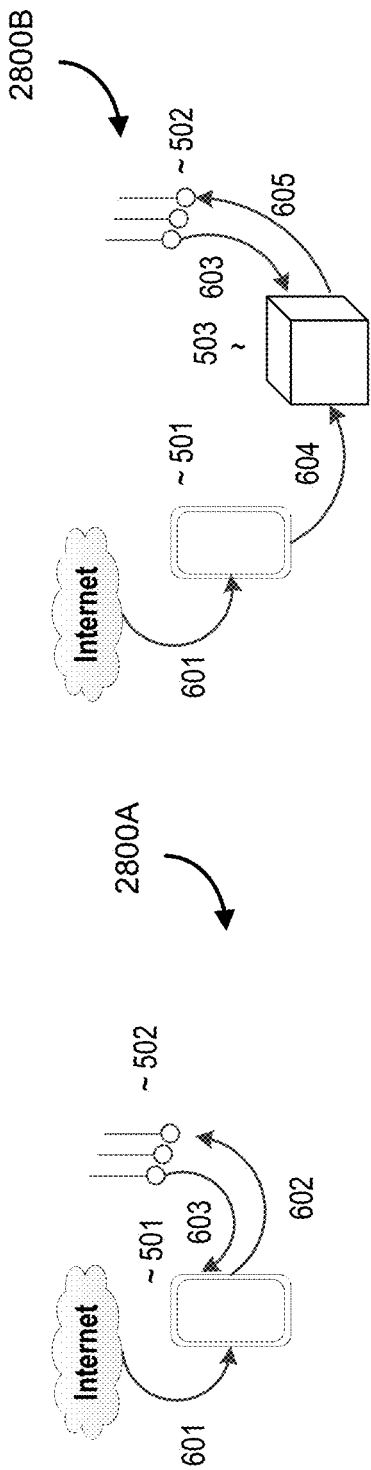
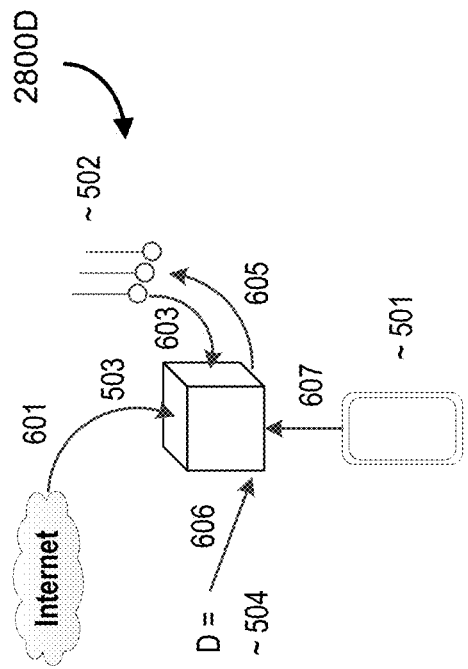
FIG. 28A
FIG. 28B
FIG. 28C
FIG. 28D

SYSTEMS AND METHODS FOR CONNECTING AND CONTROLLING CONFIGURABLE LIGHTING UNITS

FIELD

The present disclosure generally relates to the field of illumination, and more particularly, to features associated with configurable illumination devices including connectors for connecting the illumination devices, layout detection, and visualizations based on external stimuli.

INTRODUCTION

Light emitting structures are desirable, including those that may be configured in a variety of shapes and forms. A luminaire is a device for lighting, which has at least of a source of light, electrical and mechanical components to operate the source and distribute the generated light, as well as components to manage the heat it all generates.

Lighting design is a part of architecture and interior design that teaches how to place different types of luminaires in rooms or spaces in general such that the lighting as a whole best serves the purpose of the space.

The light-emitting diode (LED) technology enables new ways to make and design light. For example, LEDs can be created to emit specific colors of light, such as red, blue, green, amber. By mixing these base colors to varying degrees, luminaires can be built that create light of different warmth, that enhance the shine and spark of colorful artwork or clothing, or that interact with the human visual system in ways that are adapted to time of day, or to the specific health needs of the user.

At a microscopic level, LEDs are a form of semiconductor. Therefore, they can integrate with other microelectronics, such as digital microprocessors that can execute software instructions. Consequently, luminaires that use LEDs can be controlled to a very detailed degree via internal and external logic commands. Finally, LEDs are small solid-state components. They can be fitted into structures and the luminaire can be designed in new shapes and forms.

SUMMARY

In an aspect, there is provided a lighting system including an assembly formed by a plurality of configurable lighting units remove-ably coupled together using one or more connectors, the plurality of configurable lighting units forming one or more continuous shapes that are reconfigurable through re-arrangement of the plurality of configurable lighting units; each configurable lighting unit of the one or more configurable lighting units having one or more connectable subsections including at least an aperture for receiving a corresponding connector of the one or more connectors; each connector of the one or more connectors insertable into a first aperture of a first configurable lighting unit and a second aperture of a second configurable lighting unit, the connector including: one or more mechanical connections that cooperate with structural characteristics of the first aperture or the second aperture such that the first configurable lighting unit and the second configurable lighting unit, and one or more electrical connections enabling a flow of electricity between the first configurable lighting unit and the second configurable lighting unit; and a power source connectable to a configurable lighting unit of the assembly, the plurality of configurable lighting units electrically coupled together through the one or more connectors such that no more than one configurable lighting unit is required to be connected to the power source when powering every configurable lighting unit of the plurality of configurable lighting units.

In another aspect, at least one connector of the one or more connectors includes circuitry for enabling data transmission between the two or more configurable lighting units.

In another aspect, the one or more mechanical connections are formed by frictional engagement of the connector with either the first aperture or the second aperture, the structural characteristics resisting shearing movement of the connector and permitting movement along an insertion axis that is perpendicular to the shearing movement.

In another aspect, both the first aperture and the second aperture include one or more protrusions adapted to impart a force between the connector and the first aperture and the second aperture, improving the frictional engagement to resist removal of connector from either the first aperture or the second aperture along the insertion axis.

In another aspect, the one or more mechanical connections are configured to resist shear forces with a plane of the connectable subsections up to a threshold of irreversible damage of either the mechanical connection or the corresponding connectable subsection.

In another aspect, the one or more mechanical connections are each configured to, responsive to a separating force perpendicular to the plane of the connectable subsections greater than a resistive force formed by cooperation of the one or more mechanical connections with the structural characteristics of the first aperture or the second aperture, permit reversible separation of the two or more connected configurable lighting units by a user.

In another aspect, the data transmission includes a signal that instructs one or more of the lighting units in the assembly to change one or more drive currents to one or more light-emitting diodes of the one or more configurable lighting units.

In another aspect, the data transmission includes a signal that encodes audio retrieved by a transducer.

In another aspect, the data transmission includes a signal that encodes for motion detection by perturbation to an expected radiation pattern.

In another aspect, the one or more mechanical connections are actuated by an attractive magnetic force that pulls a rigid body from a first configurable lighting unit into an aperture of a second configurable lighting unit, the one or more mechanical connections in combination with the attractive magnetic force providing the stable physical coupling between the two or more configurable lighting units.

In another aspect, the rigid body is held inside the first lighting unit by a spring when zero or below designed threshold magnetic force is acting on the rigid body.

In another aspect, the actuation establishes the one or more electrical connections by coupling of two or more conductive materials, the two or more conductive materials permitting the flow of electricity between the two or more configurable lighting units.

In another aspect, the actuation establishes a connection for data transmission by the joining of two or more conductive materials.

In another aspect, the one or more mechanical connections are formed by magnetic attraction between one or more magnets that are configured to move between discrete compartments within each configurable lighting unit, and the one or more magnets exerting magnetic force through each configurable lighting unit being formed of a material of magnetic permeability nearly identical to air such that an attractive force is formed between two or more configurable lighting units in near proximity to each other.

In another aspect, the one or more configurable lighting units are manufactured to include at least one of plastic, copper, wood, and aluminum.

In another aspect, the one or more mechanical connections are formed by way of insertion of a secondary component of material into two female connectors at the connectable subsections of the first configurable lighting unit and the second configurable lighting unit; and the secondary component includes a compressible component that, upon joining, provides a constraining force to resist a separating force.

In another aspect, the secondary component is a printable circuit board that, in addition to providing the one or more mechanical connections, further provides the one or more electrical connections and one or more data connection between the two or more configurable lighting units.

In another aspect, the compressible component includes bent sheet metal that, upon compression, elastically deforms such that the compressible component locks into a compatible indentation part of the corresponding aperture of the corresponding configurable lighting unit.

In another aspect, each configurable lighting unit is a substantially flat surface of a transparent or semitransparent material shaped as a polygon; and wherein each side of the polygon are flat subsections that form the two or more connectable subsections.

In another aspect, the polygon is an equilateral triangle.

In another aspect, the transparent or semitransparent material is polymethyl methacrylate or polycarbonate.

In another aspect, light is injected into the substantially flat surface by a plurality of light-emitting diodes; and the light is diffused throughout the material of the flat surface by scattering; and a subset of the scattering events causes the light to exit the substantially flat surface into an environment.

In another aspect, the scattering is caused by an addition of microscopic surface imperfection on the substantially flat surface of each configurable lighting unit.

In another aspect, the plurality of light-emitting diodes includes light-emitting diodes that generate light of different colors.

In another aspect, the polygon is a rectangle.

In another aspect, each connector is configured to further include circuitry to sequentially propagate electricity flow and control signals between sets of coupled configurable lighting units.

In another aspect, the sequential propagation of the electricity flow and the control signals is utilized to transmit control signals to and from a controller, the controller being directly coupled to only one of the configurable lighting units.

In another aspect, the sequential propagation of the electricity flow and the control signals is utilized to transmit electricity from a controller housing the power source, the controller being directly coupled to only one of the configurable lighting units.

In another aspect, the controller further comprises a visualization unit configured for generating control signals including lighting characteristic instructions for rendering one or more visualization effects across the assembly, the one or more visualization effects based at least on a detected layout of the assembly, and the control signals, upon propagation to the each configurable lighting unit, causing each configurable lighting unit to modify one or more characteristics of illumination provided by the corresponding configurable lighting unit.

In another aspect, the controller includes one or more interactive physical elements which, upon actuation, initiate or modify the rendering of the one or more visualization effects.

In another aspect, the controller includes a networking interface, the networking interface coupled to one or more remote computing systems; and wherein upon receiving one or more electronic instructions from the networking interface, the controller initiates or modifies the rendering of the one or more visualization effects.

In another aspect, there is provided a method for layout detection performed by a controller coupled to an assembly of configurable lighting units, the method comprising: deriving an array of integers based on data indicative of coupling characteristics between individual configurable the assembly through a set of one or more physical connections, such that any two potential assemblies that are geometrically distinct apart from of translation or rigid-body rotation generates distinct arrays of integers, and such that any two potential assemblies that are geometrically indistinct following translation or rigid-body rotation, generates identical arrays of integers; storing the array of integers in a data structure encapsulated in non-transitory computer readable media residing on or in communication with the controller.

In another aspect, the data on how the individual configurable lighting units are coupled is provided as an array of pairs of indices that indicate (i) which two configurable lighting units in the assembly that are joined together and by which side of the corresponding configurable lighting units they join, where the portion of the index that denotes the configurable lighting unit is unique within the assembly, and where the portion of the index that denotes the side of the configurable lighting unit is ordered in a manner such that the order is inverted upon a mirror transformation in a plane orthogonal to the plane of the configurable lighting unit.

In another aspect, the ordering of the portion of the index that denotes the side of the lighting unit is a gradual increase of the index as neighboring sides are traversed in a clockwise manner, up until all sides have been traversed.

In another aspect, the manner of ordering the portion of the index that denotes the side of the lighting unit is a gradual increase of the index as neighboring sides are traversed in a counterclockwise manner, up until all sides have been traversed.

In another aspect, the array of pairs of indices is represented as a matrix.

In another aspect, the index that denotes the configurable lighting unit within the assembly is assigned during manufacturing and stored in the non-transitory computer readable media.

In another aspect, the index that denotes the configurable lighting unit within the assembly is assigned as part of an logical initialization process of the assembly and stored in either non-volatile or volatile computer readable memories.

In another aspect, the portion of the index that denotes the side of the configurable lighting unit that is joined to another lighting unit is communicated across the physical connection as a set voltage that is mapped to an ordered index through one or more logical rules executed on a processor.

In another aspect, the portion of the index that denotes the side of the configurable lighting unit that is joined to another configurable lighting unit is communicated across a physical connection of the set of the one or more physical connections as a data string that is mapped to an ordered index through one or more logical rules executed on a processor.

In another aspect, the array of integers is updated in real or near-real time as one or more new configurable lighting units are added to the assembly or as one or more configurable lighting units are removed from the assembly.

In another aspect, the updating of the array of integers is triggered by polling the one or more connections of the assembly to discover that the one or more connections have changed from a previous polling instance.

In another aspect, the updating of the array of integers is triggered by an interrupt signal communicated from a specific connection point that is altered by the addition or the removal of a configurable lighting unit.

In another aspect, each of the physical connections is formed by one or more bridging sections of one or more printed circuit boards that is adapted to transfer data between different configurable lighting units in the assembly.

In another aspect, each of the physical connections is formed by one or more rigid bodies inserted from a first configurable lighting unit into an aperture of a second configurable lighting unit, each of rigid body forming at least one contact that conducts electricity for data transfer between the first configurable lighting unit and the second configurable lighting unit.

In another aspect, the array of integers is transferred wirelessly to a device with a display interface screen; and the array of integers is inversely translated to coordinates for the graphical representation on the screen or a projection of the individual configurable lighting units in the assembly, where the graphical representation is geometrically identical to the assembly, excluding translations, scaling and rigid-body rotation.

In another aspect, the wireless transmission is performed across a Wi-Fi protocol.

In another aspect, responsive to the addition of the configurable lighting unit to the assembly, a new interrupt signal is generated by the added configurable lighting unit and propagated to the controller through a subset of the set of the one or more physical connections, the subset forming a communication path from the added configurable lighting unit to the controller.

In another aspect, responsive to the removal of the configurable lighting unit to the assembly, a new interrupt signal is generated by a configurable lighting unit previously coupled to the removed configurable lighting unit and propagated to the controller through a subset of the set of the one or more physical connections, the subset forming a communication path from the configurable lighting unit previously coupled to the removed configurable lighting unit to the controller.

In another aspect, the display interface screen includes one or more interactive visual elements, which when interacted with, cause the controller to generate control signals responsive to one or more changes in a visualization being rendered on the assembly by the one or more configurable lighting units in cooperation with one another.

In another aspect, there is provided a lighting device providing a plurality of coupled lighting components automatically controlled in accordance with an audio signal, the lighting device comprising: an audio receiver configured to provide a digital audio representation based at least on the audio signal; the plurality of coupled lighting components coupled in a physical arrangement, each of the plurality of the coupled lighting components being configured to emit individually controllable light, individually controllable in accordance with one or more received lighting activation instructions; a geometry monitoring unit configured to maintain an electronic representation of the physical arrangement based on sensed rearrangements of the physical arrangement or change events occurring in relation to the physical arrangement, the electronic representation including at least linkages indicative of geospatial relations between coupled lighting components of the plurality of coupled lighting components; an audio visualization unit configured to provide a plurality of lighting activation instructions generated in accordance with the digital audio representation, the plurality of lighting activation instructions comprising timed instruction sets representative of at least one of (i) a color coordinate, (ii) an intensity level, and (iii) a desired geometric position of the lighting activation; a geometry association unit configured, for each lighting activation instruction, to select an individual coupled lighting component of the plurality of the coupled lighting components based at least on querying of the electronic representation of the physical arrangement; a lighting controller unit for individually controlling each of the coupled lighting components in accordance with the plurality of lighting activation instructions to cause a geometric visualization effect to be co-operatively displayed across one or more coupled lighting components of the plurality of coupled lighting components.

In another aspect, the lighting device further comprises an audio visualization conversion unit configured for mapping or transforming the plurality of lighting activation instructions into one or more drive current instructions that are included in one or more control signals used to control each of the plurality of coupled lighting components, the one or more drive current instructions being processed by the each of the plurality of coupled lighting components to modify characteristics of the emitted light.

In another aspect, the mapping or transforming is provided through reference to a lookup structure, and the audio visualization conversion unit is further configured to, upon a determination that a mapping or transformation is not represented in the lookup structure, perform an interpolation between at least two nearby color coordinates present in the lookup structure.

In another aspect, the mapping or transforming utilizes a calibration sequence whereby a secondary device is utilized to record an optical spectrum for one or more given drive current settings, the recorded optical spectrum utilized in downstream processing to generate a reference structure for the mapping or the transforming of the plurality of lighting activation instructions into the one or more drive current instructions.

In another aspect, the geometry monitoring unit is further configured to periodically determine a center of geometry of the physical arrangement, the center of geometry being used to assign an individual coupled lighting component as a center device, the assignment of the center device being used by the electronic representation of the physical arrangement as a reference index value to identify coupled lighting components based on a corresponding degree of separation from the center device.

In another aspect, the audio visualization unit is configured to generate path-based lighting activation instructions where the plurality of lighting activation instructions include at least visually representing a geometric pattern that traverses a path through the one or more coupled lighting components.

In another aspect, the physical arrangement is represented in a coordinate system selected from the group of coordinate systems consisting of 2-D Cartesian coordinates, 3-D Cartesian coordinates, polar coordinates, cylindrical coordinates, and spherical coordinates.

In another aspect, the physical arrangement is represented in a connected graph system selected from the group of connected graph systems consisting of an adjacency matrix, an adjacency list, and a distance matrix.

In another aspect, the geometry monitoring unit is further configured to maintain a coordinate dictionary based at least on the connected graph system, the coordinate dictionary queried by the geometry association unit in selecting the individual coupled lighting component.

In another aspect, the coordinate dictionary is modified through input signals received from an interface device.

In another aspect, the coordinate dictionary is emulated and output on a display interface.

In another aspect, the physical arrangement is approximated as an ellipsoid shape determined through at least an evaluation of the covariance of coordinate elements of the plurality of coupled lighting components.

In another aspect, positions of the coupled lighting components are represented through projections onto a major axis of the ellipsoid.

In another aspect, audio visualization unit is further configured to generate a second set of lighting activation instructions adapted for causing lighting transition patterns responsive to determined audio transition patterns extracted from the digital audio representation.

In another aspect, the physical arrangement includes at least global geometry data applied to an assembly formed by the plurality of coupled lighting components.

In another aspect, the audio signal is a mechanical wave received by a transducer, and the digital audio representation is generated by converting the audio signal into a digital format selected from the group of digital formats consisting of WAV, MP3, MPEG, and AIFF.

In another aspect, the plurality of coupled lighting components include at least two lighting components that are wirelessly interconnected.

In another aspect, the plurality of coupled lighting components include at least two lighting components that are physically interconnected.

In another aspect, each coupled lighting component of the plurality of coupled lighting components includes at least a controllable lighting element, and a plurality of physical interconnections for connecting to the one or more coupled lighting components.

In another aspect, the physical arrangement is stored as geometry metadata.

In another aspect, a method for controlling a plurality of coupled lighting components in accordance with an audio signal is provided, the method comprising: providing a digital audio representation based at least on the audio signal; emitting, by the plurality of coupled lighting components, individually controllable light, the coupled lighting components provided in a physical arrangement, each of the plurality of coupled lighting components configured to emit the individually controllable light, and controllable in accordance with one or more received lighting activation instructions; maintaining an electronic representation of the physical arrangement based on sensed rearrangements of or change events occurring in relation to the physical arrangement, the electronic representation including at least linkages indicative of geospatial relations between coupled lighting components; providing a plurality of lighting activation instructions generated in accordance with the digital audio representation, the plurality of lighting activation instructions comprising timed instruction sets representative of at least one of (i) a color coordinate, (ii) an intensity level, and (iii) a desired geometric position of the lighting activation; for each lighting activation instruction, selecting an individual coupled lighting component of the plurality of coupled lighting components based at least on querying the electronic representation of the physical arrangement; individually controlling each of the coupled lighting components in accordance with the lighting activation instructions, the lighting activation instructions, in combination causing a geometric visualization effect to be co-operatively displayed across the one or more coupled lighting components of the plurality of coupled lighting components.

In another aspect, a computer-readable medium is provided including machine readable instructions, the machine readable instructions, when executed by a processor, cause the processor to perform a method for controlling a plurality of coupled lighting components in accordance with an audio signal, the method comprising: providing a digital audio representation based at least on the audio signal; emitting, by the plurality of coupled lighting components, individually controllable light, the coupled lighting components provided in a physical arrangement, each of the plurality of coupled lighting components configured to emit individually controllable light, and controllable in accordance with one or more received lighting activation instructions; maintaining an electronic representation of the physical arrangement based on sensed rearrangements of or change events occurring in relation to the physical arrangement, the electronic representation including at least linkages indicative of geospatial relations between coupled lighting components; providing a plurality of lighting activation instructions generated in accordance with the digital audio representation, the plurality of lighting activation instructions comprising timed instruction sets representative of at least one of (i) a color coordinate, (ii) an intensity level, and (iii) a desired geometric position of the lighting activation; for each lighting activation instruction, selecting an individual coupled lighting component of the plurality of coupled lighting components based at least on querying the electronic representation of the physical arrangement; individually controlling each of the coupled lighting components in accordance with the plurality of lighting activation instructions, the one or more lighting activation instructions in combination causing a geometric visualization effect to be co-operatively displayed across the one or more coupled lighting components of the plurality of coupled lighting components.

In another aspect, there is provided a connector for physically coupling two or more configurable lighting units, each of the two or more two or more configurable lighting units having a corresponding aperture for receiving the connector, the connector comprising: one or more mechanical connections for insertion into the corresponding aperture to provide stable physical coupling between the two or more configurable lighting units for a threshold damage or force level before separation; one or more electrical connections enabling a flow of electricity from a first configurable lighting unit to other configurable lighting units of the two or more configurable lighting units, the first configurable lighting unit directly or indirectly receiving power from a power source; and wherein each configurable lighting unit of an assembly of configurable lighting units is electrically coupled such that such that no more than one configurable lighting unit is required to be connected to the power source when powering the two or more configurable lighting units.

In another aspect, the connector includes circuitry for enabling data transmission between the two or more configurable lighting units.

In another aspect, the data transmission is a digital signal modulation, transmitted as Power Line Communication adapted to operate in cooperation with one or more electrical connections between the coupled two or more configurable lighting units.

In another aspect, the data transmission is a digital signal modulation transmitted over a bidirectional serial pin of the connector, the bidirectional serial pin being physically distinct to the one or more electrical connections.

In another aspect, the data transmission includes a signal that indicates one or more unique identifiers, each unique identifier identifying the connectable subsections of the two or more configurable lighting units at which the coupled two or more configurable lighting units are connected.

In another aspect, the data transmission includes a signal that instructs one or more of the lighting units in the assembly to change one or more drive currents to one or more light-emitting diodes of the coupled two or more configurable lighting units.

In another aspect, the data transmission includes a signal that encodes audio retrieved by a transducer.

In another aspect, the data transmission includes a signal that encodes for motion detection by perturbation to an expected radiation pattern.

In another aspect, the one or more mechanical connections are actuated by an attractive magnetic force that pulls a rigid body from a first configurable lighting unit into an aperture of a second configurable lighting unit, the one or more mechanical connections in combination with the attractive magnetic force providing the stable physical coupling between the coupled two or more configurable lighting units.

In another aspect, the rigid body is held inside the first lighting unit by a spring when zero or below designed threshold magnetic force is acting on the rigid body.

In another aspect, the actuation establishes the one or more electrical connections by coupling of two or more conductive materials, the two or more conductive materials permitting the flow of electricity between the two or more configurable lighting units.

In another aspect, the actuation establishes a connection for data transmission by the joining of two or more conductive materials.

In another aspect, the one or more mechanical connections are formed by magnetic attraction between one or more magnets that are configured to move between discrete compartments within each configurable lighting unit, and the one or more magnets exerting magnetic force through each configurable lighting unit being made of a material of magnetic permeability nearly identical to air such that an attractive force is formed between two or more configurable lighting units in near proximity to each other.

In another aspect, the two or more configurable lighting units are manufactured to have at least one of plastic, copper, wood, and aluminum.

In another aspect, the one or more mechanical connections are formed by way of insertion of a secondary component of material in two female connectors at the connectable subsections of the two or more configurable lighting units to be joined; and the secondary component includes a compressible component that, upon joining, provides a constraining force to resist a separating force.

In another aspect, the secondary component is a printable circuit board that, in addition to providing the one or more mechanical connections, further provides the one or more electrical connections and one or more data connection between the two or more configurable lighting units.

In another aspect, the compressible component includes bent sheet metal that, upon compression, elastically deforms such that the compressible component locks into a compatible indentation part of the corresponding aperture of the corresponding configurable lighting unit.

In another aspect, each configurable lighting unit is a substantially flat surface of a transparent or semitransparent material shaped as a polygon; and wherein each side of the polygon are flat subsections that form the two or more connectable subsections.

In another aspect, the polygon is an equilateral triangle.

In another aspect, the transparent or semitransparent material is polymethyl methacrylate or polycarbonate.

In another aspect, light is injected into the substantially flat surface by a plurality of light-emitting diodes; the light is diffused throughout the material of the flat surface by scattering; and a subset of the scattering events causes the light to exit the substantially flat surface into an environment.

In another aspect, the scattering is caused by an addition of microscopic surface imperfection on the substantially flat surface of each configurable lighting unit.

In another aspect, the plurality of light-emitting diodes includes light-emitting diodes that generate light of different colors.

In another aspect, the polygon is a rectangle.

In another aspect, the connector is configured not only to provide the flow of electricity but to further include circuitry to sequentially propagate electricity flow and control signals between each set of coupled configurable lighting units.

In another aspect, the sequential propagation of the electricity flow and the control signals is utilized to transmit control signals to and from a controller, the controller being directly coupled to only one of the configurable lighting units.

In another aspect, the sequential propagation of the electricity flow and the control signals is utilized to transmit electricity from a controller housing the power source, the controller being directly coupled to only one of the configurable lighting units.

In another aspect, the connector is configured for coupling to the power source.

In accordance with an aspect, there is provided a configurable flat illumination device including: one or more substantially flat light emitting structures, each of the one or more substantially flat light emitting structures configured to provide illumination into an environment.

In accordance with an aspect, there is provided a lighting kit including a plurality of configurable lighting units configured to be remove-ably coupled together using one or more connectors to form one or more continuous shapes that are reconfigurable through re-arrangement of the plurality of configurable lighting units. Each configurable lighting unit of the one or more configurable lighting units having one or more connectable subsections including at least an aperture for receiving a corresponding connector of the one or more connectors. Each connector of the one or more connectors insertable into a first aperture of a first configurable lighting unit and a second aperture of a second configurable lighting unit, the connector including: one or more mechanical connections that cooperate with structural characteristics of the first aperture or the second aperture such that the first configurable lighting unit and the second configurable lighting unit, and one or more electrical connections enabling a flow of electricity between the first configurable lighting unit and the second configurable lighting unit. The plurality of configurable lighting units electrically coupled together through the one or more connectors such that no more than one configurable lighting unit is required to be connected to a power source when powering every configurable lighting unit of the plurality of configurable lighting units, the power source connectable to the one configurable lighting unit of the assembly.

In accordance with an aspect, there is provided a plurality of configurable lighting units configured to be remove-ably coupled together using one or more connectors to form one or more continuous shapes that are reconfigurable through re-arrangement of the plurality of configurable lighting units; each configurable lighting unit of the one or more configurable lighting units having one or more connectable subsections including at least an aperture for receiving a corresponding connector of the one or more connectors; each connector of the one or more connectors insertable into a first aperture of a first configurable lighting unit and a second aperture of a second configurable lighting unit, the plurality of configurable lighting units electrically coupled together through the one or more connectors such that no more than one configurable lighting unit is required to be connected to a power source when powering every configurable lighting unit of the plurality of configurable lighting units, the power source connectable to the one configurable lighting unit of the assembly.

In accordance with an aspect, there is provided a lighting system with an assembly formed by a plurality of configurable lighting units remove-ably coupled together using one or more connectors to form one or more continuous shapes that are reconfigurable through re-arrangement of the plurality of configurable lighting units. Each configurable lighting unit of the one or more configurable lighting units having one or more connectable subsections including at least an aperture for receiving a corresponding connector of the one or more connectors. Each connector of the one or more connectors insertable into a first aperture of a first configurable lighting unit and a second aperture of a second configurable lighting unit. The connector includes one or more mechanical connections that cooperate with structural characteristics of the first aperture or the second aperture to couple the first configurable lighting unit and the second configurable lighting unit, and one or more electrical connections enabling a flow of electricity between the first configurable lighting unit and the second configurable lighting unit, the one or more electrical connections enable a power source only connected to a configurable lighting unit of the assembly to the provide power to the plurality of configurable lighting units of the assembly.

In accordance with an aspect, there is provided a lighting system having a plurality of configurable lighting units remove-ably coupled together using one or more connectors to form one or more continuous shapes that are reconfigurable through re-arrangement of the plurality of configurable lighting units; each configurable lighting unit of the one or more configurable lighting units having one or more connectable subsections for engaging with a corresponding connector of the one or more connectors; each connector of the one or more connectors including: one or more mechanical connections that cooperate with structural characteristics of the connectable subsections to couple the first configurable lighting unit and the second configurable lighting unit; and one or more electrical connections enabling a flow of electricity between the first configurable lighting unit and the second configurable lighting unit.

In accordance with an aspect, there is provided a method for controlling a plurality of coupled lighting components in accordance with an audio signal, the method including: providing a digital audio representation based at least on the audio signal; emitting, by the plurality of coupled lighting components, individually controllable light, the coupled lighting components coupled to generate a continuous shape, each of the plurality of coupled lighting components configured to emit the individually controllable light, and controllable in accordance with one or more received lighting activation instructions; maintaining an electronic representation of the continuous shape based on sensed rearrangements of or change events occurring in relation to the components, the electronic representation including at least linkages indicative of geospatial relations between the coupled lighting components; providing a plurality of lighting activation instructions generated in accordance with the digital audio representation, the plurality of lighting activation instructions comprising timed instruction sets; for each lighting activation instruction, selecting an individual coupled lighting component of the plurality of coupled lighting components based at least on querying the electronic representation; individually controlling each of the coupled lighting components in accordance with the lighting activation instructions, the lighting activation instructions, in combination causing a geometric visualization effect to be co-operatively displayed across the one or more coupled lighting components of the plurality of coupled lighting components.

In accordance with another aspect, each of the one or more substantially flat light emitting structures is adapted for connection with another one of the one or more substantially flat light emitting structures.

In accordance with another aspect, at least one of the one or more substantially flat light emitting structures includes a light guide.

In various further aspects, the disclosure provides corresponding systems and devices, and logic structures such as machine-executable coded instruction sets for implementing such systems, devices, and methods.

The system, devices, components, may be provided individually or together as a kit. Pre-built structures may also be provided.

In this respect, before explaining at least one embodiment in detail, it is to be understood that the embodiments are not limited in application to the details of construction and to the arrangements of the components set forth in the following description or illustrated in the drawings. Also, it is to be understood that the phraseology and terminology employed herein are for the purpose of description and should not be regarded as limiting.

Many further features and combinations thereof concerning embodiments described herein will appear to those skilled in the art following a reading of the instant disclosure.

DESCRIPTION OF THE FIGURES

In the figures, embodiments are illustrated by way of example. It is to be expressly understood that the description and figures are only for the purpose of illustration and as an aid to understanding.

Embodiments will now be described, by way of example only, with reference to the attached figures, wherein in the figures:

FIGS. 28A-28D provide illustrations of various computing devices according to some embodiments.

DETAILED DESCRIPTION

Figure 1:
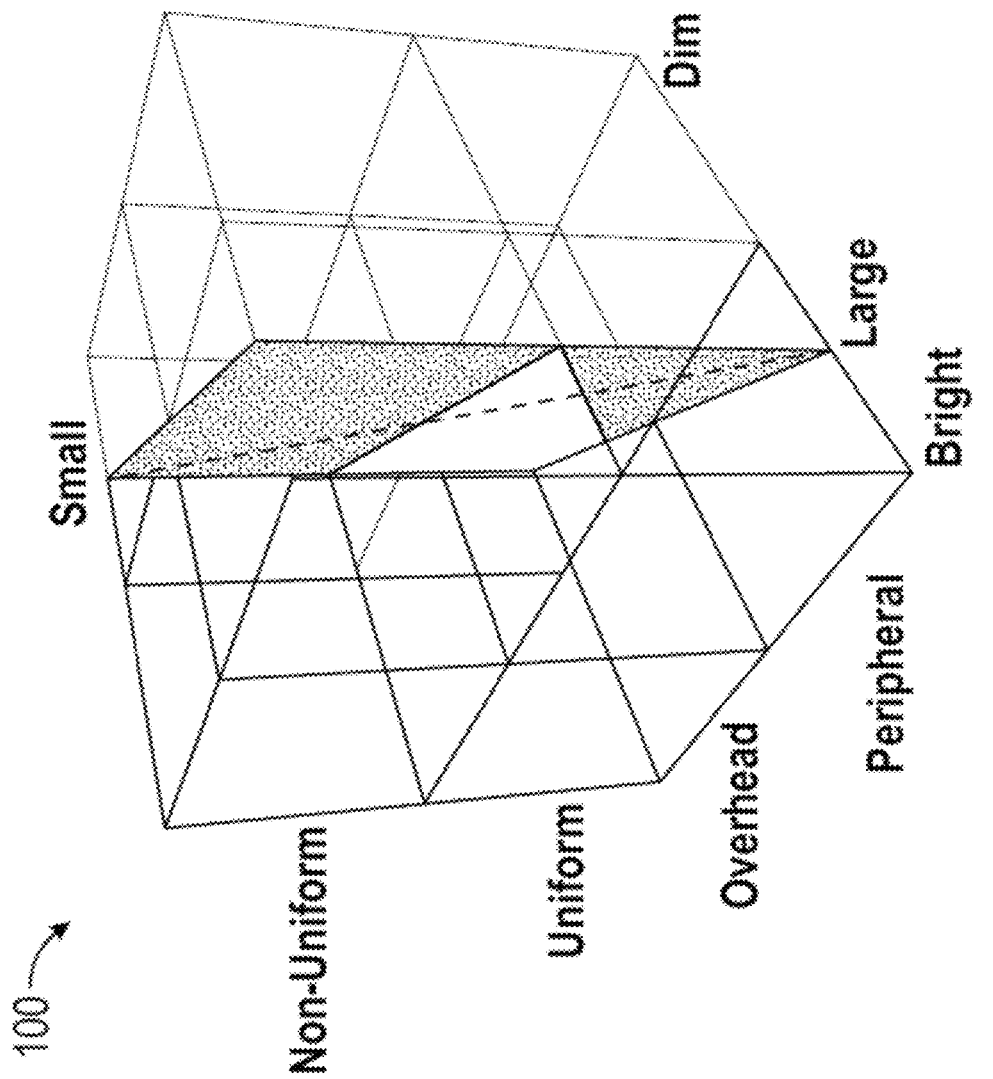
FIG. 1 is an example illustration of a relation between the subjective perception of space and the design of the lighting, where factors uniformity, place of light and brightness are jointly considered, according to some embodiments.

Embodiments of methods, systems, and apparatus are described through reference to the drawings.

Conventional applications of LEDs have been intentionally limited by size, form and electrical constraints set to fit the incandescent lighting technology. Furthermore, LEDs have been limited to the creation of a constant type of white light without any of the variability and creative control described in some embodiments herein. This is called retrofit LED lighting, and its benefit is a reduced consumption of electrical energy as compared against incandescent or fluorescent technology.

However, the imposed constraints remove several beneficial lighting designs. Some advanced LED lighting products that employ a broader range of abilities have hence started to emerge. Examples include color-tuning light bulbs that are controlled via a touchscreen interface, or ceiling lights that automatically change in a gradual fashion from a cool white light to a warm white light as the time of day goes from noon to evening. Various embodiments described in detail below are further improvements and variations to the way in which LED lighting technology can be used for personalized or novel lighting needs that go beyond the typical retrofit purpose.

In various embodiments described herein, innovative systems, devices, methods, and computer-readable media are described wherein configurable lighting units can be constructed such that it is extremely easy to assemble into a larger luminaire assembly, the individual lighting units being configurable in that their orientations, positions, and connections with one another can be re-arranged by users. This luminaire assembly is designed for ease of connectivity, and connectors can be used between configurable lighting units so that the configurable lighting units are interconnected and can share power, data (e.g., control signals) either amongst one another or with a central controller. The central controller can include various computing devices and/or power delivery units, for example, one or more layout detection units, effect rendering units, network interface units (e.g., for communication with networked devices such as Apple Homekit™ devices), among others. Configurable lighting units can be described herein as lighting panels, lighting units, lighting devices, and so forth.

Upon assembly, the layout of the luminaire assembly becomes automatically determined for subsequent programmatic control. The layout permits the ability to render otherwise impossible visualizations and effects (further improved by way of external stimuli such as audio inputs from a microphone), and the layout can be maintained by way of a data structure stored locally or externally in a data storage.

Applicant has further developed a layout determination mechanism that is capable of handling "hot swapping" of components—when a new configurable lighting unit is added to the assembly, the layout detection automatically identifies it as new and begins interacting with out, free of human intervention. Similarly, when a configurable lighting unit is determined to be removed, the layout detection is automatically updated and render effects no longer include such a panel. Various embodiments further describe how to distribute light in an appreciably flat body, but the embodiments should not be considered limited to flat bodies (e.g., bodies may have textures, lightguides, incorporated waveguides, among others).

Some described embodiments are designed and structurally configured to enable an ordinary user, without any training or accreditation in electrical safety, to assembly a two-dimensional luminaire that is shaped as any irregular or regular polyhedra through the joining of individual panel blocks or units. The shape can, for example, be a hexagon comprised of six equilateral triangles joined together at two of their three sides.

Other shapes and designs are possible, and may be desirable in various situations, and shapes and designs need not be static after setup. In various embodiments, the light panels, corresponding connection and control technology are designed to dynamically adapt to changes in shape and design of an overall assembly (in some cases, permitting "hot swapping" where configurable light panels are removed/added to the assembly while the assembly is powered). While triangles are described in various embodiments, Applicant has further developed other shapes (e.g., squares) and many of the principles apply equally across other shapes (e.g., various polyhedra).

In an example where the lighting panels are triangles, each triangle can in turn emit light generated from a plurality of LEDs, which can be of different color. The triangles can also be controlled individually. For example, one triangle emits red light at high intensity, while another triangle in the assembly emits a lower intensity blue light. The inherent combinatorics of building a geometrical structure such as this means that even a small number of blocks can be used to build many distinct shapes.

The flexibility in combinations enables ordinary users to design luminaire assembly shapes that fit their specific needs (or rearrange them) rather than to be limited to a shape set by a manufacturer. Shapes include ones that are extended mostly vertically, such that a sunrise or sunset can be emulated both in terms of the hue of the light as well as the spatial quality of the varying light intensity; it includes complex shapes, such as heart-shapes, pyramids, bird outlines, flags and other abstract representations, which all enable a user's self-expression and design ideas.

Building such a dynamic and flexible system is technically challenging, as in comparison to a traditional fixed shape/design, structural, control, and power interconnections are not known a priori. For example, these configurable lighting units need to be able to stably connect with one another from a mechanical perspective, and it is also desirable to share power, data, electrical signals, etc.

Accordingly, methods and processes are required to aid in the providing a sufficient flow of electricity and propagating control signals to be provided across the lighting assembly. For example, in some embodiments, a single configurable lighting unit is connected to a control/power source. The control/power source can be configured to provide power/control signals to its connected configurable lighting unit, which then, by way of a series of connectors (providing mechanical, electrical, and/or data connections) and joined sections, propagates both control signals and power across the entire lighting assembly. The connectors are of a specific design whereby the connectors can (1) connect the configurable lighting units together so that they can withstand impact and movement in a first direction (e.g., shear forces), but also (2) be able to removable from the configurable lighting units with the application of a sufficiently strong force in a second direction perpendicular to the first (e.g., pulling the connector "out" of the configurable lighting unit). The units can be separated by applying a threshold damage or force level. The threshold damage or force level can depend on the angle or direction of impact or application of force. The threshold damage or force level can depend on the type of impact or application of force. The threshold damage or force level can withstand impact and movement in a first direction (e.g., shear forces), but also enable separation of the configurable lighting units with the application of a sufficiently strong force in a second direction perpendicular to the first (e.g., pulling the connector "out' of the configurable lighting unit).

With respect to (1), the connectors need to be able to resist breakage and thus a first threshold of resistance to shear forces should be high given that the configurable lighting units are likely to be used and placed in a variety of different environmental settings. With respect to (2), the connectors need to be able to resist the pulling force to a second threshold (e.g., so that the connectors are not too "loose" and easily removed, but at the same time, past the second threshold, the connectors should be removable from the configurable lighting units so that they can be reused, move around to another section, moved around to another lighting unit, etc.). Accordingly, the threshold damage or force level can be defined by different thresholds.

Configurable lighting units may include one or more apertures to receive the connectors, and the configurable lighting units may also have "connectable" subsections (e.g., the corners or the midpoints of the sides, or other areas) whereby the configurable lighting units are configured for secure attachment to one another.

As the control and power source provides control signals across the entire assembly yet, in some embodiments, connects directly to only one or more configurable lighting units, the assembly is configured to perform an electronic method for layout detection by way of signals that propagate as between configurable lighting units.

In other words, the creation of a pleasing illumination can further require each configurable lighting unit to, in a sense, understand its place within the larger structure/assembly. Indirect connections may need to be identified through sending one or more probe signals through the assembly. Where new configurable lighting units are added to the assembly when it is electrically powered, the new configurable lighting units may be configured to propagate a control signal indicating their addition to be received by the control/power source, and similarly, when a configurable lighting unit is detected to be removed that was previously connected to another configurable lighting unit, that configurable lighting unit may be also be configured to propagate another control signal indicating the removal such that the layout detection model can be updated accordingly.

In the specific non-limiting example of an emulated sunrise, the type of emitted light should not only transition from a warm white of low intensity to a cool white of high intensity, the emitted light should also change such that lighting units higher up in the vertical structure emit at an increasing relative intensity as lighting units further down in the vertical structure emit at a decreasing relative intensity. In this sense, the layout detection is important in a computer-based determination of the illumination effect. In comparison to a nave approach where there is no layout detection, more complex and sophisticated illumination effects can be rendered by way of the configurable lighting units working in concert with a controller. The layout detection model, stored in various data structures and maintained periodically or in response to detected stimuli, provides a geometric basis for generating dynamic visual effects whereby the configurable lighting units are interact-able visual elements that, in concert, render the dynamic visual effects.

Another aspect of the invention is therefore a method by which the act of assembling the luminaire triggers a simultaneous layout detection that in turn generates an abstract representation of where in the larger assembly each unit resides, or its context. Without this method the individual units remain just individual pieces, like separate light bulbs in a room. With this method, the units becomes part of a bigger structure, which is greater than the sum of its parts. Two light bulbs in a room are two light sources which simply add up to double the illumination. Two lighting units joined in the manner above become one distinct luminaire where each unit knows its context among the other units, hence the luminaire is more than a source of double the illumination.

There are many possible abstract representation of the assembled luminaire that the layout detection generates. There are representations that are highly granular, such as an array of Cartesian coordinates of each individual lighting unit. However, granular representations may be unsuitable to create logical instructions. The emulated sunrise above requires only the information where on the vertical axis of the assembly a particular configurable lighting unit sits. Another example is a heart-shaped luminaire that is intended to pulse light outwards from the center.

This lighting design requires the information where on the radial axis, with origin at the geometrical center of the assembly, each unit sits. Therefore, part of the invention are methods to derive meaningful geometrical representations, given a detected luminaire layout, which are key in the execution of creative lighting designs.

One such lighting design is the concurrent visualization of audio by light of different intensity and color moving through the luminaire assembled by the user in one of the many possible shapes. For example, as music plays in order to set a mood or create an atmosphere, the luminaire is evolving, pulsating or flowing with colored light that is adapting to the music and further enhances the feeling of the music. Another example is the visualization of audio created by speech or other ambient noise. Light that is responsive to human presence or actions can make a space come alive and be more comfortable to be in, attract views from potential customers and become a memorable experience. In order to fully visualize the many distinct features of audio, the different geometrical representations discussed above are needed in order to enable the great many ways light can evolve in the assembled luminaire of a known but otherwise arbitrary shape.

For illustrative purposes, one can imagine the following example set of events: A person in her home assembles twenty individual configurable lighting units into a creative shape, say a horizontal wave across a wall, in less than two minutes. The luminaire assembly is connected to power/control system through a wall-plug, and connected via Wi-Fi to a phone or laptop, all in less than one minute. A rendering program is selected by pressing buttons or by voice-commands. Through a separate music system, a rhythmic music tune is played, which creates audio waves. The luminaire begins to pulse intense red light from left to right in-sync with the beats of the music on a background of low intensity white light.

The context awareness of the individual configurable lighting units, the ease in which the luminaire/assembly is assembled, the specific manner in which the assembly is geometrically characterized and how audio is mapped to light evolution throughout the luminaire are all technical factors involved in the creation of this otherwise artistic experience. Different aspects are useful separately as well as together, and various elements can function independent of one another. Illustrative embodiments of this kind are given in the description to follow.

The lighting design of a space involves many factors of the light. The lighting designer Richard Kelly defines the key variables of a lighting design. In addition to the brightness of the space, the lighting design should consider distribution of light in the space, spectral properties of the light and "direction of major apparent light areas relative to eye level". The subjective perception of a space, including sense of size, has been found to depend on some of these variables.

Light Generation and Distribution Hardware

FIG. 1 is an illustration 100 that shows the qualitative dependency of how bright a space is, how uniform the light is distributed, where the source of the light is located, and the perception of its occupants of the size of the space. In the early 2000s, it was determined that the human eye contains intrinsically photosensitive retinal ganglion cells, which does not contribute to vision, and rather regulates the circadian rhythm. The cells may be activated by blue light exclusively and suppress the creation of the hormone melatonin, which induces sleepiness in mammals. The daylight in the middle of the day is rich in blue light, while the daylight at the end of a day is shifted towards red light wavelengths. These are the light rhythm conditions the human biology has evolved to.

There is an increasing body of studies to suggest that artificial lighting can disrupt these rhythms to the detriment of the health of the individual. Individual differences in what constitutes optimal lighting is contemplated, where so called human-centric lighting design has been heralded as a paradigm shift in how it is the human occupants of a space, and their direct and indirect needs, that should govern how the lighting is done. In few places is this as evident as in care facilities, where older men and women with an increasing prevalence of health conditions receive care. There is evidence that lighting can favorably modulate disease symptoms through spectral variation during the day, or brightness and spatial dynamics that provides clear guidance on how to safely move around a space and avoid falls. The combination of spatial and spectral properties of lighting is therefore a powerful mix in the design of a space not just suitable for the basic function of illumination, but for the well-being of its occupants.

An illustration of this is the difference in lighting in a lunch restaurant and in a dinner restaurant. The lighting of the former is typically activating and formal, attained by lighting that is bright, containing a greater amount of blue light wavelengths, and usually from lighting fixtures high above the customer of the restaurant. The lighting of the latter is typically relaxing and intimate, attained by lighting that is dim, containing a greater amount of red light wavelengths, and usually from lighting fixtures closer to the customer, like a pendant lamp just above the table or lighting on the table.

Other applications of lighting that more recently have received a similar consideration with respect to human factors not just related to the control of brightness is lighting in schools, care facilities and street lighting. The above are all examples of lighting being more than a form of illumination of a space. Rather, the placement and spectrum of the lighting contributes to the atmosphere of the space, its functionality and to a degree the health of the people inhabiting the space.

Light-emitting diodes (LEDs) are semiconductors that emit light at a narrow band of wavelengths when direct current (DC) is passed across the p-n junction of the diode. The material composition of the LED determines the band structure, and thus among other things, the spectrum of emitted light. Examples of LED compositions are gallium arsenide (GaAs), gallium phosphide (GaP) and gallium nitrite (GaN). LEDs exist in a variety of visible light output, such as violet, blue, green, amber, red, and also of non-visible output, such as ultra-violet (UV). Most commercial LED lamps produce white light, which is a mixture of light of different wavelengths. White light is conventionally characterized by its Correlated Color Temperature (CCT) and some metric on the ability of the light to accurately render colors; these metrics include Color Render Index (CRI), Color Quality Scale (CQS) and Gamut Area Index (GAI).

The CCT of white light quantifies the degree of red versus blue light components, where lower values of CCT imply that there is more red light present, hence leading to a warmer, more fire-like appearance of the light. By way of example, the light from typical candlelight is around 1800K, the light from the sun during sunset is around 2500K, and the light in the middle of an overcast day is near 10000K. One method to attain the white light mixture is through a combination of materially distinct LEDs that produce visibly distinct light, which are mixed in a secondary optics, such as a lens or through scattering by small particles or structural irregularities in a material through which the light from the LEDs travel before illuminating the space.

Another method to attain the white light mixture is by coating a blue or violet LED with an inhomogeneous phosphor that absorbs a subset of the light, followed by a reduction of the total energy through the relaxation of vibrational degrees of freedom of the atoms in the phosphor, before emitting a lower energy, longer wavelength, light. Because of the simpler construction, the latter method is more common among commercially available LED lamps, although examples of the former methods exists as well, in particular in the form of so called red-blue-green (RGB) lamps.

A complication known in the art of RGB lamps and lighting in general is that the materially distinct LEDs react differently to heat. LEDs are known to lose more of the luminous output to non-radiative relaxation modes as the temperature increase. Some types of LEDs lose more than other types of LEDs, where GaP LEDs are known to be particularly prone to reduced luminous flux with increasing temperature. There are methods that involve feedback loops to remove any appreciable drift in the color coordinate. The emission of a relatively narrow spectrum is part of the reason LEDs are efficient relative to the traditional incandescent lighting, which emits a very broad spectrum through thermal radiation that includes a considerable amount of non-visible wavelengths.

Since LEDs are semiconductors, they are typically mounted on a printable circuit board (PCB) in a lamp. The PCB is also the foundation of electronics like microcontrollers (MCUs) and processors. Therefore the hardware of LED lamps can with relative ease be extended to include computing devices. This is the hardware foundation of connected LED lamps, or smart lighting. The MCU can embody simple logic to change the current that drives the plurality of LEDs in a lamp. In a lamp that contains LEDs that have a different spectrum, such as an RGB lamp, or a lamp that contains a variety of white light LEDs of different CCT, different relative currents to the LEDs in turn leads to a varying mixed spectrum. In the former case the light becomes color tunable, and in the latter the shade of white can change similar to how the daylight changes during the course of a day.

The signal to the MCU can in turn derive from a wireless signal received by an integrated antenna, or it can be received over a wired connection. Antennas have to be tuned to receive or transmit the signal of interest at an adequate range at a minimum of energy losses. Properties such as antenna length and shape, as well as how the antenna is electrically or mechanically connected to nearby electrical or mechanical components of the lamp, have to be engineered in order to ensure optimal performance. Furthermore, most jurisdictions in the world regulate in which frequency bands devices are allowed to transmit. An antenna design that generates strong harmonic frequencies at some multiple or fraction of the intended frequency is not acceptable in a commercial product.

Through computer simulations and tests in anechoic chambers these properties can usually be attained for transmissions at the conventional frequencies, 900 MHz and 2.4 GHz, as long as the lamp or luminaire is not too small or crowded with components of materials that are conductive and thus a barrier to the electromagnetic wave. Regardless of the method of receiving the signal, however, the control of multiple types of LEDs means the control aspect is not just a binary control, like an on/off switch, or a one-dimensional control, like a standard dimmer switch. This property defines a challenge in supplying a user with an intuitive interface to interact with the lamp or luminaire, since traditional light switches are inadequate to transmit the more complicated signal. In order to implement a lighting design of a space, which takes into account the variables described above, the control challenge increases even further, since multiple devices have to change over time or be triggered by any of a plurality of possible events.

Part of the solution is to engineer software that can structure the control and communicate with the luminaires. As in the foundational technology of the World Wide Web (WWW), the communication of data and signals benefit from a design that is stratified in layers of increasing abstraction. At the low levels, the signals are treated as binary electrical signals, while at higher levels the commands are described in units closer to the human apprehension of the system. The advantage of introducing abstraction layers is that it simplifies the development of new features, security or enhanced hardware, as long as the communication interface between layers remains identical. This is an example of software modularity, universally considered a necessary feature of high quality software. One of the better known abstraction layer designs is the Open System Interconnection (OSI) model, which defines seven layers for device communication. At each layer a developer would introduce different specific software methods to handle the particular task of that layer. There are several distinct methods for any given layer available in the public domain, either fully disclosed to the public, or as confidential specifications within companies or organizations. Each method can be different with respect to how secure they are, energy efficient, memory efficient, fast and fault tolerant.

Because of the modularity described above, it is still possible in a product or service development to select a diverse set of combinations of software communication methods, and still have an application that performs the same primary function, only varying with respect to some degree of quality.

In particular, the abstraction enables devices that are very different at the lower levels of data communication to exchange data through a common method at a higher level. For example, a device that records motion in a room through passive infrared radiation (IR), can when triggered communicate the low-level signal at the physical layer as a message to the Internet using the prevalent Hypertext Transfer Protocol (HTTP) in the form of a JavaScript Object Notation (JSON), which is received by a mobile device through standard means of transmitting data over the Internet, then through the layers in the software design of the mobile device, triggers a physical mobile device signal, thus alerting the owner of the motion detected by the IR signal.

Neither the developer of the mobile device, nor the motion sensor, has to disclose the details of the lower layers of the communication. The developer conforms to an open standard for communicating data at some higher level. Therefore, for many innovations of applications involving one or multiple devices, the specific detail of how data is communicated is, by design, not contingent on the low-level detail of the software or hardware design of either device.

This property of modern device communication is the practical foundation of innovations that connect wearable devices, which record some biometric of the person carrying said device, with some state variable of the space the person is inhabiting. The biometric can for example be, heart rate, skin temperature, neural oscillations, sleep state. Through a physical sensor the biometric triggers a low-level electrical signal that propagates upwards in the software design at an increasing level of abstraction, until the sensor data exists in a form that can be received by the upper software layers of the second device, such as an LED lamp.

The same software technology is part of innovations to convert video signals to lighting of a particular hue, saturation or brightness that amplifies the content on display. In that case the control signal originates, not from another hardware device, rather from a digital stream of data that in a TV would translate into a motion picture. This application shows that at the appropriate abstraction level, it is all data that can be received and through software interpreted into lower level signals, be they instructions to what color to set a given pixel on a TV, or instruction on what color and intensity to assign to one luminaire or several luminaires at some preconfigured position in a home, bar, outdoor area or other public or private place. Other applications include connecting physical hardware to the data stream of social media. An example is CheerLights™, which enables any LED light with a certain software architecture to receive control signals from online messages on the social media platform Twitter™.

Some embodiments describe a configurable LED luminaire that through a novel hardware and software design may be able to meet one or more of the lighting design goals described above.

In some embodiments, the system enables spectrum, light locus, dynamics and/or complete 2D-trough-tessellation spatial configurations. The system is not limited to merely configuring the spectrum, or moderately some spatial configuration.

In some embodiments, a multi-component configurable LED light is provided.

Some embodiments are based on an appreciably flat light emitting structure. The flat structure is a light guide, which has an area where light is introduced. The light may propagate through the light guide. Throughout the light guide some element or microstructure is introduced to extract the light from the light guide and create the illumination. The surface area where the light is introduced is typically smaller than the surface area from which the light is extracted, ranging from 10 to 1000 times difference.

The light guide can be made of material such as polymethyl methacrylate (PMMA), polycarbonate (PC) or a similar polymer that is completely or partially transparent to visible light.

The polymer material has a refractive index greater than one, typically between 1.4 and 1.5. Because the refractive index is greater than the refractive index of the air of the surrounding environment, light that propagates within the light guide can experience total internal reflection (TIR).

This may imply that light does not leave the light guide to the air unless the angle of incidence exceeds the critical value derived from Snell's law. The light guide is hence able to guide the light from the light sources in a manner with a highly restricted spread of the light if so desired. An implication of this is that even if there is a curvature to the light guide below some critical threshold, the light is guided without significant losses of light to the environment.

In order to create illumination of the environment, the light can be extracted or out-coupled from the light guide. The extraction is done such that all or some of the plurality of light rays change direction to a degree greater than the critical angle of incidence derived from Snell's law and the material properties of the light guide.

The conceptually simplest method is to randomly integrate small reflective particles, such as Titanium Dioxide, uniformly through the light guide. Light that travels close to the particles will hence scatter and change course through the light guide, in particular some light will propagate at an angle relative to the interface between the light guide and the surrounding air that allows the light to escape the light guide. As long as the particles are small, it is possible to design a distribution of particles such that the panel will appear uniformly illuminated to a human observer as light is introduced to the light guide. Another method to extract light from the light guide uses surface roughening by for example, laser, silk print, etching or scratching.

By adding structural elements to the surface of the light guide that breaks the otherwise even surface, the probability of light being extracted increases. A direct extraction can take place as light hits the interface because the angle of incidence is greater than the critical value because of the surface roughening. The rough surface can also reflect the light due to TIR in angles such that upon the next instance of hitting the interface between the light guide and the environment, the angle exceeds the critical value and the light is extracted into the environment and thus contribute to the illumination. The modification to the surface can be done in a deterministic fashion to control the extracted light in greater detail. Properties such as the efficiency of the extraction, the degree of extraction as a function of distance from source, as well as the angle of the light that is extracted, are all easier to engineer with a deterministic and specific placement and shape of the structure added to the light guide.

At part of the circumference of the light guide, a reflective tape or other component can be applied, such that light that has not been extracted from the light guide through its propagation from the light source to the end of the light guide, reflects back into the light guide such that an extraction event becomes possible again. This can be viewed as a recycling event where light emitted from the source is allowed to travel through the light guide again. The reflectivity of the tape can be very high, above 95%, even above 99%. The reflection can be both dispersive and perfectly reflective in nature. Another possible solution is for the edge to be structured to increase probability of TIR at the edge and thus achieve a similar outcome as the reflective tape, without the added component. This does however modify the visual appearance of the edge, unless it is hidden from view by some non-transparent structural element, like an aluminum frame.

In one embodiment a plurality of LEDs of different CCT are used as the light source, such that relative variations of the drive current produces different shades of white light.

In another embodiment a plurality of LEDs of different color, or in other words of different narrow spectra, are used, such that the color can be tuned through relative variations of the drive current. In these embodiments the out-coupling must furthermore consider the spatial variability of the visibly distinct light. For example, if a subset of surface elements out-couples red light more than green and blue light, another subset out-couples blue light more than red and green light, and another subset out-couples green light more than red and blue light, the illuminated surface will appear highly heterogeneous with respect to color. In some applications this is a desired effect, since it can add additional dynamic to the lighting. In some applications this is an undesirable effect; color uniformity is one of the criteria of the Energy Star certification defined by the US Environmental Protection Agency (EPA), for example.

The longer the distance the light rays travel before they out-couple, the more mixed they will be. One embodiment introduces light at the thin side of the light-guide and emits it from the orthogonal surface that is many times larger, the travel distance is relative long in comparison to an embodiment where the light is introduced to the panel on the opposite side of emitting surface.

The closer the distinct LEDs are placed, the shorter the travel distance has to be in order to attain a given degree of mixing. Therefore, in an example embodiment, the visibly distinct LEDs are placed close to each other and light is allowed to travel a short distance in the light-guiding panel with reduced, a minimum, or no out-coupling. This way color uniformity as perceived by the human observer may be optimized (e.g., maximized).

Because of the features of the light guide described above, the light guide can be made relatively thin. The light source is an LED package, which optionally is composed of a plurality of visibly distinct LED semiconductors, and with a light-emitting surface that can be a few millimeters along its shortest dimension. The light guide should substantially (e.g., fully) cover the light-emitting surface of the LED for an efficient use of the generated light. In order to enable a physical attachment of the light guide to other components that are required to manage the heat of the LEDs, or to cover the electrical components needed to supply the LED with DC in a safe way, the light guide can be thicker than the shortest dimension of the light-emitting surface by at least 2 to 10 millimeters.

The extraction of light from the panel in either of other methods and reviewed above requires no added thickness to the panel, since it is based on particles or structural variations that are at least one order of magnitude smaller than the panel or LED package. The form factor of the luminaire can therefore be thin, only a few millimeters if desired.

The geometry of the luminaire can in principle be any two-dimensional structure. An example embodiment is an equilateral triangle. The equilateral triangle is a simple two-dimensional structure, and the most symmetric of all triangles, of the symmetry group D3. The equilateral triangle is a constituent surface is several three-dimensional solids; in particular three of five Platonic solids consists of equilateral triangles. Larger three-dimensional structures, such as geodesic spheres are also products of equilateral triangles joined at the edges. Since the 60-degree angle in an equilateral triangle is a simple fraction of 360 degrees, a surface can be tessellated with equilateral triangles, in other words, the triangles are tiles without overlap or gaps.

Figure 2:
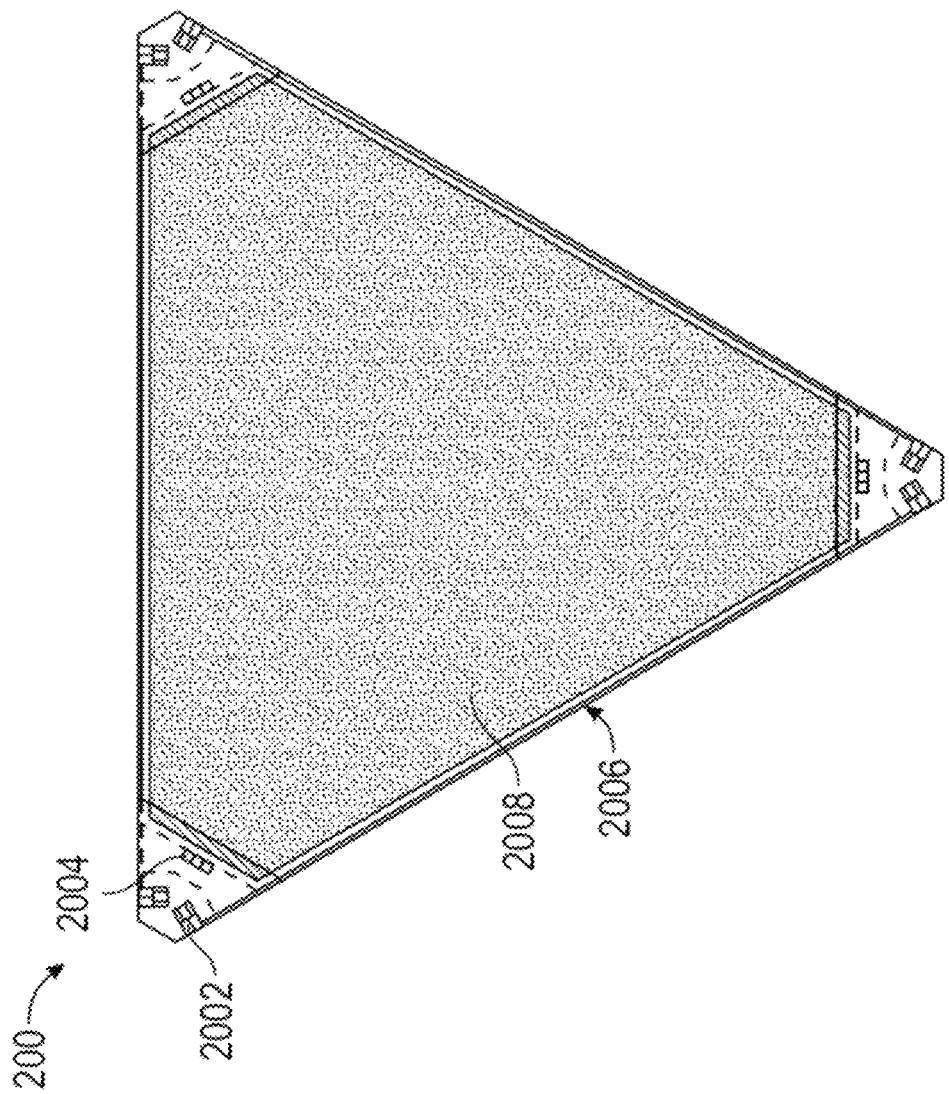
FIG. 2 is a top plan view of an example illustration of an embodiment of the flat lighting unit, according to some embodiments.

These properties together make the equilateral triangle a versatile component in the construction of a larger structure, planar or three-dimensional. An illustration of an embodiment is shown in FIG. 2, at example luminaire 200, having one or more connectors 2002, LEDs 2004, connecting ribs 2006, and light guide plate/diffuser 2008. Any regular or irregular polyhedron can be used as well in various embodiments. Other implementations are possible, and these components are shown merely as examples. For example there may be more LEDS 2004, the connectors 2002 may operate at different places, there may be other shapes, etc. Lighting devices aside from LEDS 2004 can also be used.

A square belongs to the D4 symmetry group, and the 90 degrees angle enables tessellation of a surface as well. The square is the surface element in the cube, one of the five Platonic surfaces. A pentagon belongs to the D5 symmetry group. However the 108 degrees angle of a regular pentagon is not a fraction of 360 degrees, hence it cannot be used to tessellate a surface.

It is the surface element of the dodecahedron, the last of the five Platonic solids. The regular hexagon can be constructed from six equilateral triangles, hence any structure that in part or fully is composed of hexagons can be constructed with a plurality of equilateral triangles. Through a combination of regular polyhedra, many three dimensional structures can be created when joined at the edges, for example the traditional shape of a ball in soccer/football.

Light Extraction Units of Light Guide

As described herein, the light emitted into the light-guiding panel must become fully or partially redirected to leave the panel and act as illumination of the environment. These points can be referred to as extraction points, regardless of the underlying physics of the light redirection.

As an arbitrary unit of light leaves the panel, less of the light remains in the panel to be emitted at a subsequent extraction point. Therefore, the amount of extracted light can vary across the panel, with more light extracted near the LED source. Some lighting applications require the non-uniformity to be below a set threshold, either for functional or aesthetic reasons.

The form factor of the light-guiding panel is assumed to be set, as well as the placement of the source of the light and its luminous flux. A variable (in some cases, the only variable) in the design is the coordinate and nature of the extraction point. In the more common scenario where the nature of the extraction point is identical across the panel, a variable (in some cases, the only variable) to optimize is the placement of the set of extraction points in order to attain the desired level of uniformity.

In the example of a light-guiding panel in the form of an equilateral triangle with the source of light in the apexes of the triangle, and with a highly reflective tape at the sides of the flat panel, the distribution of the extraction points is a non-trivial inverse problem. For most structures similar complexity applies. A square presents a problem that can be solved through simple geometry. The objective is an appreciably uniform surface of light from the light guiding panel. In physical terms the luminous emittance at any surface element of the light guiding panel should deviate from the average luminous emittance of the entire light guiding panel by no more than some small relative or absolute threshold.

In the form of an equation the objective function is:

$$L \int_S |M(s) - \langle M \rangle|^2 ds$$

$$\langle M \rangle = \frac{\int_S M(s) ds}{\int_S ds}$$

where S is the set of points that define the surface that should be illuminated, and M(s) is the luminous emittance at a given surface element s.

The standard unit for luminous emittance is lux and is readily measured by equipment or modeled in optical software.

The objective of the method is to minimize the objective function L by adjusting the distribution of extraction points, given the shape of the panel, given the placement of the light source. Given a distribution of extraction points, standard optical simulation tools can be applied to ascertain the luminous emittance function.

So called ray-tracing methods model the light as a plurality of rays that propagate through a medium in a discretized manner. The ray tracing involves constructing approximate solutions to the Maxwell's equations. For some materials that include small elements of diffraction, the simulation can be preceded by a calibration of the optical properties of the given material.

Once an adequately accurate method has been calibrated to compute the value of the objective function given a configuration of extraction points, the configuration is iteratively optimized with a zeroth-order or first-order method. One embodiment uses a genetic method. It proceeds according to the following steps.

A plurality of configurations are initialized randomly. The configuration is represented mathematically as a feature vector, referred to as the gene of the given configuration. The objective function is computed for each configuration. The best performing configurations are transformed through a finite set of genetic operators. The genetic operators typically include: mutation, which randomly perturbs a given configuration while preserving most elements of the configuration; cross-over, which combines two top performing configurations in some manner, such as taking the first half of the gene of one configuration and combine with the second half of the other configuration.

Through iteration, the population of configurations are changing towards solutions that minimizes the objective function. The genetic method is embarrassingly parallel and can therefore be made to run quickly (e.g., in some cases, very fast). A related stochastic optimization method is simulated annealing. It randomly modifies the configuration, and accepts the new configuration if and only if the objective function is either reduced, or only increases less than a random number generated at each evaluation.

The threshold for allowed increase is progressively decreased, or annealed, as the optimization progresses. This construction allows the method to escape shallow local minima on a path to the global minimum. Both methods are done without the computation of a gradient, hence they are zeroth-order methods. First-order methods usually requires fewer iterations than zeroth-order methods, but they require the exact or approximate evaluation of the gradient of the objective function. The Maxwell equations can be differentiated, analytically or numerically, which produces the gradient. Gradient-descent optimization or gradient-descent with inertia optimization can thus be employed to find a minimum of the objective function.

Structural and Electrical Connection, 3D And 2D

The previous sections described the construction of an example embodiment of a single flat luminaire. Each unit is constructed to allow the convenient assembly of multiple single units into a large luminaire. Because of the unique properties of the equilateral triangle, as described earlier, a multitude of two- and three-dimensional structures can be made.

This section describes a number of embodiments that allow a convenient and safe custom assembly of the lighting units into a larger luminaire.

Figure 3:
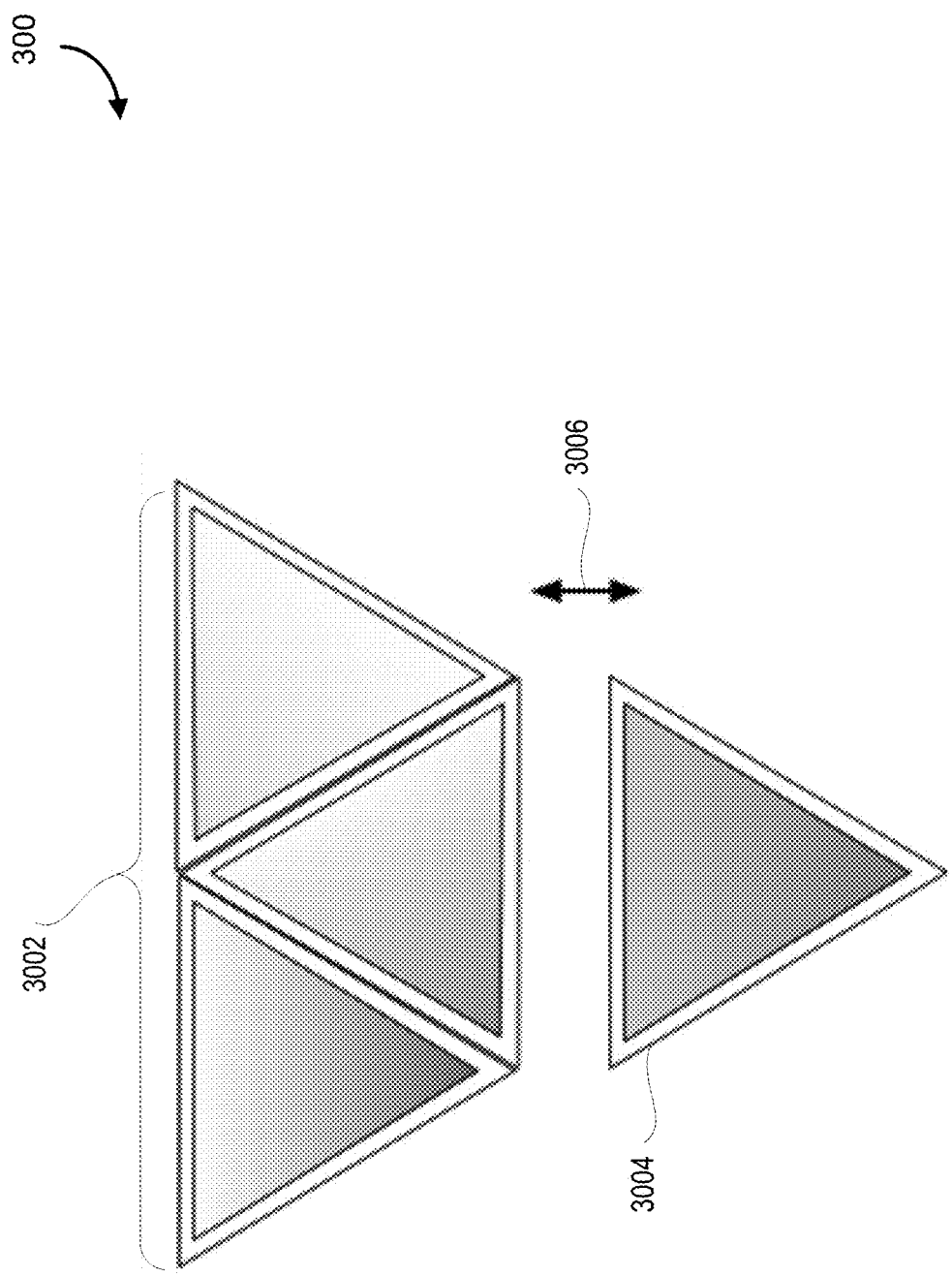
FIG. 3 is an illustration of a two-dimensional luminaire comprised of a plurality of triangles, illustrative of four appreciably flat triangles, with three already joined by their sides, with a fourth triangle being joined to the bottom side of the assembly, according to some embodiments. The assembly may be assumed to experience gravitational force with a non-zero force in the plane of the triangles.

FIG. 3 is an illustration 300 of a two-dimensional luminaire comprised of a plurality of triangles 3002. The assembly is furthermore assumed to experience a gravitational force 3006 which could have a non-zero force vector in the plane of the triangles. Hence, if one of the triangles 3004 is attached to the wall, but the other triangles 3002 are not, there can be a force separating the triangles from each other (e.g., gravity). The weight of the various configurable lighting panels is an important consideration from a mechanical perspective. Suitable connectors may be required that, on one hand, are able to avoid accidental damage when experiencing forces in certain directions, while being able to be removed without too much difficulty.

In other words, the structure in FIG. 3 is not in a stable point without further constraining forces. Without loss of generality, the method is described in terms of two triangles joined together. To a person skilled in the art the methods described below can readily be applied to luminaires that are comprised of more than two triangles, or to luminaires that are assembled from lighting units shaped as a square, rhombus, rectangle, parallelogram, pentagram, hexagram or any regular or irregular polygon.

Convenient locking mechanisms may be utilized, or, in some embodiments, a snug friction fit may be utilized so that the connectors between the lighting panels can be resistant to shear forces while also being able to be removed easily if pulled with sufficient force along an axis that is used for insertion/removal. As forces experienced between the lighting panels in regular use (and not when inserting/removing connectors) may be in multiple directions, it may serve to provide a sufficiently stable connection while at the same time providing a removable connection.

Magnetic force has been used in LED lighting to make one component possible to separate from another component. The modular construction thus obtained enables individual components that decay or fail earlier than other components possible to replace rather than the entire light fixture. These innovations do however not electrically or mechanically couple lighting devices to each other to form a larger lighting fixture, instead the construction is meant to enable an electrician to easily replace one functionally distinct component from a set of other functionally distinct components.

Many such modular devices expose parts of the high voltage construction of the lamp in the process of removing the particular component. Therefore an individual trained in electrical safety must complete the task of replacing the component in question. Another application of magnetic force in LED lighting is to enable a continuously adjustable placement of a lamp on an electrified track. This application requires the joint function of a magnetic force for mechanical reliability and safe electrical conduction to power the LED package. However, it does not join multiple light units together into a functionally and structurally new unit.

Prior work on enabling the mechanical and electrical attachments of individual lighting units into a larger luminaire has used edges with reciprocal protrusions and indentations along with an aligned hole into which a device can be inserted for mechanical attachment. This implementation allows a relatively contiguous joining of the visually illuminated part of the light unit. However, it requires a separate device to mechanically join the parts. Furthermore, the terminal sides to the assembled light unit can have the protrusions and indentations and holes needed for the joining, which in some applications can remove from the desired appearance of the product, unless the entire light fixture is mounted in a custom frame that covers the terminal sides.

An embodiment separates the PCB on which the LEDs are mounted and the PCB on which the electrical driver is put by an appreciably cubic heatsink. On the four orthogonal sides of the cube, means to electrically and mechanically attach a plurality of cubes is described. The electrical connection is described as a double-sided male connector, which connects the two female connectors on the two sides of the cubes coming together, and the mechanical connection is described as an inter-module snap clip, which when aligned with a slot on the other cube side creates a constraining force that join the two cubes. Some embodiments include the option to include a wireless module within the cubic heat-sink.

Some embodiments utilize magnetic force to join flat panels in an electrically safe and convenient manner without using structures that at a terminal side would remove from a desirable minimal and uniform visual appearance, or complicate the assembly for the user.

Figure 4:
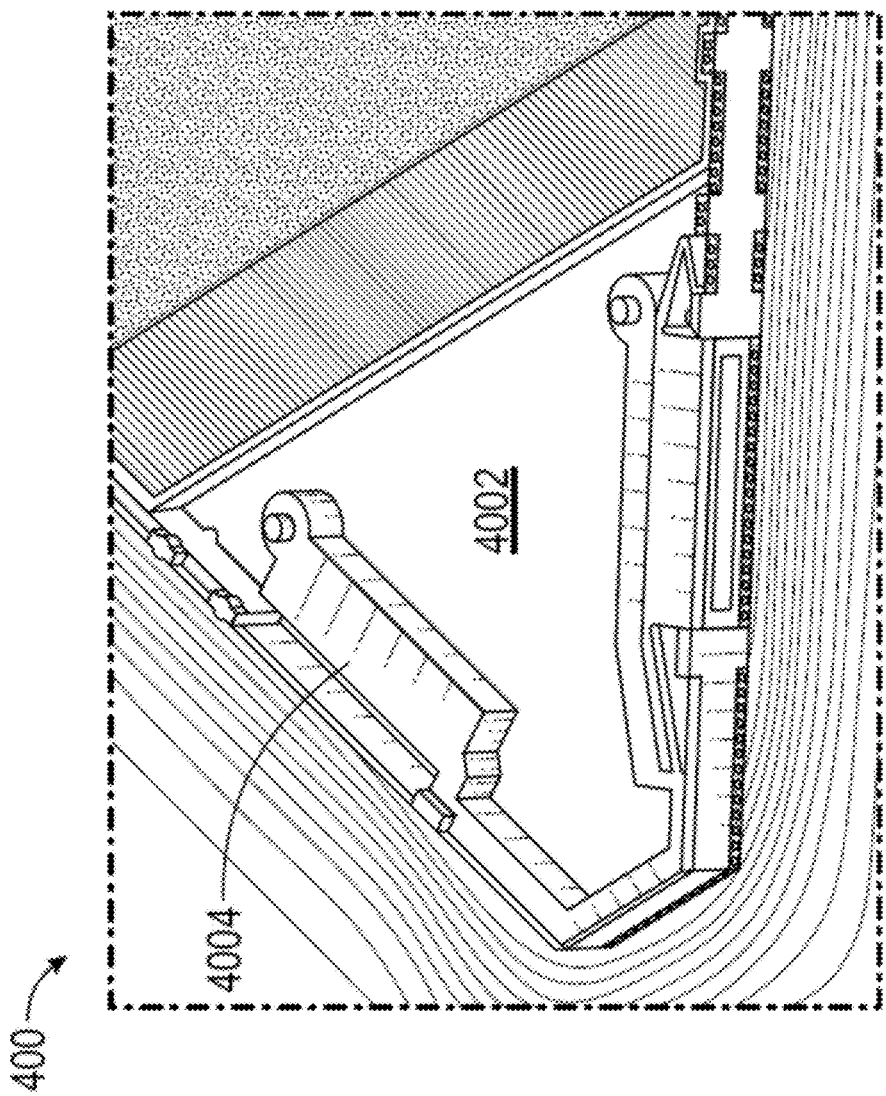
FIG. 4 is a partial perspective view showing details of a magnetic lock in an apex that is pulled out by magnetic force as a complimentary structure is moved close, according to some embodiments.

Some embodiments include an equilateral triangle with the LED light sources in the apexes of the triangle. It is also on the sides of the apexes that the electrical and magnetic connectors are put. In FIG. 4, another example embodiment 400 is shown in relation to lighting panel 4002.

This embodiment addresses the mechanical connection. On one side a magnet 4004 is mounted onto a solid block, which can be constructed by plastic, non-magnetic metal, or wood to name some examples. The polarization of the magnet is such that the entire surface directed outwards relative to the other components of the lighting unit has identical sign, for example a positive polarization.

The inward facing part of the magnet is therefore of negative polarization, since magnetic monopoles are for all practical purposes non-existent. The block onto which the magnet is mounted is attached to the frame of the lighting unit 4002 through a spring. The construction of the spring can take any standard form, such as a helical spring, a flat spiral tension spring or a leaf spring to mention three specific examples.

In FIG. 4, the force required to bend the ledge that connect the block to the frame makes the equilibrium position of the block under normal gravity in the retracted position. On the opposite side of the block structure of the apex is an indentation of dimensions complementary with the block described above. At the innermost part of the indentation a magnet is mounted of dimensions identical or similar to the magnet mounted onto the block described above.

The orientation of the polarization of the magnet is inverse that of the magnet on the block. In the example given above, that means the outward facing side of the magnet in the indentation is of negative polarization. In this embodiment of the innovation, there are no moving parts within the indentation.

As two lighting units are put in each other's vicinity with the apexes appreciably or fully aligned, the magnetic attraction between the positively polarized magnet of the block and the negatively polarized magnet within the indentation creates a force that pulls the two lighting units together, and pulls the block out of its retracted position and into the indentation.

The block can either fill the indentation, or leave some empty space between the block and the bottom of the indentation, which implies the two magnets are not in physical contact. In this configuration the connector has been actuated.

The actuation is possible under the following force conditions: First, the magnetic force pulling the block towards the magnets in the indentation at a separation equal to or somewhat greater than the depth of the indentation is greater than the spring plus gravitational force exerted on the block to remain in its retracted position. Under these conditions the block can begin to insert itself into the indentation without any further force being applied by the user. Second, as the block moves into the indentation, the attractive magnetic force should continue to be greater than the force from the spring to pull the block deeper. Since the magnitude of magnetic force increases inversely as the distance is shortened, and the spring force increases linearly at small deviations from equilibrium according to Hooke's Law, the second condition holds as long as the first condition holds for any meaningful spring design. Third, at some extension of the block from its retracted position, a force equal to the magnetic attraction force will appear, which will define the equilibrium position of the block in the fully actuated state of the magnetic block.

The origin of the counteracting force can either be the ubiquitous exchange repulsive force between molecular matter, or it can be a consequence that the spring has been extended to a point where the force increases rapidly in a nonlinear fashion.

As the block enters the indentation and reaches its fully actuated state, the construction locks the pair of lighting units in a position that keep the lighting units attached under both shear force in the plane of the lighting units and shear force orthogonal to the plane of the lighting units. Furthermore, the magnetic force prevents a separation of the lighting units within the plane of the units under modest separating force. Overall, this implies that the magnetic locking mechanism affords the pair of joined lighting units with significant rigidity under gravitational or other force perturbations that are expected under normal use of the assembly.

By optimizing the spring constant, the depth of the indentation, the magnitude of the magnetic moments, and the point at which the spring extension enters a highly non-linear domain, the mechanical properties of the locking mechanism can be tuned for ease of use, and sturdiness to shear force and separating force.

Qualitative guidelines include: the magnetic force in the fully actuated state should not exceed the limit for what is convenient for a human to apply in order to separate a pair of lighting units; and the depth to which the block enters the indentation should be sufficient to provide resistance to shear force. However, above a certain depth little additional resistance is afforded, and the structural challenge to accommodate the larger block within the apex without a too great loss of illuminated surface puts practical limitations on what block size is optimal. In fact, by giving room for some out-of-plane shear force, the pair of joined lighting units becomes more convenient to separate since the user can slightly bend the two units relative to each other in order to reduce the magnetic force.

Figure 5:
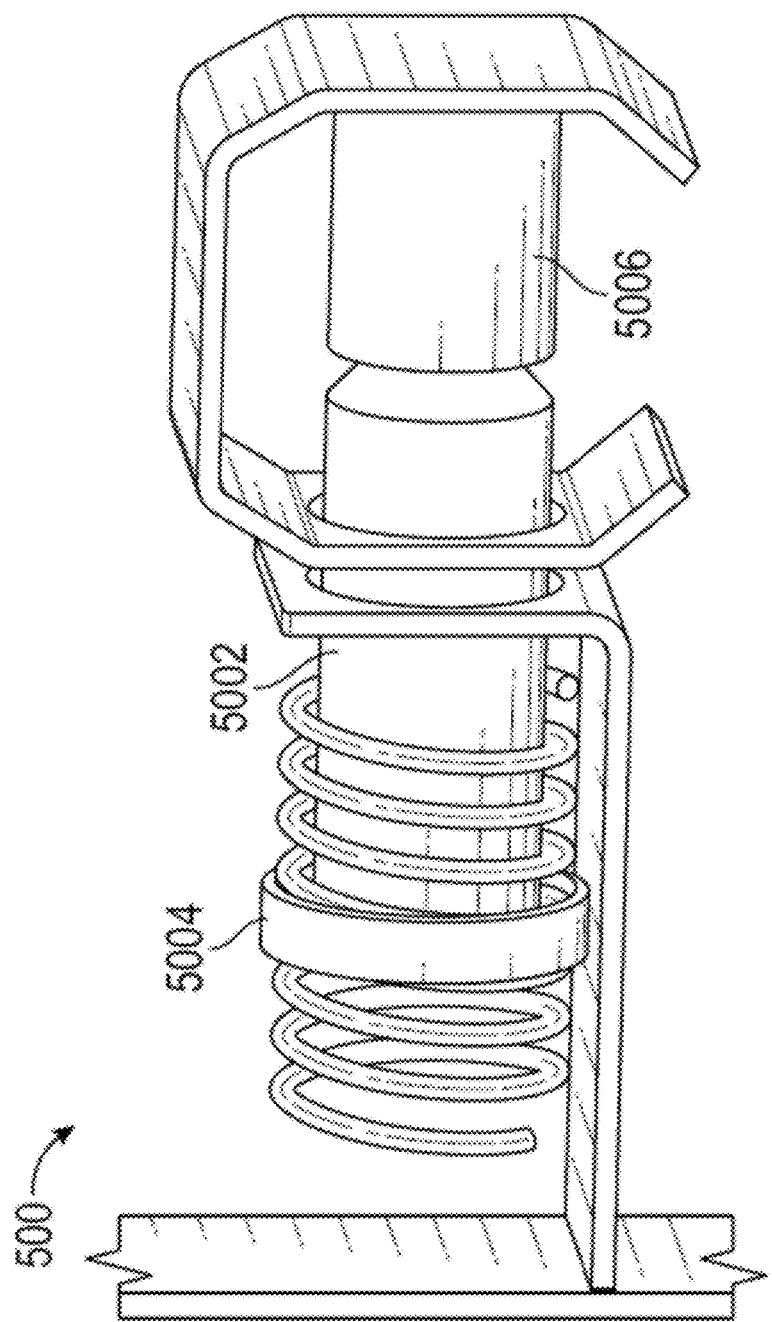
FIG. 5 is a perspective view of a magnetic lock that includes a strut that is hatched to a ledge to provide further mechanical rigidity, according to some embodiments.

Another embodiment of a magnetic locking mechanism 500 is shown in FIG. 5. The mechanism has some similarities with what was described above. The two sides of an apex have different parts of the lock that is formed as a pair of aligned lighting units is brought together. One side includes a rod 5002 that is retracted within the apex, held in place by a spring 5004, in this embodiment a helical spring. The rod contains a magnetic component with an outward facing side of a certain polarization.

The other side of the lock is an indentation within which a physically rigid magnet 5006 is situated, where magnetic polarization is opposite of the rod. In order to provide a very strong resistance to a separating force within the plane of the light units, the embodiment in FIG. 5 contains a ledge into which the rod 5002 can attach. That means that in the fully actuated state, the rod locks with an additional non-magnetic mechanism to the other lighting unit (, hence making the force needed for separation very high. Only if the elastic structure that controls the relative position of the ledge and the plane of the lighting unit is pressed does the rod move out of the hole and allows the user to separate the lighting units with a reasonable force.

The embodiments described herein address the mechanical connection between lighting units, and share the property that magnetic force pulls a lock into place that affords rigidity to the assembly.

FIG. 6A and FIG. 6B provide illustrations 600A and 600B of another embodiment, whereby an aperture of a lighting unit is shown in greater detail. The example aperture 6002 has a reduced profile by way of flanges 6004 and 6006, which help retain a male connector portion in place. These flanges 6004 and 6006 allow for fastener free connection of the male connector and the female aperture and prevent movement in one direction. In some embodiments, a cutout 6010 is provided so that a user can easily interact with a male connector that is residing within the aperture 6002 (e.g., the user can slide the connector and put force on it to remove it from the aperture 6002). Protrusions 6008 are shown (there may be more or less but four are illustrated), and in some embodiments, these protrusions 6008 can include a conductive material (for transferring electricity or data).

In some embodiments, protrusions 6008 have spring characteristics that help bias their positioning and orientation an upwards position. When a male connector is received by aperture 6002, the male connector presses down on protrusions 6008 such that protrusions 6008 push up on male connector and hold the male connector against flanges 6004 and 6006 to provide for securement in both a shearing direction and a insertion/removing direction. The spring tension on the protrusions 6008 can be set such that on the application of force above a separation threshold, the protrusions 6008 are detachable from the male connector and thus the male connector can be removed from the aperture 6002.

Another embodiment employs the same mechanism as FIG. 5, and in addition also provides electrical connection. The block that enters the indentation is equipped with electrical connection points, for example so called pogo pin connectors. Inside the indentation the receiving connection points are constructed as well, such that once they establish contact with the pogo pins, an electrical signal can travel between the two lighting units. An illustration 700 of the embodiment is given in FIG. 7.

Figure 7:
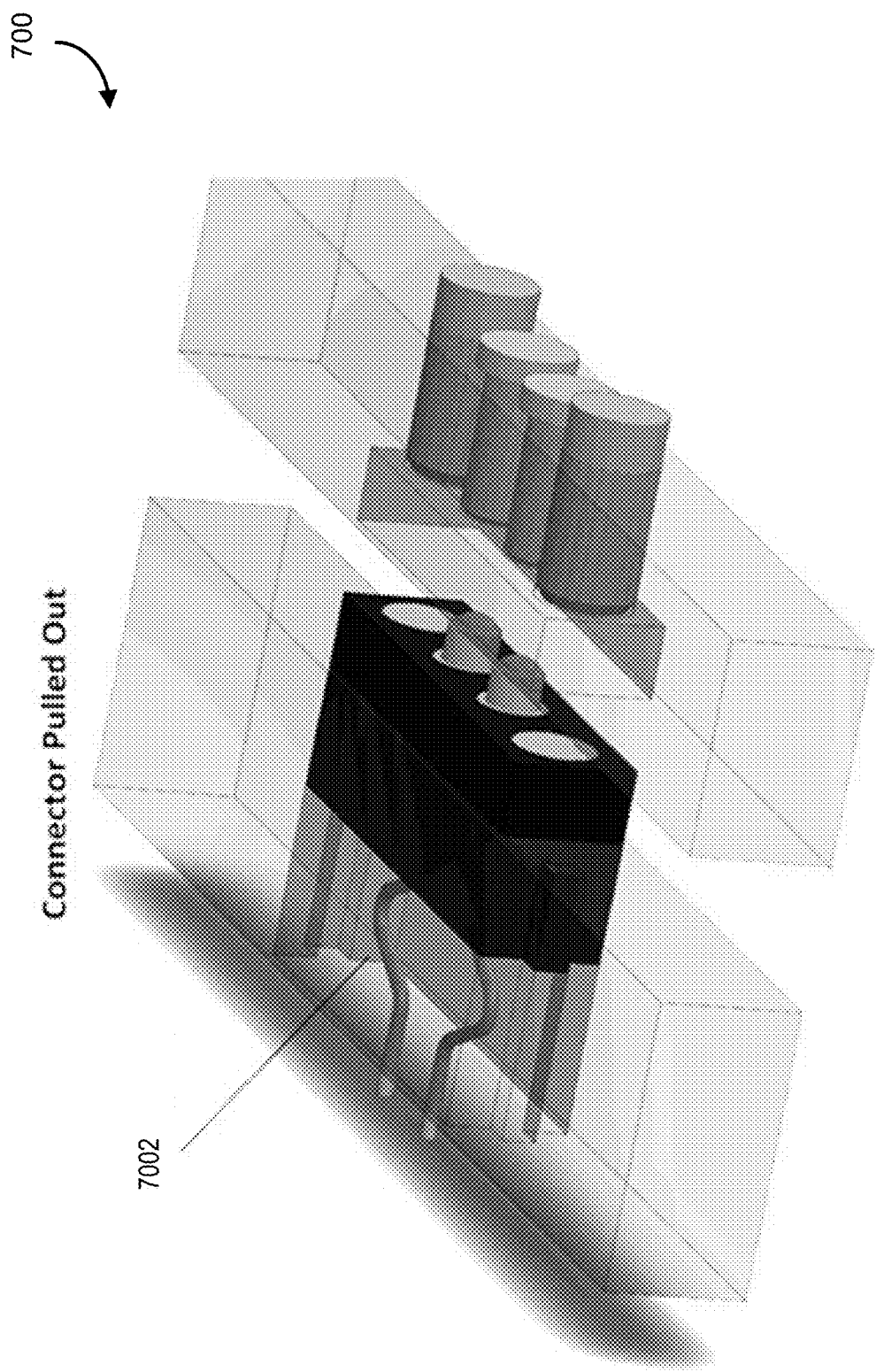
FIG. 7 is a partial perspective view of a magnetic lock construction that includes electrical connection through pogo pins, according to some embodiments.

The middle two pins in FIG. 7 are the pogo pins that create the electrical connection; the outer two pins are the magnets. Pogo pin connectors are spring loaded (springs shown at 7002), such that compression of the pin is a necessary, but not sufficient, condition for electrical conduction. Additional safety is provided to the construction such that when the pogo pins are exposed, the risk of accidental electrical shock is reduced below acceptable limits set by safety certification standards, such as those by the Underwriters Laboratories Inc.™ (UL). The electrical connector can take other forms too, such as compression connectors. The compression connector shares the feature with the pogo pin connector that compression is required to make the connector able to transmit electricity. Other connectors that do not require any compression or other actuation are also possible, like a two piece connector, conceptually similar to the connectors used in vacuum cleaners, floor lamps, battery chargers, that are plugged into a wall socket.

Although feasible, these connectors would create a visibly distinct protrusion on the lighting unit, which in applications would be an undesirable feature of the product aesthetic and usage.

Figure 8:
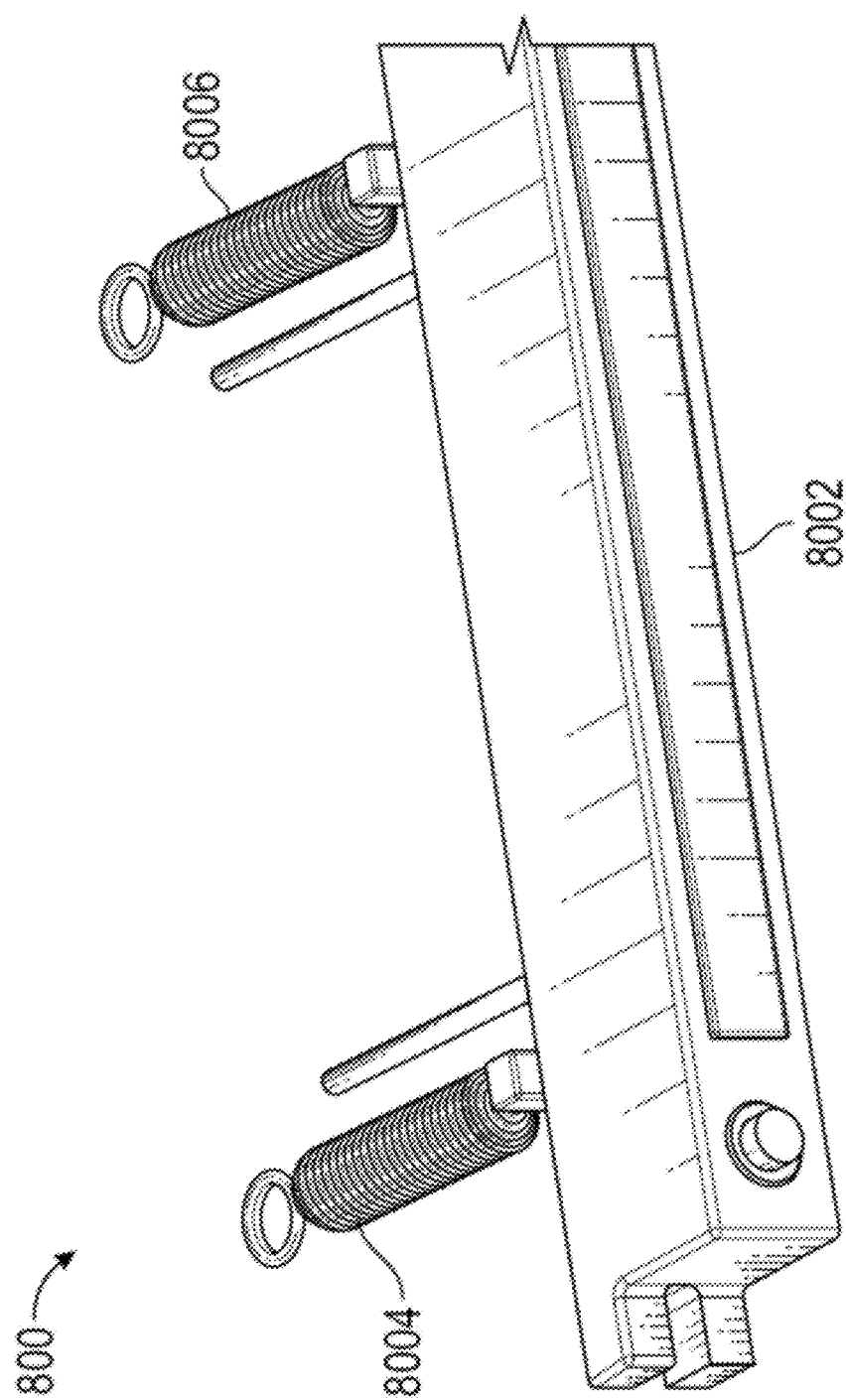
FIG. 8 is a partial perspective view of another embodiment that combines electrical and mechanical connection in one piece with springs to keep the block in a retracted position without an oppositely polarized magnet attracting the block, according to some embodiments.

Another embodiment that combines electrical and mechanical connection using springs and pogo pins is given in the illustration 800 of FIG. 8. In that case the pogo pins (or other electrical connectors) are on the ends of the block and the magnet is in the middle 8002, and the spring 8004, 8006 that keeps the block in a retracted position in the absence of an attractive magnetic force is of a helical form. The fundamental action is the same as the embodiment in the illustration in FIG. 7. The optimization considerations of magnetic magnitude, block size and spring constant as described in relation to the previous embodiment applies here as well.

Figure 9:
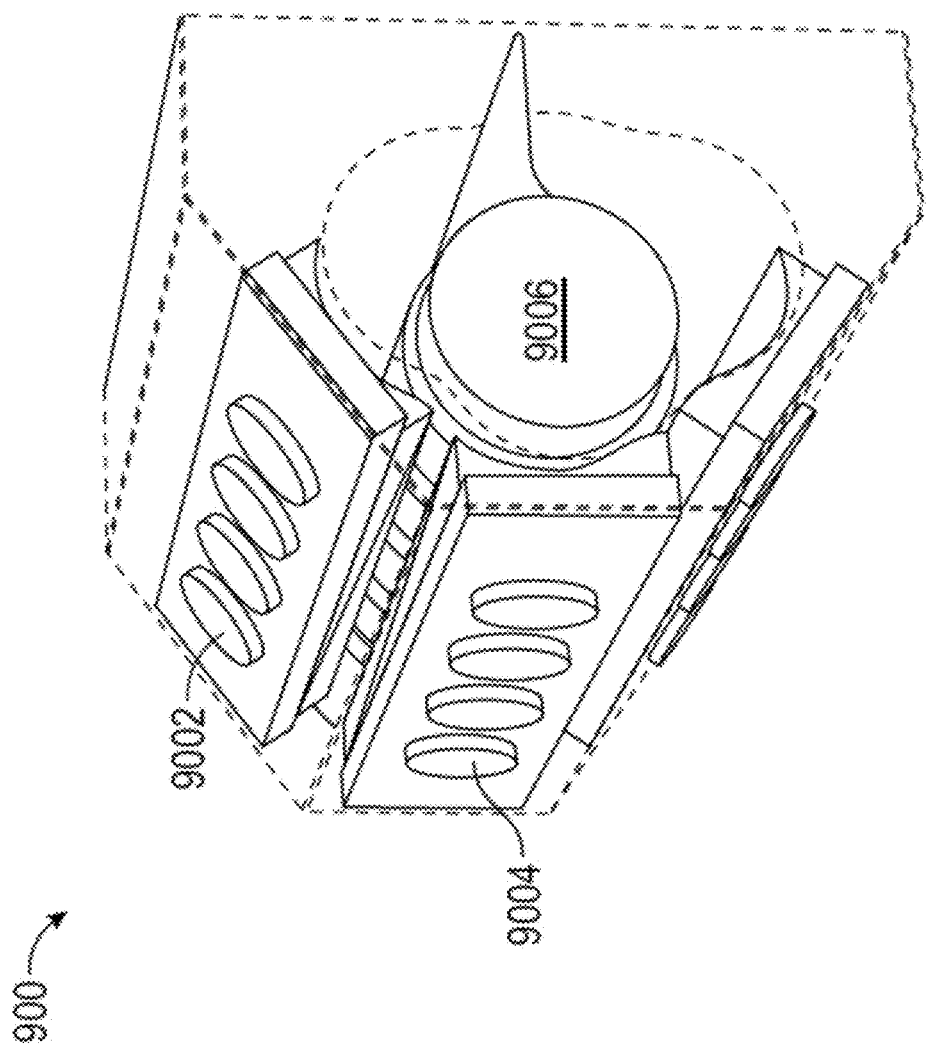
FIG. 9 is a partial perspective view of another embodiment having a magnet within the body of the light unit, which is free to roll into discrete positions, according to some embodiments. The magnet is electrically connected and provides electrical connection in each of the discrete positions.

The embodiments described above have the magnetic structure on the exterior of the product. The embodiments as described are also limited to an assembly of a pair of lighting units with the plane of the two units aligned. In other words, a three-dimensional assembly is not possible. In FIG. 9 an illustration of an embodiment is given that enables a three-dimensional assembly 900. Within the frame of the lighting unit, a hollow space is created within which a cylindrical magnet is placed. The hollow space is in the shape of three partially overlapping cylinders of a diameter equal to or slightly greater than the diameter of the cylindrical magnet.

The construction allows the magnet to roll within the hollow space as a function of the gravitational and magnetic force it experiences. By shaping the hollow space as described, the position of the magnet within the space has under typical force conditions three stable points. When another lighting unit of identical construction is brought within range of the former, the magnet in the other lighting unit will attract the magnet in the given lighting unit. The two magnets roll into the stable point where the two magnets are as close as possible.

The attractive force provides a mechanical connection of the two lighting units, which provides rigidity to both shear force and a separating force in the plane of the two lighting units. Unlike the lock embodiment the rigidity to shear force is expected to be lower since no mechanical interlocking takes place. The advantage of the embodiment is that with a relatively small space used to contain the mechanical connection components, the assembly can be made three-dimensional since two sides can be joined at an angle.

Furthermore, the surface can be completely free of any surface protrusions or indentations because the magnet is hidden within the frame, since the attractive force derives from the magnetic field induced by the magnets. In order for the magnetic field to reach outside the frame, the following factors of the design should be concurrently considered: the magnitude of the magnetic moment, the membrane width that separates the two magnets in the two lighting units, and the magnetic permeability of the material the frame of the lighting units are made of.

Considerations include: The greater the magnetic moment, the farther from the magnet there will be a significant magnetic potential, which means the membrane width can be greater. The greater the magnetic permeability of the material, the more different the field lines will travel compared to free air; there is no trivial relation to use to predict what will happen as the material is changed, since shape plays in as well. However, if the magnet is fully enclosed in a material of high permeability, such as nickel, iron or an alloy like Mu-metal, the magnetic field outside the enclosure is expected to be considerably reduced. If the magnet is fully enclosed in a material with magnetic permeability equal or close to air, such as plastic, copper, wood and aluminum, the magnetic field is unperturbed or moderately perturbed, and hence the relative separations of the pair of lighting units at which a large enough magnetic force still exists to lock the two units, is very close to the hypothetical case where the magnets are suspended in free space.

The embodiment in FIG. 9 is designed to jointly consider the selection of frame material, magnetic moment and membrane width in order to attain the appropriate attractive force between the pair of lighting units.

The interior magnet in the previous embodiment can optionally be designed to provide electrical connection as well. The illustration in FIG. 9 includes copper connectors, both on the exterior that contacts the corresponding connectors on an adjacent lighting unit, and interior ones wrapped around the magnet. The interior connectors around the magnet are connected to the electronics within the lighting unit.

The exterior connection points have an inward facing side, which connects with the copper around the magnet. As the magnet rolls into a new position because of exterior magnetic and gravitational forces, electrical transfer through another set of exterior copper connectors is enabled, while the other two contact surfaces transmit no electricity.

In various embodiments where one or more contacts are formed such that electricity can be conducted between the two joined units, data can also be transferred. The data transfer is accomplished in a serial fashion (or other fashion) by any of the methods of encoding data available in the literature.

One such method is amplitude modulation, where the amplitude of the electrical signal is modulated between two discrete values that the receiving processor or other computing device map to a binary value that is part of a binary string that encodes the data. Another such method is frequency modulation, where the frequency of the electrical signal is modulated between two discrete values that the receiving processor or other computing device map to a binary value that is part of a binary string that encodes the data.

The data can be transmitted over the connection that also transmits electrical power between units, which is substantially identical to the method known in the literature as powerline communication (PLC). The data can be transmitted over a connection dedicated to the data signal by itself. This requires an additional pin and conductive wiring to be added to the construction, but it can simplify the logical instructions that have to be executed in order to interpret the data signal.

The rate at which data can be sent over this connection is in the same range as the serial connections in the literature, which are used in computer hardware, and can range from 300 bits per second to 115200 bits per second. The connection may at the microscopic level contain imperfections or mismatches, which in turn cause noise in the signal. Standard methods of digital signal processing can be employed to reduce the impact of this for any pin construction that is able to form a reasonable physical contact. For any of the embodiments described it can therefore be assumed that the data is not altered as it is transmitted over the connection.

In some embodiments, parallel communication approaches may also be utilized.

The ability to transmit data between two connected units in the assembly means that one microprocessor or other computing device connected to the assembly at any connection point can send a string of data to, or receive a string of data from, any of the units in the assembly. If the computing device is additionally connected to an antenna, it can receive data from an external source that is not connected by wire to the assembly, and transmit that data, or part thereof, throughout the assembly, or vice versa where data generated in the assembly is sent to an external device.

Figure 10:
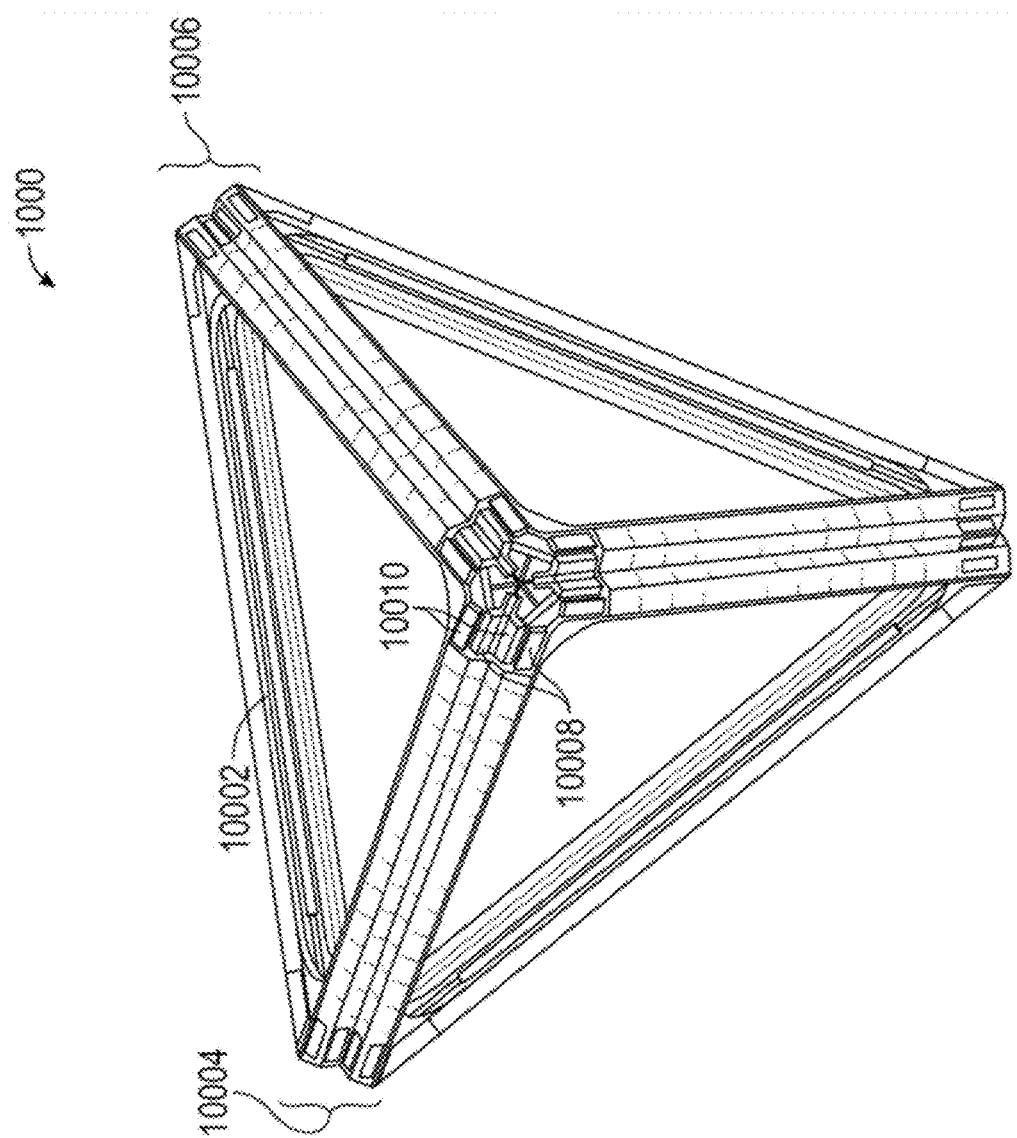
FIG. 10 is a partial perspective view of a tetrahedron assembled through a three-dimensional magnetic connector of complementary polarization, according to some embodiments. The shade of the flat magnets represents the polarization.

Another embodiment of a magnetic mechanical connection is one with exposed strips of magnets. Each magnet is mounted to the frame such that it only exposes a side with one magnetic polarization. This solution has properties similar to the embodiment described above and illustrated in FIG. 9: rigidity to separating and shear forces, although for shear force less than the embodiments that includes a mobile block. In FIG. 10 an illustration 1000 of this embodiment is shown in the application where four lighting units in the shape of an equilateral triangle have been assembled into a tetrahedron. For this to be possible, the magnets can be mounted on the lighting units such that the polarizations are compatible and without a net repulsive magnetic interactions in any of the configurations that are part of the intended use.

Each corner connection 10004, 10006 is shown with opposing pairs of magnets at each apex. Opposing pairs are used for magnetic attraction (pairs 10008 and 10010).

Figure 11:
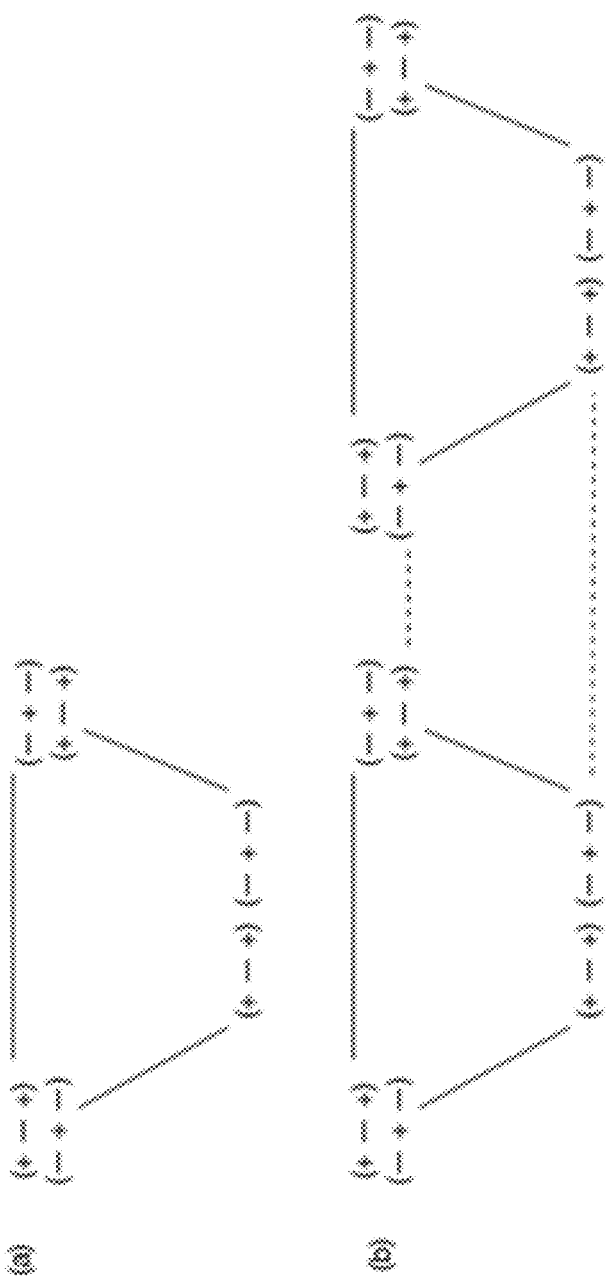
FIG. 11 is an example representation of the magnet polarization and configuration that enables all connections, including tetrahedron, without magnetic repulsions, according to some embodiments. Dashed lines indicate the sides that are in contact. As the sides are joined, either to generate a planar assembly or one with a panel in to or out of the plane of the page, only oppositely polarized magnets are in direct proximity to thus produce a net attractive magnetic force.

In FIG. 11 a representation 1100 of how the six magnets at each apex are polarized, and how they are mounted at each side is given. Each parenthesis in FIG. 11 contains three elements, which represent the polarization of the three magnets that are both part of the same apex and on the same side; the order of the elements within the parenthesis are such that the left-most element represents the top-most magnet, the middle element represents the middle magnet, and the right-most element represents the bottom-most magnet.

The description of an element as being on the left or right, or a magnet as being on the top or bottom, are arbitrary; the salient feature of the abstract representation is that the representation is ordered and maps to the ordered magnetic construction through a monotonic, and hence order-preserving, function. Furthermore, the signs are arbitrary as well, and only the relative polarization matters.

Given this representation, the symmetry properties of the design that enables a construction of a tetrahedron through the joining of any set of sides, without any sides experiencing a net repulsive force are as follows: First, the three magnets at any side and apex are polarized in an alternating fashion going from left to right in the representation. Second, the magnetic polarization of the apexes is preserved under rotations around a vector orthogonal to the plane of the lighting unit. In other words, each side is identical to the other. Third, the magnetic polarization of the apexes is inverted under rotations around a vector in the plane of the lighting unit. In other words, two units can be joined through a net attractive magnetic forces regardless if a planar or three-dimensional assembly is desired. The dashed lines in FIG. 11 illustrate which apexes are in magnetic contact.

In another embodiment the electrical and mechanical connection is created through a secondary piece of material that is inserted into two female connectors on the two sides that are joined. The secondary piece in an example embodiment a PCB bridge and is comprised of a small printed circuit board, which hence enables electricity and optionally data to be transmitted between the two joined panels.

Figure 12:
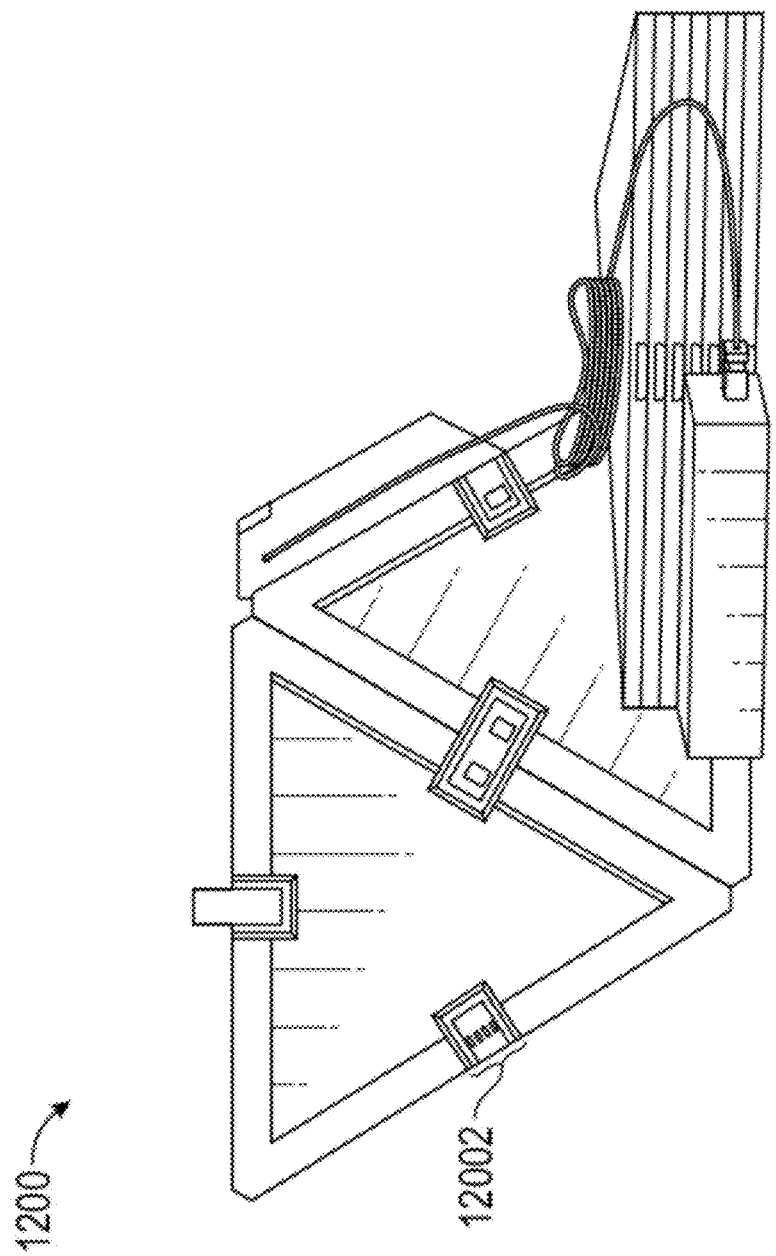
FIG. 12 is a perspective view of an example lighting unit with PCB bridge for electrical and mechanical connection between shown panel and an adjacent panel, according to some embodiments.

The female connectors can be placed anywhere and in any number on the sides, but in order to attain symmetry with respect to the mechanical force, the one connector can be on the middle of the side. Because the bridge is only a few millimeters thick, it requires very little space to integrate. It does however require the user to employ one additional step in the assembly process. An embodiment 1200 is illustrated in FIG. 12.

As shown in the example of 1200, the female portion of the connectable section of the panel may have a corresponding aperture 12002 that is designed to receive a male portion of a connector. As illustrated, there may be one or more protrusions that aid in helping ensure that a stable connection is established between the one or more panels. For example, the protrusions may be spring-loaded clips that also serve to transfer power and/or data, in addition to providing mechanical stability. The protrusions aid in biasing the male connector portion snugly in the aperture 12002.

Aperture 12002 and correspondingly the male connector portion may be sized such that a friction fit can be established, the aperture 12002 having an opening in one direction (e.g., the insertion/removal axis) and solid structural features in the other direction. The protrusions, in some embodiments, are designed to increase resistance to accidental removal when shear forces are encountered, while facilitating removal by providing a nominal resistance when a user deliberately pulls or inserts the male connector in the insertion/removal axis. As forces encountered by the assembly that are not intentionally caused by a user may be in multiple directions, this configuration may be beneficial in improving convenience of re-assembly and re-configuration of the assembly while providing some measure of stable coupling between panels when a user is not actively removing or rearranging panels.

The electrical connection can, for example, be created through a bent sheet of metal on an exposed copper pad on the printed circuit board. The metal contacts are bent in a way that is flexible to compression. As the PCB bridge is inserted into the female connector of the panel, the metal contacts partially deforms and electrical contacts to metal pads inside the female connector are created. The reverse is also possible (e.g., metal pads on the male connector, metal contacts on female). The same connection takes place on the other panel, thus connecting the two panels electrically. Because of the compression of the metal contact, a constraining mechanical force that prevents the panels from falling apart under gravitational or other reasonable perturbing force is created as well through the application of the PCB bridge. Similar to the embodiments that included an interlocking block, the PCB bridge makes the structure rigid to shear force in and out of the plane as well. The PCB bridge is in other embodiments augmented with structural components that further strengthen the bridge in order to make it robust to bending and twisting forces that otherwise can irreversibly destroy the thin board. Strength against shearing forces that may lead to bending, twisting, inadvertent movement is important in the context of reconfigurable panels. If the panels are not stable or strongly coupled, the entire assembly or parts of it could fall and or be damaged. Damaged panels may result in various safety issues (electrical risk, hazard risk).

Figure 13:
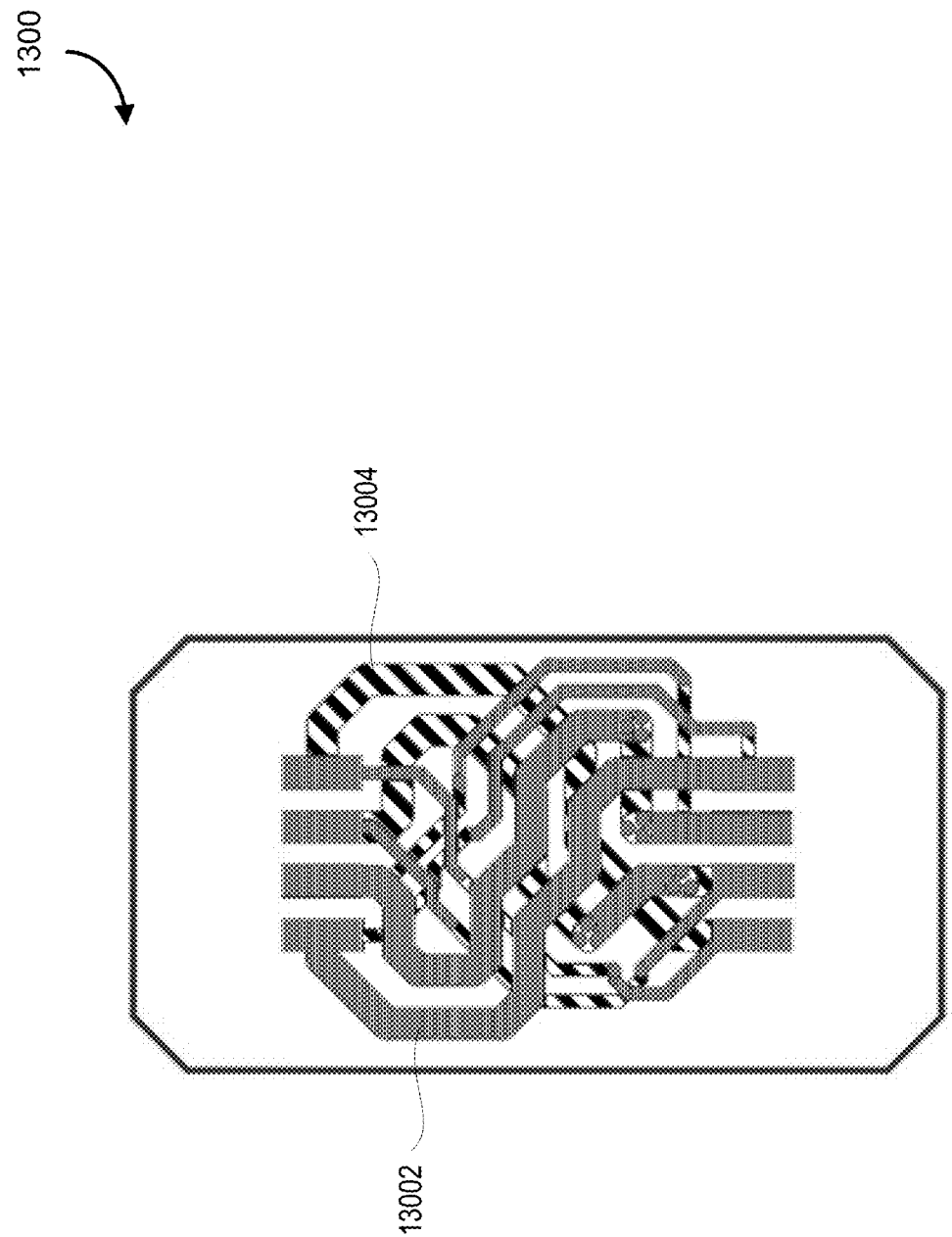
FIG. 13 is illustrative of an example embodiment of a PCB bridge for electrical and mechanical connection between shown panel and an adjacent panel, according to some embodiments. This embodiment creates four independent connections, where the different shades represent non-overlapping layers in the circuit.

One example of the structural components is one plastic ridge or a plurality of plastic ridges glued to the PCB board, either orthogonal to the side of the lighting units upon joining, or parallel to the side of the lighting units upon joining, or both parallel and orthogonal to the side of the lighting units upon joining. Another example of the structural component is a plastic case that covers all but the metallic pads from view or touch by a user in addition to adding width and hence rigidity to the bridge. The electrical connections of one embodiment of the PCB bridge is shown in FIG. 13. FIG. 13 illustrates the circuit layout 1300. This embodiment creates four electrically conductive connections.

The four connections are in the embodiment affording to the construction: power, ground, serial connection and a layout detection pin (to be described in detail below). Other embodiments can be contemplated, where fewer pins are used to afford the construction with the same set of properties as enumerated above. Other embodiments can be contemplated, where the physical layout of conductive traces are different. There may be two separate channels, illustrated using different hatch lines at 13002 and 13004.

As described, in some embodiments, the same structural and connective components can be utilized to perform multiple tasks. For example, protrusions that help bias the connector in place within the aperture can be conductive and designed not only to ensure a strong mechanical connection, but also to transfer power and/or data. Furthermore, mechanical characteristics of the connector and the apertures can be highly resistant against shear forces parallel to the connected portions of the panels, but only somewhat resistant against forces along an axis of insertion/removal. Where there is only some resistance (e.g., up to a threshold), a sufficiently strong (but not too string) connection can be made to ensure stable coupling, but also to permit easy removal and insertion by a user without the aid of tools such as screws, latches, etc. According, a force threshold can be dependent on the direction of the force (e.g. parallel).

Layout Detection, Hardware And Software

Given a physical assembly of a plurality of lighting units mounted on a wall, ceiling or other planar structure, the assembly should be mapped to a visual representation suitable for a screen, for example a touch screen on a smartphone, tablet or a screen for a laptop or desktop computer. The purpose of such a mapping is that it enables a convenient method to control the numerous variables for the luminaire in order to create, select or configure one of the many varied lighting settings. The assembly can be arranged into continuous shapes.

Without a clear representation of the structure, the user would have to individually address each triangle through a numerical or tabular representation of each lighting unit without the information of how the individual units are geometrically assembled as a whole. In order to achieve this, data should be communicated from a physical layer embodied as hardware components communicating rudimentary electrical signals, to progressively higher levels of abstraction that ultimately allows the data to be understood in units that simplifies communication at higher abstraction layers between the panel assembly and a secondary device, such as a touch screen on a cell phone, a wearable wristband, a motion detector or a digital stream of data of video, music or social media content.

This section describes hardware and software aspects of the innovation meant to address the described problem.

The basis of any method to construct a virtual representation of a given physical structure requires that each lighting unit have a unique identifier (ID). The unique ID can be assigned during manufacturing and stored in non-volatile memory that is part of the lighting unit construction. This requires the ID to be globally unique, since at the time of manufacturing it will not be known which lighting unit can be combined with which other lighting unit.

Alternatively, the embedded software can upon power up and initialization ascertain the number of lighting units and assign a locally unique ID. Without loss of generality it can therefore be assumed that each lighting unit in any given assembly of a plurality of lighting units carries a unique ID that can be retrieved by software from either non-volatile or volatile memory that is a component of either the individual lighting unit, or part of the entire assembly of lighting units.

At the coarsest level of granularity, the method includes: (1) For a given physical assembly of a plurality of lighting units, construct an abstract representation of how the units are connected. (2) Send a digital embodiment of the abstract representation over a wireless or wired connection to a device with a processor and a screen, such as a smartphone, laptop, or desktop computer. (3) The abstract representation is interpreted by software running on the processor of the receiving device and turned into a two-dimensional graphical representation of the physical assembly. The primary quality metric of the method is visual similarity of the graphical representation compared to the physical assembly. A secondary quality metric is the size of the abstract representation when stored or transmitted digitally.

Figure 14:
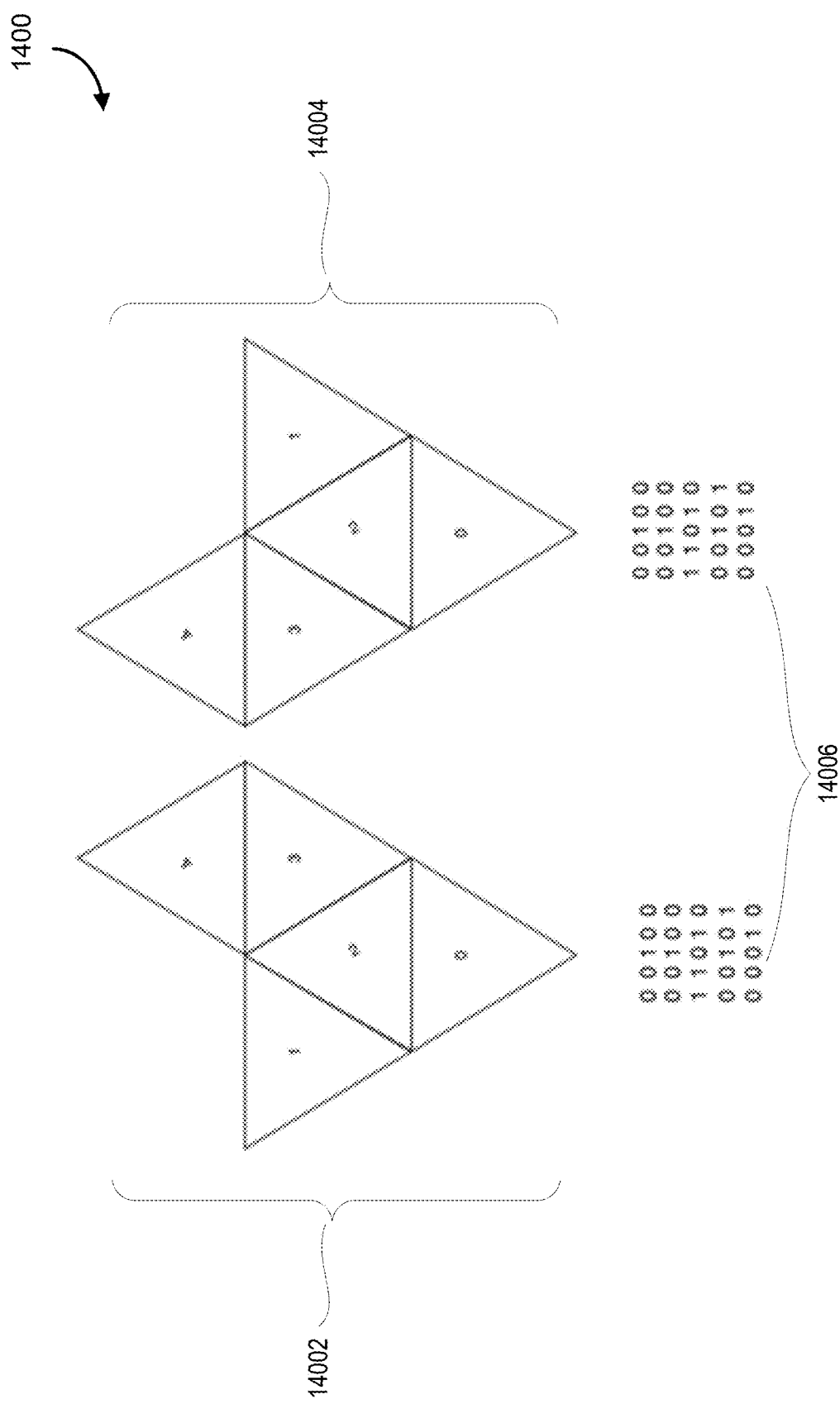
FIG. 14 includes example illustrations of two assemblies of lighting units with their corresponding adjacency matrices below the drawing, according to some embodiments. The two assemblies are mirror images of each other.

The method will be described by way of example. FIG. 14 is an illustration 1400 of two assemblies and their associated matrices.

In the left hand side of FIG. 14 a drawing of an assembly 14002 is given. The unique IDs have been arbitrarily set to 0, 1, 2, 3 and 4, without loss of generality. Below said drawing is the corresponding adjacency matrix 14006. This matrix is constructed such that the elements in the first row denote if the lighting unit with ID 0 is connected to lighting units of ID 0, 1, 2, 3 or 4, respectively. For this representation, connectivity to itself is not defined, and is hence set to null by definition. If a connection exists, the corresponding matrix element is set to unit value. The matrix elements can take values from any binary representation, such as TRUE and FALSE, arrow up and arrow down, filled disked and empty ring, one and zero etc. The adjacency matrix is a concept that is contemplated relating to graph theory. Equivalent representations of an adjacency matrix, in particular an adjacency list are contemplated. The shortcoming of using the adjacency matrix as the abstract representation of the physical assembly is that it is invariant to the symmetry operations: translation, rotation, mirroring. The first invariance is not a problem to the problem at hand as long as the graphical representation is not intended to visualize the position of the physical assembly relative to other objects in a room or other space.

The invariance to rotation is not a problem in case the user can rotate the graphical representation through a touch interface, which is a simple operation commonly employed in contemporary applications of touch screen interfaces. Alternatively, the lighting units can contain an accelerometer which determines the direction of the gravity force vector. The presumed orientation of the graphical representation would then be such that the gravitational force vector points downwards on the screen. The invariance to an in-plane mirroring operation is not a concern either, since also the graphical representation is identical under that operation. The most problematic invariance is mirroring orthogonal to the plane of the assembly. On the right-hand side of FIG. 14, the mirror image of the assembly on the left-hand side of FIG. 14 is given.

This is a distinct physical assembly; still it has an identical adjacency matrix 14006 because of the mirror invariance. Hence, if the abstract representation is the adjacency matrix, it is possible that the physical assembly looks like the left-hand side of FIG. 14, while the graphical representation looks like the right-hand side of FIG. 14. This would confuse a user and hence fail to meet the primary quality metric defined above. One possible solution is to enable the user to mirror a graphical representation by pressing a button or performing some touch or swipe command distinct from a rotation touch or swipe command. However, that adds a required non-trivial input from the user, which rarely are employed in contemporary applications of touch screen devices.

In order to break the invariance to mirroring symmetry operations, some feature must be added to the representation that is not invariant to mirroring. One such feature is handedness or chirality, which is general concept commonly used in the theory of molecular structure, particle physics and abstract topology. In FIGS. 15A, 15B, and 15C drawings of physical assemblies 1500A, 1500B, and 1500C, identical to the ones provided in FIG. 14 are shown. To each lighting unit an arbitrary but distinct index has been assigned to each side of the triangle, in the example a, b, and c. Furthermore, the assignment is made under the convention that going from a to b to c creates a clockwise motion.

Figure 15:
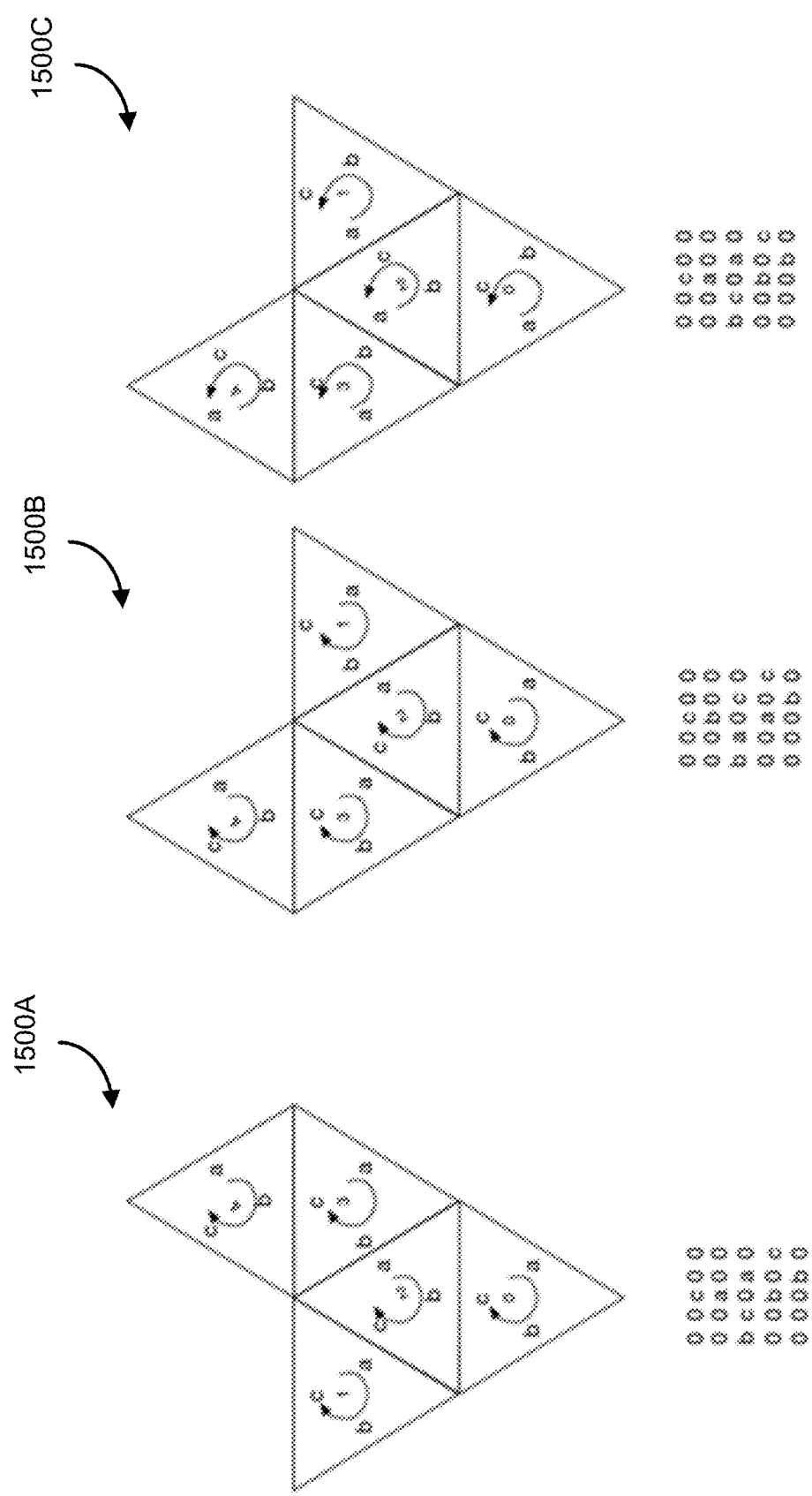
FIGS. 15A, 15B, and 15C provide example drawings of assemblies of lighting units along with side indexing that conforms to the clockwise index order, except the right-most drawing, according to some embodiments. The chiral adjacency matrices are given below each drawing.

The abstract representation of the physical assembly is given as a matrix very similar to the adjacency matrix, thus referred to as the chiral adjacency matrix. The first row in the chiral adjacency matrix at the left-hand side of FIG. 15 represents that lighting unit 0 connects to lighting unit 2 via side indexed c in lighting unit 0. The third row of the same matrix, for example, represents that the lighting unit 2 is connected to lighting unit 0 via its side indexed b, connected to lighting unit 1 via its side indexed c, and connected to lighting unit 3 via its side indexed a. The physical structure in the middle of FIG. 15 is mirrored, but uses lighting units that follow the clockwise index order. The two abstract representations are similar, however, because the connectivity of lighting unit 2 and 3 in particular, it is impossible to make the abstract representation identical for the left-most and middle assembly in FIG. 15. In the right-most drawing in FIG. 15, the left-most drawing has been mirrored, including the side indices. The abstract matrix representation is identical, however, the clockwise index order is broken. In other words, as long as the software on the receiving device implements the clockwise index handedness convention, the graphical representation of the physical assembly will break the invariance to mirroring and thus preserve the handedness and not require a manual mirroring transformation by the user as contemplated above. The representation is still invariant to rotation and translation. However, as argued above, these are less problematic invariances to the primary quality metric.

A distinct method to obtain a graphical representation given a physical assembly is to use the camera or other photosensitive component on a smartphone, laptop or desktop computer. By holding the camera up to the physical assembly, then initiate a sequence where lighting units switch on and quickly off in the same order of the unique identifier. Since the software of the smartphone app has access to the unique IDs, the recorded optical variation provides a mapping between the placement of the lighting units and their ID. As long as the optical device is kept relatively fixed during the sequence, the recorded data also provides sufficient information to derive orientation and relative location of the lighting units. A feature detection method can be applied to determine where in the image at a given time the illuminated feature exists.

One embodiment of the hardware design at the physical layer to practice the described innovation for layout detection and graphical representation is as follows. Each side of each panel is equipped with the following output pins: power, ground, bidirectional serial communication and a dedicated layout detection pin. See FIG. 13 for an illustration of the circuit on the PCB in one such embodiment. The power pin supplies electrical current from a power source, such as the electrical grid or a battery, to all panels in order to drive DC over the p-n junction of the LEDs, as well as to power any digital hardware part of the construction.

The power is connected in parallel over the entire assembly of lighting units. The ground pin provides the standard connection to the electrical ground reference point. The serial bidirectional pin enables data to be transmitted between lighting units. The data can transmit control commands across the lighting assembly in order to adjust relative drive currents through, for example, a Pulse Width Modulation (PWM) method, or other current modulation methods. The serial connection can communicate other data represented in digital form between panels as well.

Examples of such applications include: audio signals detected by a microphone connected to the assembly to a receiver that optionally interprets the meaning of the audio signal through natural language processing (NLP) software; motion signals detected by a motion sensor using passive IR or microwave signals to scan a room for motion of a body sufficiently large to be discovered by the radiation, which subsequently is interpreted by software to determine if the motion should trigger a change of the lighting or another event, such as an alert sent to a remote device; audio signals to a loudspeaker, which interprets the digital signals sent over the serial connection into vibrations of a membrane that are perceived as sound, which can be used to equip a space with local sound and audio that can give guidance to the persons occupying the space, jointly with a light signal.

Figure 16:
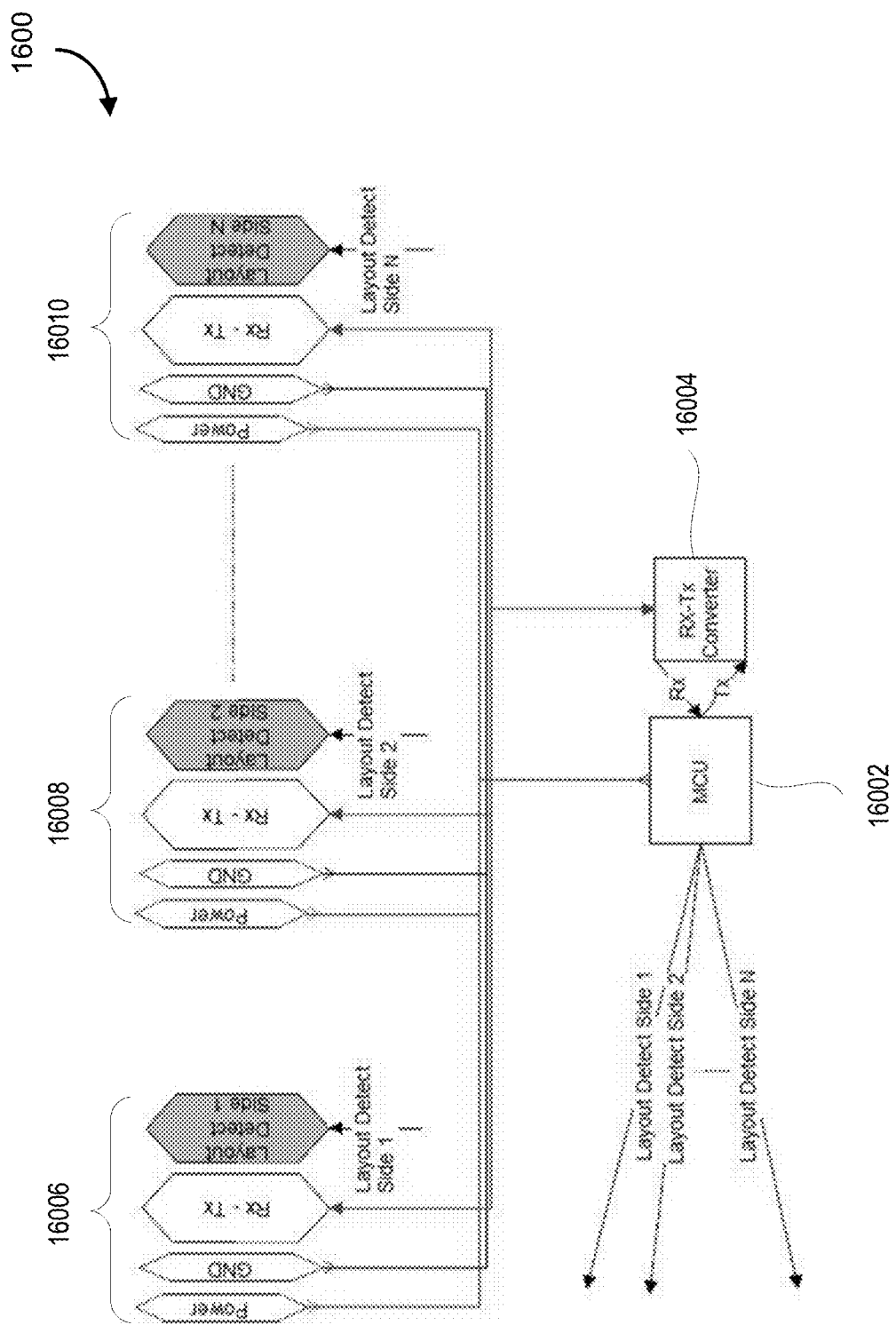
FIG. 16 is an example schematic illustrative of the pin connections at any given side of a lighting unit and how they connect in an assembly to a microcontroller, according to some embodiments.
Figure 17:
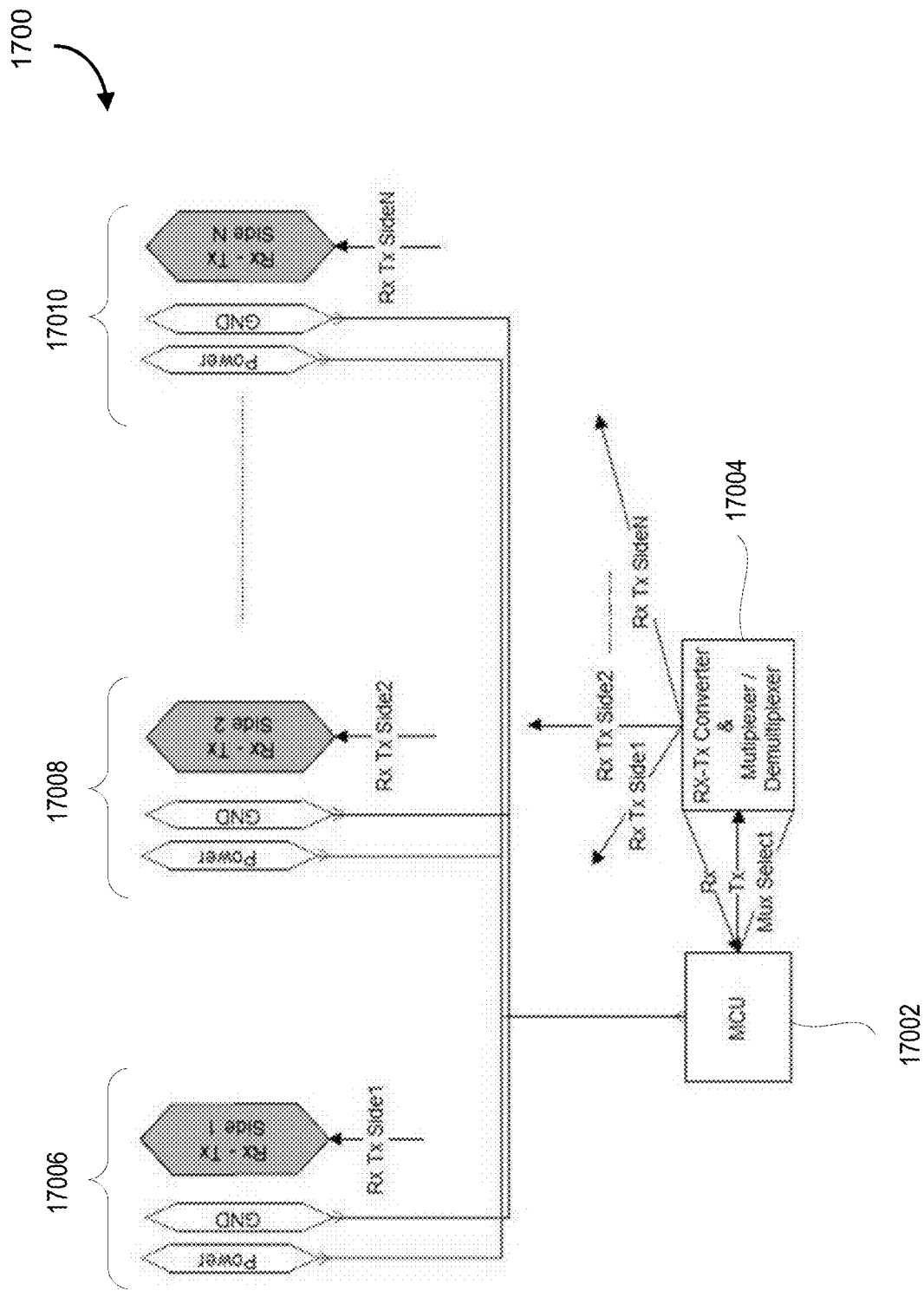
FIG. 17 is an example schematic of representation of the pin connections at any given side of a lighting unit and how they connect in an assembly to a microcontroller, according to some embodiments.

Other applications where a digital signal is sent across serial connections to auxiliary hardware physically attached to the lighting assembly can be contemplated. The layout detection pin transmits an electrical signal that represents the unique side index described above. The electrical signal can for example differ in voltage between sides, and through a lookup table stored in non-volatile memory be mapped onto the abstract index. For example, a voltage of −5 mV detected through any means well-known in the art by the microprocessor may be understood to mean side "a" of a triangle lighting unit. The pin connection hardware is represented in FIG. 16 and FIG. 17. In FIG. 16, a microcontroller 16002 is shown alongside communication interface 16004, that is in communication with various panels 16006, 16008, and 16010. An alternate example is shown in FIG. 17, where instead of having a receiver/transmitter at each panel, layout detection may be inferred by the MCU as signals from each of the panels 17006, 17008, and 17010 may be multiplexed together.

In addition to the method described above, the identical function of communicating the index of the side can be performed using a reduced number of pins. In particular, the layout detection method can be achieved by applying a multiplexing relay to transmit a signal between lighting units that enables an interpretation to an index in software. Additionally, the number of pins can be further reduced by combining power with communication. The addition of a digital signal to a harmonic or partially harmonic electrical current is known in the art and has been applied in powerline communication (PLC).

Identical or similar signal processing technology can be applied to the current invention in order to reduce the number of hardware pins, and instead increase the logical processing of the power signal in the software. Additionally, the number of pins can be further reduced to one or zero should wireless power and wireless communication be employed for serial communication, layout detection and power transmission between lighting units. In embodiments that do not use a PCB bridge, rather a block that enters an indentation through magnetic attraction, or an embedded cylindrical magnet, identical hardware technology is used to electrically connect lighting units in order to enable the transmission of data and layout information between units. Regardless of the method to connect power and data to and from the lighting units and any auxiliary devices, as long as the data transmitted conforms to the chiral convention described above, the physical layout can be detected and accurately mapped to graphical user interface barring the limitations described in the above section.

The method described allows lighting units to be added dynamically to an already existing assembly along with an appreciably instantaneous update of the graphical representation. The chiral adjacency matrix described along with FIG. 15 can be updated as a new lighting unit is connected through any of the physical connections described above.

The action to update the matrix can be triggered through a discovered change of the signal received through the layout pins. The status of the layout pins can be regularly polled by a microprocessor somewhere in the assembly. The clock in a processor enables software to poll for changes in the layout pins every second, every 100th millisecond, every tenth millisecond or any time-interval set as the invention is reduced to practice. A too frequent polling, and the processor is overly active, which may slow-down other operations or require a far from optimal power consumption by the processor. A too infrequent polling, and the updating of the graphical representation will be lagging and may confuse the user if the physical connection between lighting units indeed formed as intended.

The action to update the matrix can alternatively be triggered through an interruption signal sent by the layout pin as it receives a non-zero signal. The interruption signal is received by the processor and any current event that is handled is interrupted in favor of the matrix update routine. The advantage of an interruption implementation is that the state of the pins does not have to be regularly polled, thus conserving processor power. The disadvantage of an interruption implementation is that it requires a more complex logic to be implemented.

In particular, the priority of the interrupt must be handled appropriately in order to not cause the control logic to create a conflicting command or corrupting digital memory as multiple processes run or attempt to run concurrently. Input and output methods described in the art can be used in embodiments of the current invention in order to handle these type of operations for updating the graphical representation of the physical assembly.

Non-Limiting Illustrative Embodiments

The following section describes non-limiting examples of embodiments of the innovation and how its application addresses the lighting design problems described above.

The configurable (e.g., highly configurable) nature of the lighting unit enables the user to build a custom luminaire that in turn can adopt a number (e.g., a large number or a very large number) of states. For example, in a luminaire that consists of ten lighting units, where each apex has one red, one green and one blue string of LEDs, with the drive current to each string being independently controlled, and where each apex is independently controlled from all other apexes in the lighting unit, and each lighting unit is controlled independently of every other unit, and the drive current to each string of LEDs is discretized in 255 unique values, the total number of optical appearances equals a value with over two hundreds digits when represented in the base 10 numeral system.

The variation is not only with respect to the nature of the optical spectrum that is emitted, but the variation is also with respect to the spatial properties of where the light is emitted. This enables a plurality of functionally and visibly distinct lighting states, and equally important transitions over time between functionally and visibly distinct lighting states.

An automatic variation of the hue, saturation and intensity of light over an assembly of lighting units can be attained in a number of ways, given a physical assembly and its associated abstract representation through the hardware and software design described above.

The lighting setting of any given lighting unit can in embodiments where the entire surface of the lighting unit adopts a uniform or nearly uniform color, be represented as a vector of three elements, each element representing either hue, saturation and brightness, or RGB values or CYMK values; bijective transformations between different color representations, hence the choice of mathematical representation is non-limiting for the application to be described. A simple dynamic lighting schema is obtained by independently and randomly selecting the three elements of the vector for each light unit at some pre-set or random frequency.

This embodiment creates a random (or appears to be random, pseudo-random, or patterned) visual appearance where lighting units switch in a non-continuous manner between color and brightness appearances.

Another embodiment assigns one lighting unit in a given assembly as the source, which selects its three elements as described above. The other lighting units acquire the value of their corresponding vectors through a diffusive process. The lighting units in direct proximity to the source unit adopt identical vector values as the source following a pre-set delay. The lighting units in direct proximity to the lighting units in direct proximity to the source unit subsequently adopt the identical vector values as the source, following an additional delay. This process continues until all lighting units part of the assembly have acquired the visual appearance of the source.

This embodiment still produces non-continuous transitions between points in the chosen color space. In order to make this process continuous to a human observer, the transition between two color points for any lighting unit acquired in either of the two ways described so far, is done through a continuous stepping of an interpolation function in some embodiments. The interpolation function can be linear, or a polynomial function or a spline interpolation. The speed at which the interpolation function steps from start to end point is a parameter of the design. In some embodiments the vector elements that are selected are constrained, thus reducing the degrees of freedom that are dynamically explored. The constraint can for example be that the brightness remains constant. Only hue and saturation changes in these embodiments.

The constraint can for example be that the hue and brightness are constrained to some set values. Only the saturation of the given color changes in these embodiments, which is suitable for applications where only a set kind of color, such as red, green, blue, purple, is desired. The constraint can for example be that only points on the black-body curve are selected, thus limiting the explored space of colors to white light. In some embodiments the source lighting unit is not jumping between points in color space, rather continuously transitions between nearby points in the color space. This too makes the transitions appear smooth in terms of color and brightness, or color or brightness, to the human observer.

The choice of method to smoothly explore the color space can be a selection from a subset of points stored in volatile memory, selected either by a user through a touch-screen interface or through a pre-set number of options. The method can also be a random walk where each new point is selected through a small and random adjustment to the current point. The method in which a vector setting is spatially transferred from one to neighboring lighting units can also follow any of a plurality of selected or pre-set methods. Another method uses the coordinates of the graphical representation of the assembly to compute the principal component of the physical assembly with the greatest eigenvalue. The spatial coordinates of the lighting units in the assembly are then projected onto the dominant principal component. This operation orders the lighting units according to their placement along the dominant principal component.

Figure 18:
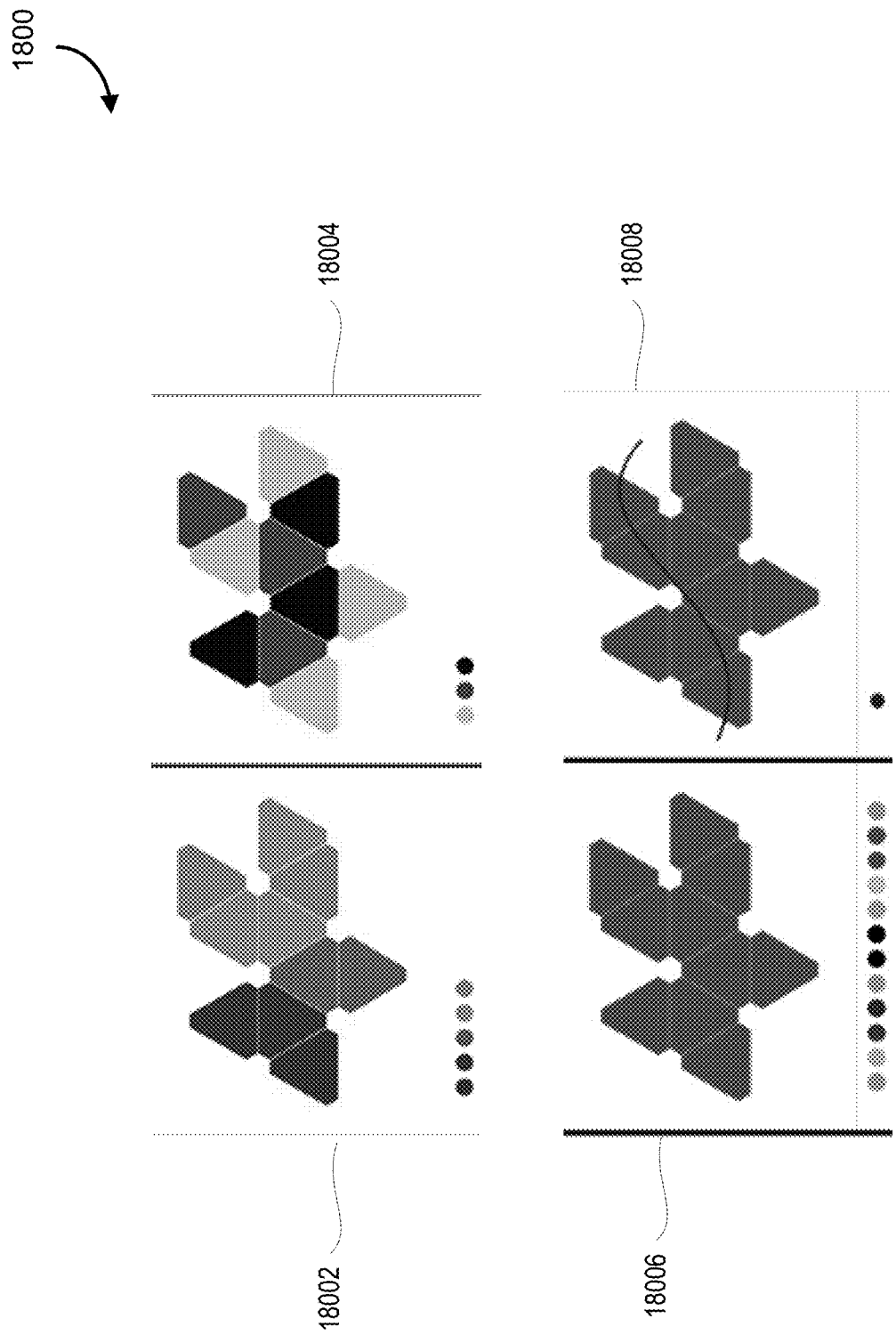
FIG. 18 is illustrative of interfaces that are used to create visually pleasing and calming dynamic variations across space and time of a specific embodiment of a lighting unit assembly, according to some embodiments.

This order is used to order at what time a given panel acquires a source color. These embodiments all have in common that they generate all or some of the aspects of the visual appearance in a random manner in order to produce a visually pleasing, calming, exciting or attractive to the human gaze lighting designs. Color variations of these kinds are illustrated in FIG. 18. In FIG. 18, illustrations 1800 of different protocols are shown in various screenshots 18002, 18004, 18006, and 18008. Each of these show different options for controlling visualization for a user. For example, a user is able to pick colors from a palette, assign colors to specific panels, provide a path through which transition effects can occur, provide a "wheel" of colors that the assembly cycles through, etc. As illustrated in the screenshots, the layout detection can be advantageously utilized in the rendering of the assembly on the user's graphical user interface or in the generating and controlling of visualization effects.

The variations of the lighting can follow protocols without a random component, and rather simulate specific types of lighting or embody some set function where a random variation is undesirable. Illustrative embodiments of this kind are given next.

An illustrative embodiment includes simulated sunrise and sunset. The transition of daylight that humans have evolved to includes variations in where in the sky the light predominately emanates from as well as the properties of the optical spectrum. In the evening the sun is low and in line with one's eyes and it has an amber or red appearance, because the increased Rayleigh scattering implied by the molecular composition of the lower levels of the atmosphere, which removes virtually all blue light. In the middle of the day the sun creates a light from high above one's eyes at a high intensity and with more blue light in the light mixture. This description includes variations in intensity, optical spectrum and locus of the light. These are all properties that can be recreated in an integrated manner at an arbitrary accuracy in the current innovation. Through an installation of lighting units with at least non-zero variation along the vertical axis of the space, the locus of the light can be adjusted since the relative coordinates of the lighting units are known.

The variation of color coordinate and brightness is controlled through adjustment of the drive current to the plurality of visibly distinct LEDs in the lighting units in ways described above. The rate of change between spatial and spectral start and end points can be governed either by a virtual time or a real-world time retrieved from a secondary device or from an application programming interface to a clock available on the WWW, such as a highly accurate reference atomic clock.

Another illustrative embodiment includes way-finding in an emergency. The use of moving light to guide people in an emergency, such as fire, may be contemplated. In some other approaches, this is an LED strip attached to the floor or the lower parts of the wall, where each LED is switched on and off such that it creates the appearance that light is moving in one direction along the strip.

The contrast between the illuminated LED when powered on and the darker LED when powered off create the appearance of motion. In some approaches the advantage of using the contrast between LEDs of different optical spectrum is contemplated. The background light, against which the apparently moving light is contrasted, can be white light, and the apparently moving light can be red light. The potential advantage of this configuration is that the white background light provides general illumination, while the red moving light creates the appearance of movement and hence aids with way finding. Other examples of background and moving light are conceivable, as long as the color contrast is sufficiently high. Some embodiments include variations in intensity, optical spectrum and locus of the light, properties that some embodiments can vary in an integrated manner.

An illustrative embodiment includes high brightness surfaces to regulate seasonal affective disorder (SAD) or other health condition. The levels of the serotonin hormone in the brain depends on access to sunlight and in particular that with increased luminosity the serotonin levels increase.

This relation has been exploited in creating specialized lamps and rooms for individuals that experience SAD. With the luminaire described, because of its high surface area, adjustable light spectrum and ability to program to individuals, it can be used for this application when needed, but reconfigured for general lighting, mood lighting or similar when the therapeutic application is done. Because of the software integration of the luminaire, the tuning can furthermore be done automatically based on real-time biometric data that are transmitted using a wearable device.

These devices are measuring properties of the person wearing it, such as heart-rate, heart rhythm, brain waves, speed of walking, blood pressure, eye movement, arm movement, breathing frequency and rhythm. Through a software abstraction as described in the background, the exact nature of how the data is measured is not limiting to the application described. As long as the data on the biometrics are transferred in a standard format at a higher abstraction layer, the processor controlling the lighting units can obtain the value and through a pre-set table, or a learned parametric function, map the measured biometric to a desired lighting state, able to either enhance a good health state of the human in the space or modulate a potentially detrimental health state through visual sensations created by the assembly of lighting units. The visual sensation can include vertical, horizontal and other spatial variations, in addition to hue, saturation and brightness.

An illustrative embodiment includes visual enhancement of rhythmic or emotive audio signals. Audio signals can create rhythmic sensations and in a given cultural context evoke emotions. Lighting has similar abilities. The current invention enables embodiments where a digital audio signal and optionally metadata pertaining to audio genre, beats-per-minute, artist, user keywords or other classifications, are obtained by the controlling processor.

Through a table, genre and beats-per-minute can be mapped to a dynamic or static lighting state. For example, a song perceived as sad in a given cultural context, such as Turning Tables by Adele, Utsusemi by Takanashi Yasuharu, or the Moonshine Sonata by Beethoven, could through a metadata field, that is categorizing the mood of the song, be visually represented and emotionally strengthened by a pale blue light with units of higher saturation diffusing between lighting units in a rate proportional to the beats per minute. For example, a song that contains transitions between slow parts and rapid and powerful and excited parts, such as This Love by Pantera, Mont. by Frank Zappa, or the Summer violin concerto by Vivaldi, could through an method that infers changes to rhythm or amplitude, change the brightness and hue as the audio changes, in particular to further emphasize the transitions in the song. The method can in some embodiments be a discrete Fourier transform on a subset of the digital audio channels to infer rhythms and beats, or a predictive method, such as decision tree, neural network or support vector machine that is a learned method to infer subjective sound properties from relative or absolute properties of the digital audio channels. The audio signal in this embodiment is obtained from a software interface, but it is contemplated it can also be obtained from an auxiliary microphone that record audio variations in the space where the lighting assembly is installed.

Figure 19:
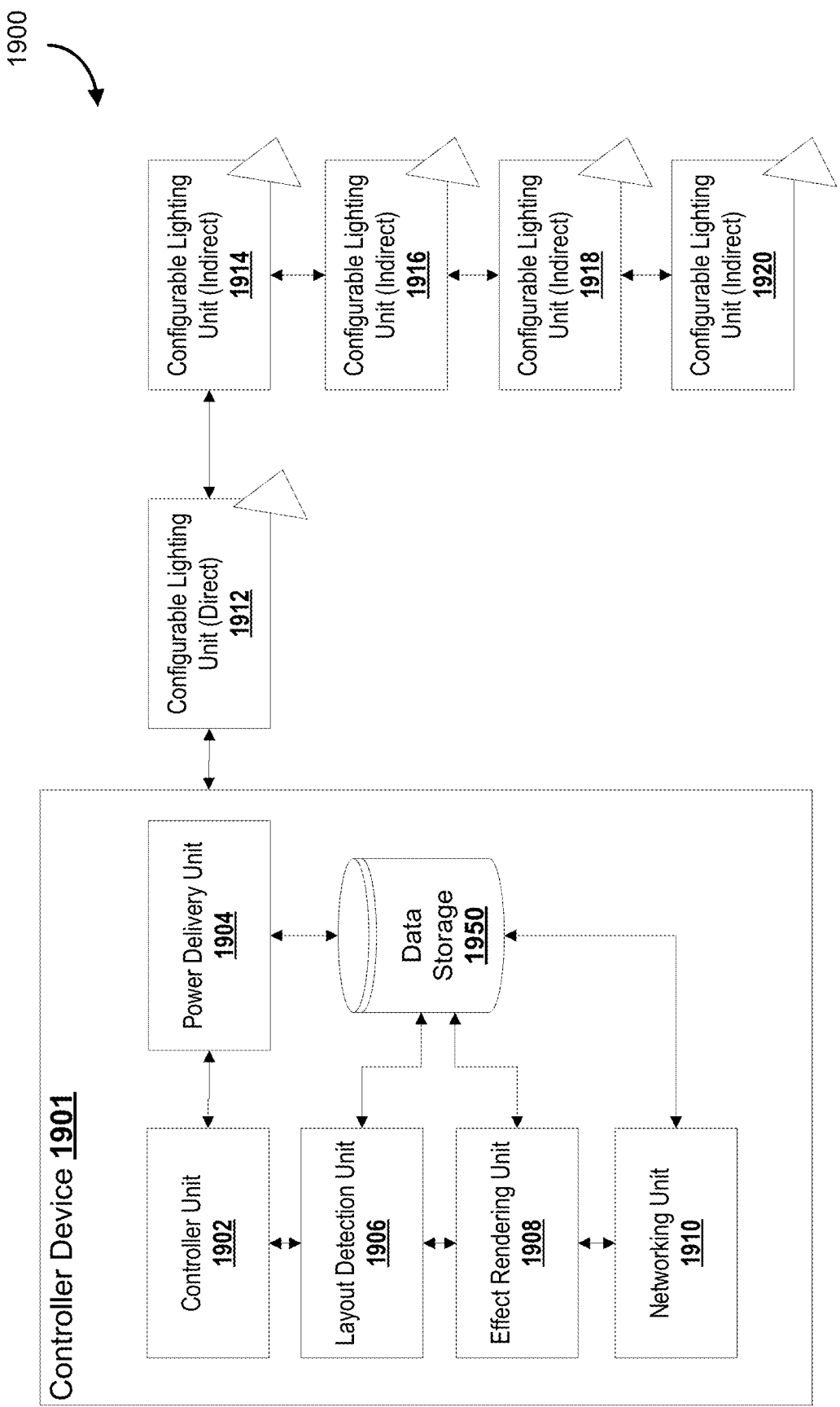
FIG. 19 is a block schematic illustrating components of a system, according to some embodiments.

FIG. 19 is a block schematic diagram 1900 illustrating components of a system, according to some embodiments.

A lighting device may be provided wherein there is a controller device 1901 that provides various command and control signals to various configurable lighting units 1912, 1914, 1916, 1918, 1920. In this example, only one of the configurable lighting units 1912 is connected to the controller device 1901.

Controller device may include various units, which may be implemented by way of physical circuitry, systems on a chip, field programmable gate arrays, microprocessors, computer readable media, etc., and these units include controller unit 1902, power delivery unit 1904, layout detection unit 1906, effect rendering unit 1908, networking unit 1910, and data storage 1950. These units cooperate with one another to provide various lighting effects across configurable lighting units 1912, 1914, 1916, 1918, 1920, such as visualizations, transitions, selected activations of individual lighting units, etc.

There may be more configurable lighting units and configurable lighting units 1912, 1914, 1916, 1918, 1920 are shown as examples. These configurable lighting units can be remove-ably coupled together using one or more connectors, the plurality of configurable lighting units forming one or more continuous shapes that are reconfigurable through re-arrangement of the plurality of configurable lighting units. These continuous shapes may be shapes pleasing to the eye, and users may seek to rearrange, move, add, remove lighting units as they see fit. The system allows for flexibility in implementation of the shapes, and in some embodiments, is designed for "hot swapping" of lighting units. Each of the lighting units 1912, 1914, 1916, 1918, 1920 and controller device 1901 can be connected to one another by way of specialized connectors, which are specifically designed to provide (1) mechanical stability, (2) power propagation, and/or (3) signal propagation. Each of the lighting units 1912, 1914, 1916, 1918, 1920 can be individually controlled to modify characteristics of lighting being provided. For example, lighting may change from a illumination level, a color, an effect (e.g., blink), and so forth.

The connectors can be male or female, or a combination of both. In some embodiments, the lighting units 1912, 1914, 1916, 1918, 1920 each have corresponding apertures that fit with connectable subsections, and each of the lighting units may have multiple connectable subsections so that there is flexibility in placement of connections. The connectors are designed for cooperation with structural characteristics of apertures so that they can be stable, most importantly, in a shearing direction (or directions other than the directions of insertion and/or removal), and secondly, to provide some level of resistance in the direction of insertion/removal (e.g., by way of biasing protrusions).

The connectors provide removable coupling. Not all embodiments require physical connection, per se. For example, a magnetic connection over the air may be possible, with power, data, etc., transmitted via induction or other wireless means. However, it is useful to have the removable coupling only resist up to a particular threshold of force before permitting an uncoupling, so that users are able to operate the removal by their bare hands without the aid of equipment, or removal of latches, complicated fasteners, etc. This is helpful where speedy set up and delivery is important (e.g., in a nightclub, a moving assembly, a stage set).

The power delivery unit 1904 may be an AC or a DC source, and provides power to a subset of lighting units (one is shown here), which then propagate power to the other lighting units by way of their interconnections. Control signals are also propagated accordingly such that the lighting units can cooperate in rendering pleasing visual effects. The power delivery unit 1904 may determine the amount of power to draw from a power source, and in some embodiments, may actively control the drive currents that are provided to the lighting elements of the one or more lighting units. Various aspects of power flow can be controlled, for example, a total current, a total voltage, an overall power, etc. Power delivery unit 1904 may also be configured to operate in various resting modes to conserve electricity.

Layout detection unit 1906 may operate in cooperation with data storage 1950 to maintain one or more data structures holding representations of how the system has detected the configurable lighting units to be oriented or coupled to one another. This layout may be maintained over a period of time using data structures that utilize representations apart from (e.g., irrespective, other than by) of rotation, translations, etc. to reduce overall processing and memory requirements (in some cases, the available storage in storage 1950 is constrained). The layout detection unit 1906 may receive various stimuli propagated through the various interconnections, such as interrupt signals representative of a unit being added or removed, etc., and these interrupt signals may be generated by the units themselves or by neighboring units detecting a change. The layout detection unit 1906 may also maintain a graph representation of the specific interconnections between labelled edges/vertices of lighting units such that it can utilize computer-based pathfinding techniques to maintain one or more efficient communication paths (or identify potential loops) in sending signals to the one or more lighting units. In some cases, the layout detection unit 1906 may be considered a geometry monitoring unit or engine.

The layout, for example, may be maintained as linked list data structures suitable for storing graphs, or specially configured matrices that are updated periodically based on modifications to the layout. In a specific example, the layout detection unit 1906 may be configured to perform derivations of an array of integers based on data indicative of coupling characteristics between individual configurable the assembly through a set of one or more physical connections, such that any two potential assemblies that are geometrically distinct irrespective of translation or rigid-body rotation generates distinct arrays of integers, and such that any two potential assemblies that are geometrically indistinct following translation or rigid-body rotation, generates identical arrays of integers.

Layouts and physical arrangement can also be represented by way of an adjacency matrix, an adjacency list, and a distance matrix, among others, and a coordinate dictionary based be maintained at least on the connected graph system. Coordinate dictionaries are useful in identifying specific lighting units to send instructions to.

The lighting units, in some embodiments, have identifiers assigned to them by the layout detection unit 1906. Vertices or edges of the units may also be identified. In other embodiments, lighting units are provided with hardcoded identifiers when manufactured. In some embodiments, connectors may be assigned identifiers, or have hardcoded identifiers when manufactured. These identifiers, for example, may be indicative of the capabilities available on the lighting units or the connectors.

Automated graph traversal approaches can be utilized to identify neighboring sides, connectors, etc. For example, the ordering of the portion of the index that denotes the side of the lighting unit can be a gradual increase of the index as neighboring sides are traversed in a clockwise manner (or counterclockwise), up until all sides have been traversed. Where there are a large number of lighting units (e.g., 30+), the traversal of the interconnections is non-trivial. Data strings mapped to an ordered index through one or more logical rules executed on a processor can be utilized to communicate layout modifications and/or connector movement. Polling approaches can be utilized to assess updates periodically.

The effect rendering unit 1908 may generate one or more visualizations in cooperation with the layout detection unit 1906, whereby the visualizations utilize the detected layout in producing effects that, in some embodiments, are more complicated than effects that are nave about layout. For example, knowledge of the layout can be used to set bounds of a particular visual effect, determine centroids, etc. In a naïve approach, on the other hand, all visualizations would have to radiate outwards from the controller as the nave controller would not know where the lightings ended or where edges/vertices would be. Similarly, some visualizations take advantage of physical features of the shape created by the lighting units (e.g., effects that "wrap around" edges, reflect at edges, travel around the edges of the overall shape).

The networking unit 1910 may be in communication with various computing devices having graphical user interfaces (e.g., to control visualizations), or with various networked computing devices, such as servers, cloud-based controllers, etc. For example, networking unit 1910 may be used in relation to an art exhibit where information from one geographical region is used to control the lighting provided in a remote geographical region as an artistic effect.

Figure 20:
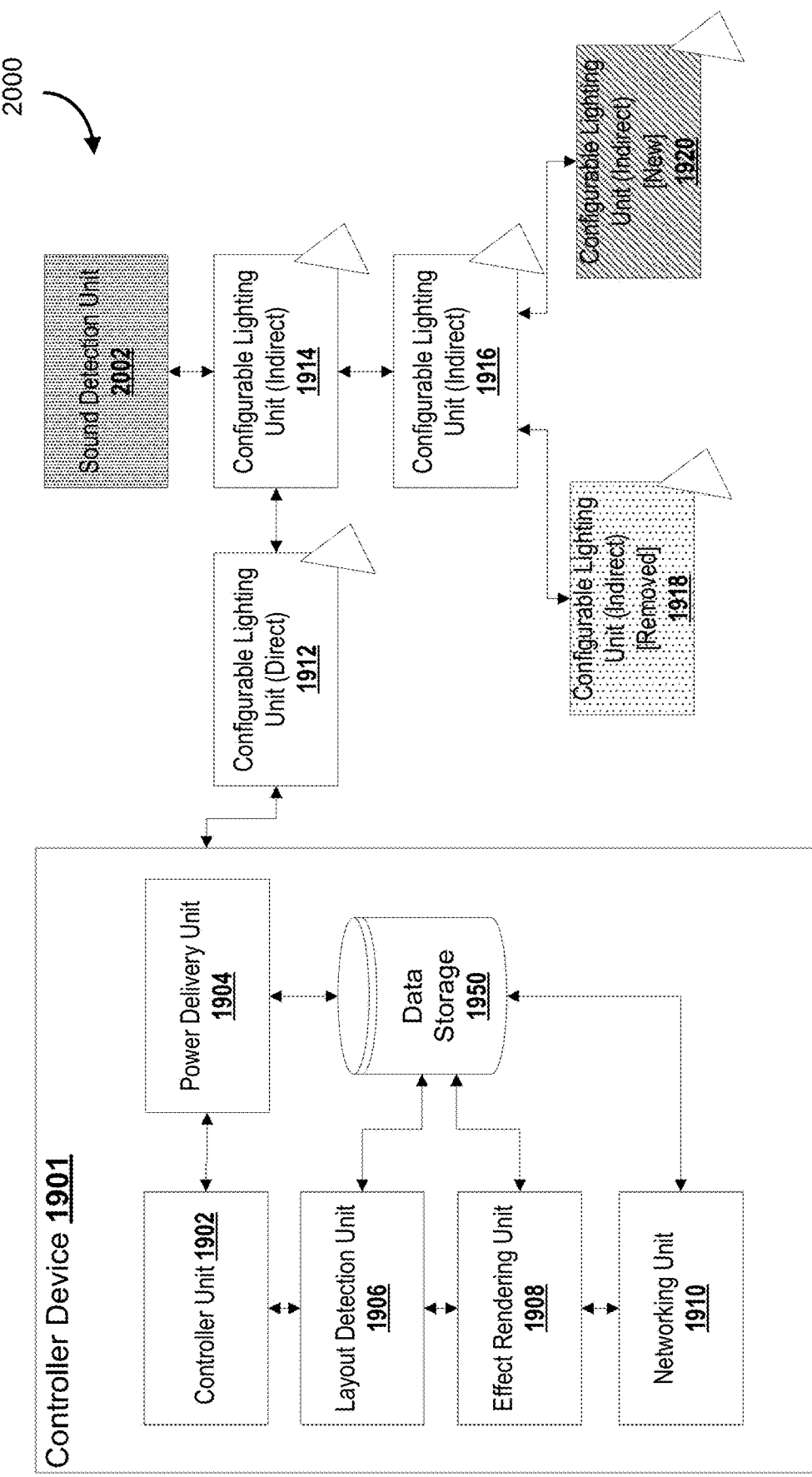
FIG. 20 is a second block schematic illustrating components of another example system, according to some embodiments.

FIG. 20 is another example block schematic 2000, and configurable lighting unit 1918 was removed and configurable lighting unit 1920 is newly added to the system, and further an additional sound detection unit 2002 is connected to a lighting unit 1914.

In relation to the addition and removal of the configurable lighting units, the nearest neighbor from which the connection was removed (lighting unit 1916) can initiate a signal indicating a change, or the new lighting unit can send a signal announcing its presence (lighting unit 1920). In other embodiments, the system can simply wait until a new poll is conducted to identify the removal or addition of units.

In this example, a sound detection unit 2002 is provided. The sound detection unit 2002 can be a separate connector that can be connected indirectly to the controller device 1901 by way of sequential coupling between lighting units, but in other embodiments, the sound detection unit 2002 can be incorporated into controller device 1901.

Sound detection unit 2002 may have a connected audio receiver (e.g., microphone) that is configured to provide a digital audio representation (or, in some cases, analog) based at least on the audio signal. The audio signal could be ambient sound, voices, music, etc. Other stimuli may be considered, and the examples are not limited to sound (e.g., security camera footage, infrared movement detection). The audio receiver need not be connected to the sound detection unit 2002 directly. For example, a remote audio receiver can be utilized so long as the signals can be presented to sound detection unit 2002 (e.g., using a panel connected to a ballgame stadium to render visualizations based on detected noise levels).

In the audio control example, the lighting units may be interconnected lighting components that are interconnected in physical arrangement. The audio detection aspect may be combined with the electronic representation of the physical arrangement such that linkages indicative of geospatial relations between interconnected lighting components of the plurality of interconnected lighting components are utilized in generating audio visualizations. In this embodiment, the effect rendering unit 1908 may further be configured as an audio visualization unit that configured to provide a plurality of lighting activation instructions generated in accordance with the digital audio representation.

The lighting activation instructions including timed instruction sets representative of at least one of (i) a color coordinate, (ii) an intensity level, and (iii) a desired geometric position of the lighting activation, which is then utilized to select an individual interconnected lighting units for rendering of a lighting effect that is generated in cooperation or in response to with the received audio signal.

An improved auditory and visual experience may be provided to users by way of the additional sound detection unit 2002. Where controller device 1901 and sound detection unit 2002 are not the same device, controller device 1901 may be configured to identify a communication path between the controller device 1901 and sound detection unit 2002 and increase the priority of communications along such path to reduce potential latency in sound detection and effect rendering. Various calibration and sequences can be used to ensure that sound detection unit is operating properly in responding to various spectrums of sound.

The sound detection unit 2002 operates alongside layout detection unit 1906 in periodically a center of geometry of the physical arrangement or other points of geometry (e.g., centroids, points of intersections, etc., and various effects can be generated that take advantage of the representation of the physical arrangement as a reference index value to identify, for example, interconnected lighting components based on a corresponding degree of separation from the center device. As a specific example, path-based lighting activation instructions may be generated where the plurality of lighting activation instructions include at least visually representing a geometric pattern that traverses a path through the one or more interconnected lighting components. In determining various geometric characteristics, heuristic approaches, such as approximating the structure as a ellipsoid, may be utilized to reduce computational processing requirements.

Sound visualization effects can be generated along with transition patterns where a transition pattern is expected, and these patterns can be layered on top of existing visualization effects to provide an improved auditory experience. For example, the visualization effects may be responsive to information obtained in relation to specific frequency ranges, and rather than having a single effect on at once, multiple effects can be layered over one another by way of multiple sets of lighting activation instructions, each of which interact with one another in potentially additive, subtractive, or transformative manners.

The method and systems described above to practically accomplish the visualization of audio and music in particular, requires several steps of logical processing:

First, represent the audio in an abstract and compact manner suitable for digital processing; second, represent the geometry of the assembly of lighting devices; third, map the audio representation onto light variations across the geometry of the assembly in a manner such that the co-variation of audio and light is perceived as harmonious by a human observer. The steps require both an understanding of how audio is perceived by a typical human observer and how audio manifest itself physically, in addition to how light is perceived.

In the following sections this problem and the methods invented to address it are described in detail. It is understood that the methods can be applied to lighting devices other than the lighting panel described above.

Accordingly, the methods of audio visualization described below are not limited to the lighting panel, and may be applicable to other illumination devices. Applicant has developed both technologies, and while each technology is innovative independently, Applicant has further found that the combination of the configurable lighting units with the audio visualization technology to be a particularly interesting application of the technology. Accordingly, there are embodiments where the configurable lighting units are controlled in accordance with the audio visualization.

In some embodiments, the controller of the the configurable lighting units may include an audio detection and visualization rendering module. In other embodiments, a separate audio detection and visualization rendering module can be connected (e.g., using one of the connectors described herein or another type of connector) to the assembly (e.g., by way of an aperture in a configurable lighting unit) and the entirety of the assembly is able to utilize the audio detection and visualization rendering capabilities. For example, the separate module connects to a first configurable lighting unit that is not directly connected to the controller. A communication path can be formed from various interconnections within the assembly such that the controller and the audio module cooperate with one another in rendering visualizations responsive to audio stimuli or other stimuli.

Context Aware Method for Audio Visualization by Illumination Devices

Embodiments described provide lighting devices adapted for providing a plurality of interconnected lighting components automatically controlled in accordance with an audio signal, along with corresponding systems, methods, and computer-readable media. The lighting device controls a plurality of interconnected lighting components interconnected in a physical arrangement. Each of the plurality of interconnected lighting components are configured to emit individually controllable light. The lighting components are controllable in accordance with one or more received control signals and based on the geometry of the plurality of interconnected lighting components. The lighting components cause one or more visualization effects in accordance with the audio signal. The lighting components are controllable to provide discernable effects by way of the visualization effects and visually distinct output.

The device and/or controller circuits are configured to map a segment of varying audio to a segment of varying light output along dimensions of the optical spectra and dimensions of the spatial arrangement of the light sources.

The Applicant has manufactured physical modular lighting devices that are re-arrangeable by one or more users, the modular lighting devices, in concert, being arranged in various geospatial patterns.

In particular, the Applicant designs and develops control platforms which include electronic circuitry configured specifically to generate control instructions, which when processed by the modular lighting devices, control the modular lighting devices to emit lighting having various patterns and characteristics. In some embodiments, the control platforms may be controlled, for example, based on instructions received from computing devices having processors, memory, and storage.

In some embodiments, the control platforms are configured to operate as a standalone special purpose device wherein the control platforms, while being capable of receiving signals indicative of modifications of control patterns, operate in a standalone manner wherein specific sets of patterns are loaded into memory and propagated, for example, based on a looping display of the patterns of the sets of patterns. The special purpose device as described may operate free of guidance from any external computing device.

In U.S. Pat. No. 7,228,190, an apparatus is described that evaluates at least one characteristic of the audio in a digital audio file and uses that characteristic as input to a program that once executed generates at least one lighting control signal in part based on the input audio characteristic. In contrast, some embodiments presently described provide how audio can be mapped along dimensions of the optical spectrum in a consistent manner.

U.S. Pat. No. 7,228,190 does not specifically address the issue of making a determination of which lighting device to control on basis of its spatial or other properties. The light output is simply defined as one or more light emitting devices existing in some undefined absolute or relative location in space.

Some patents, such as U.S. Pat. No. 7,875,787, discuss elements of assigning a spatial quality to a light source given a particular audio quality. However, these examples have been limited to a visualization that has significance only to a description of musical properties such as chroma, and using computer screens.

Audio Visualization Techniques and Methods

Some embodiments of the present application are configured to approach the spatial dimension in more generally and with spatially configurable LED light sources.

Each lighting device exists in a spatial relation to all other lighting devices, and accordingly, the system is defined as context aware. Various modules, including the rendering module, and a geometry module are utilized in the context of a larger system of audio and light processing, and various types audio analysis and light display are possible. The lighting devices may be physically connected to one another, wirelessly connected, or logically connected indirectly, for example, through a server or other interface.

In addition to the above, provisioning visualizations and other responses in the context of lighting devices that are modular and/or geospatially provided allow for further visualization effects and controls beyond those provided by conventional solutions. In particular, the effects may include specific implementations of audio and audio transitions that in turn generate corresponding light transitions.

Conventional approaches may provide that audio at a particular point in time is used to define light output at a particular point in time. However, in some embodiments described herein, the system is configured to encode transitions from a current to another light state, rather than to a specific light state.

Technical challenges involved in controlling said lights include, among others, a synchronization error, which is particularly relevant if the audio source is obtained from a microphone. Geospatial control is challenging given signal propagation and an unknown set of geospatial parameters, which may be further exacerbated as modular units are not provided in any pre-defined or static formation. In particular, as users rearrange modular lighting units, the controller may be required to periodically update and/or maintain an electronic representation of said geospatial parameters.

These geospatial parameters may require further processing to determine various geometric properties of the electronic representation, such as edges, centroids, vertices, clusters, etc.

The controller, in generating desirable visualizations, may require the computer generation of paths, based for example, on geospatial properties, such as neighboring (adjacency or within a particular proximity) lighting modules, lighting modules determined to be on the "edges" of a particular pattern, lighting modules determined to be clustered together with one another, etc.

These paths may be utilized in the lighting of various patterns, for example, lighting that radiates across a path to show a dynamic visualization effect, etc. Such visualizations may be provided in accordance with, or based at least in part on, an audio signal, or properties thereof. The visualization may include activation of lighting modules, modification of characteristics of the lighting, the generation of lighting transition effects responsive to audio transition effects, among others.

The generation of visualizations is computationally intensive, and in some embodiments, reduced representations and other computational methods are utilized to reduce the computational resources required to generate the visualizations. In some embodiments, pre-processing of the electronic representations of the geospatial state of the lighting modules may be conducted to reduce real-time demands on processing power. In some embodiments, the determination of the electronic representations of the geospatial state is conducted on a periodic basis. In some embodiments, the determination of the electronic representations of the geospatial state is only conducted once, for example, on power-on.

In a physical sense audio is a mechanical wave of pressure deviations from an equilibrium pressure in a given medium. An audio wave can thus be characterized in terms of its frequency, amplitude and phase. The audio wave is received by the human ear and the pressure oscillations are subsequently interpreted as sound by the brain. Human perception is limited to waves that are of a frequency in the range 20 Hz to 20 kHz, with individual variations depending on general health, genetic factors, age or damage to the internal parts of the ear.

The ability to perceive audio at a given frequency depends on the amplitude. The joint dependence of frequency and amplitude for human hearing can be described with an audiogram curve; for example, perception of audio of an amplitude less than 10 dB is limited to frequencies between 250 Hz and 8 kHz. Most sounds, for example music and speech, are comprised of a multitude of overlapping audio waves of different frequencies, relative amplitudes and phases, which varies over time. It is this mixture of waves that creates sounds that carries information, such as speech, or that makes two instruments playing the same musical note sound distinctly different.

A particular form of mixture is obtained when the waves have different frequencies, but constrained to be a multiple of some base frequency. This produces a harmony of sounds when perceived by a human observer, rather than as a chaotic mixture of audio. Another particular mixture is two waves of nearly identical frequency.

Human hearing has been found to exhibit frequency masking, where the ability of the human observer to resolve two sounds close in frequency played simultaneously is considerably impaired relative the case where the sounds are played individually. A third aspect of human hearing is that sounds of different frequencies played after each other have been found to be easier to perceive as distinct if the frequencies are at the lower end of the frequency range of human hearing rather than at the upper end.

This subjective sense of what constitutes equidistant sounds in terms of their frequency or pitch, has been quantified in terms of a Mel-scale. These are three examples to illustrate that although sound in a physical sense is a mixture of mechanical waves, the mixture undergoes a complex transformation as it is perceived by the human observer. This often makes the analysis and study of the perception of speech, music and other complex audio can be done using another set of entities and properties rather than the primitive wave properties. For music these properties include, but are not limited to, pitch, intensity, timbre, beat and chroma. The study of how sound is perceived is called psychoacoustics.

Light is similar to sound in that in a physical sense it is comprised of a multitude of waves of different frequencies and intensities. The light waves that can be perceived by the average human observer are electromagnetic waves of a relatively narrow frequency interval, 430 THz to 770 THz, or in terms of wavelengths, 390 nm to 700 nm.

Different frequencies are perceived as distinct colors to the average human observer, and different amplitudes as different intensities. Structural variations in the eye caused by aging, damage to the retina, or genetic conditions can cause individual variations among human observers. Like sound, the perception of light by the human observer involves a complex transformation as the physical wave triggers a physiological response, first in the eye and the retina in particular, then in the brain and the visual cortex in particular. For example, perception of power of light depends on the frequency, with green-yellow light the optimum under well-lit conditions, so-called photoptic vision.

There are several mathematical representations of perceived color, including, but not limited to, red-green-blue (RGB) coordinates, hue-saturation-lightness (HSL), cyan-magenta-yellow-key (CMYK), whereby a perceived color is represented as a point in a mathematical space. At a higher abstraction level, colors like music, are associated with moods and psychological states. The associations between moods and colors are discussed in fields as diverse as marketing, branding, interior design, holistic health and drug testing. In laboratory studies the popular associations are not always reproduced, and the root-cause for any statistically significant associations can be cultural, evolutionary or individually formed, and hence vary across groups of people with different dispositions with respect to the determining factors.

Given the similarities of light and sound, the co-variation of sound and light over time can amplify, enrich or otherwise modulate the perception of a given setting, space or event by a human observer. Associations of this kind can be employed in entertainment, relaxation, learning, healing and commerce. Specific examples of associating music and light is found in stage shows, where live music performances take place along with manual, semi-automated or fully automated control of stage lighting intensity, color and contrasts, in order to amplify sections of intense audio, or focus the audience on a solo by a single instrument or artist.

Home entertainment systems are another application where sound and light have been associated to provide a concurrent variation of audio and light that is displayed on a computer or television screen, or as variations on a simple liquid crystal display (LCD) screen part of a home stereo system.

Conversion of audio to light in a semi-automatic or fully automatic manner can be implemented using analog electronic or analog electronic and mechanical devices that through one or a plurality of components of sound part of the audible spectrum, power mechanical or electronic components, which generate a visual output. Audio is passed through a plurality of audio filters to generate a plurality of signals that quantify the intensity of sound in separate frequency intervals or sub bands.

The signals thus created are used to drive a plurality of electronic components, which generate a visually distinct output.

For example, the signals from three ordered audio frequency sub bands can be made to drive the three electron guns within a color television cathode ray tube. In addition, the audio signals can control the horizontal and vertical synchronization signals of the cathode television, which hence generates varying bands or rectangular patterns of colors on the television screen.

Other devices to display the varying colors with have been disclosed, but with the common feature that they display the visual output as a projection onto a spatially rigid screen or surface. In some inventions stereophonic sound is used as input.

The audio is encoded as two distinct signals, arbitrarily named left and right, which when transmitted to two spatially separate audio speakers creates an illusion of a multi-directional audio source to the human observer. The two synchronous audio signals are processed by audio filters in a manner similar to what is described in the earlier inventions. The plurality of audio signals are transformed into control signals for the visual output device, but in these inventions also including the creation of a two-dimensional coordinate, which specifies the center of a colored dot or other geometric shape, which can change along with the audio, including its horizontal location to indicate a change in relative audio intensity in the left and right audio channels.

The apparatus used to create the visual output uses a plurality of interconnected electronic components, such as potentiometers, Zener diodes, capacitors, to embody the mathematical transformation from sound input signal to light output signal. This obscures the nature of the mathematical transformation, limits the type of transformations that can be encoded given a fixed budget for the electronic components, as well as limits in what regard a user can configure the transformation after the circuit has been built.

The input sound signal is initially mathematically decomposed using a Fourier transform, which describes the audio as a finite or infinite linear combination of a set type of base waves or base sounds, each at a distinct frequency. The linear combination can be analyzed against a library of reference sounds in order to extract which scale, octave, note or other entity defined in musical theory that was present in the received sound at a given point in time. The extracted scale or octave is in some embodiments used to define a color, where hue and saturation can be set as a function of the scale and octave, respectively. If multiple colors are created from multiple sounds at a given point in time, they can be combined into a single color by overlaying them. The spatial arrangement for the display of said can be to color a single image, or if a stereophonic input is employed, two spatially separate images.

Another spatial arrangement that has been considered is a structure congruent with the twelve-tone circle based on the chromatic scale in music theory. These visualizations have been contemplated to be displayed on a screen, such as an LCD. The methods are in part embodied through software that encodes the mathematical transformations, which are executed on a processor.

Other variations of a visualization of music are based on audio properties less granular than variations to frequency or intensity, such as music tune metadata derived from some audio representation or retrieved from a database. The metadata can be genre, mood or beats-per-minute (BPM). Color, intensity or a set of screen coordinates are defined as a function of the music tune metadata. The visual display can be for decorative purposes, or be a means to summarize music properties in an image or visualization.

Some embodiments described herein enable a human or machine to search for music tunes similar to a given tune, as defined by the less granular music tune metadata, through visual similarity rather than through sorting and browsing multi-column tabular data. These visualizations have compressed the audio variations over time, and are hence not able to display a dynamic light visualization concurrent with the playing or performance of the music tune.

The audio visualizations described so far are intended to be displayed on a separate screen or device. Some devices can map the visualization onto a set or network of separate lighting devices, such as light-emitting diode (LED) light bulbs placed somewhere in three-dimensional space.

The audio is processed with a Fourier transformation in a manner similar to above, whereby a set of features are extracted, where the audio is obtained from a microphone, or through the retrieval of a digital audio file. The audio features are mapped to a set of lighting control signals, where the method of mapping is a programmable software executed on one or a plurality of processors on a separate computing device or part of the light bulbs. The control signals are sent either by wire or wireless signal to the lighting devices, where the control signal can be multiparametric, which includes intensity and color. The embodiments include transformations of audio of a specific frequency range to a specific color emitted by a specific light bulb in the network, or some combination thereof.

The programming of the mapping of the audio to light is contemplated to be done through a graphical user-interface (GUI) that enables the user to select from a list a specific mapping function, or where the mapping function is set by some metadata associated with the audio, such as genre classification.

Some embodiments described herein are provided as operations that are part of a process to convert audio into a visualization on a set of lighting devices, such as LED light bulbs or panels. The process may control the manner in which audio features are mapped to light sources both in terms of their optical spectrum as well as their location in three-dimensional space. Embodiments described herein can provide a user with the ability to spatially as well as optically configure the lighting devices without detailed programmatic input.

Some embodiments described herein are provided as operations that are part of a method that derives and uses spatial context data of the individual lighting devices as a visualization of audio is created. As described herein, some embodiments involve the processing of an audio to light conversion, and illustrative embodiments are provided as non-limiting examples of enhanced ways to experience audio and light by a human observer.

Data Flow and Processing

In order to automatically construct a mapping of sound to a plurality of lights of an arbitrary but known spatial arrangement, a number of logical steps are implemented that involve a number of intermediate data structures. The logic and data flow is outlined in this section in terms of a set of processing units or modules and their interdependencies with respect to transmitted and received data. The details of each unit or module is described in subsequent sections. The processing units or modules include computer hardware or physical parts or components of a computer, which are tangible physical objects.

Figure 21:
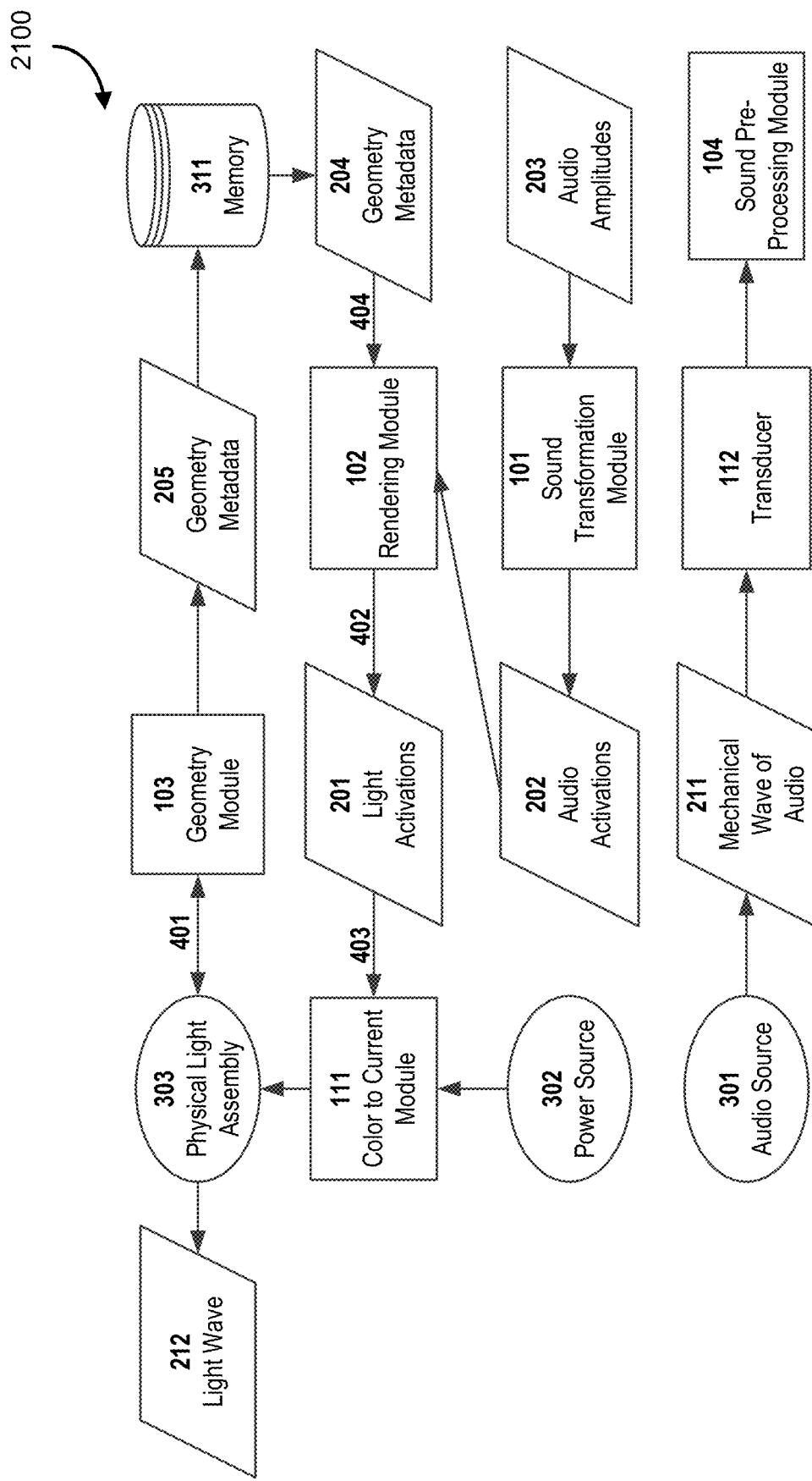
FIG. 21 is a schematic diagram of a system for processing sound according to some embodiments.
Figure 22:
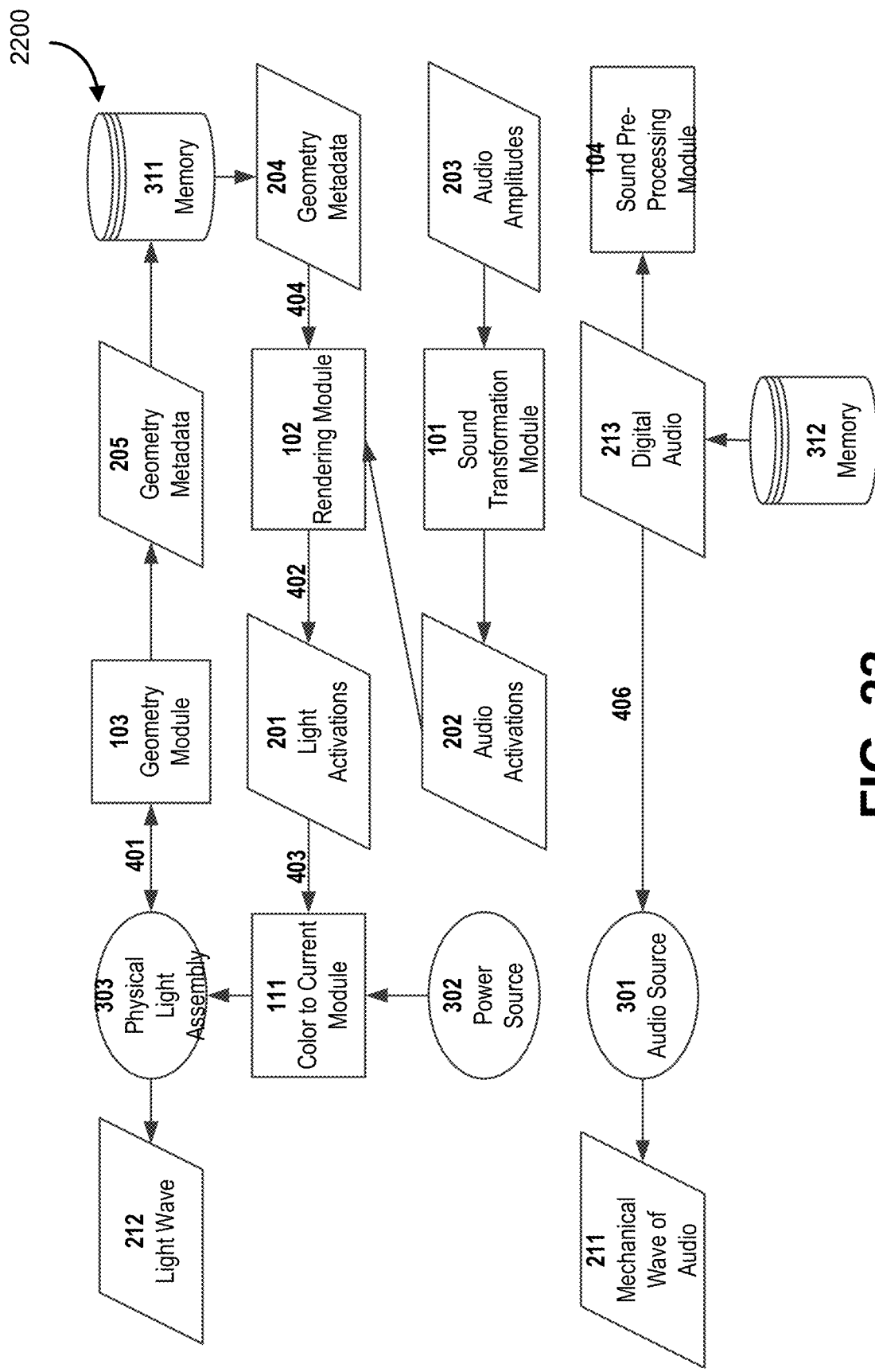
FIG. 22 is a schematic diagram of a system for processing sound according to some embodiments.

As shown in the example of FIG. 21, there can be two inputs to the method, namely, an audio source 301 and data defining the physical arrangement of lighting devices 303. In some embodiments the audio source 301 is in the form of a mechanical wave of varying air pressure 211 received by a microphone or generally a transducer 112 configured to receive audio in at least a range of frequencies and amplitudes within which music or sound is perceived by a human observer, such as 20 Hz to 20 kHz, or 250 Hz to 8 kHz. In some embodiments the audio source 301 can be received from a digital audio representation 213 over a connection 406, as shown in the example of FIG. 22. A transformation can convert the digital audio representation 213 to the audio source 301 as part of the method operations.

The digital format includes, but is not limited to the standard formats WAV, MP3, MPEG, AIFF. The digital audio representation 213 is received from a transmitting device 312 that accesses or includes a digital music database, such as but not limited to a computer, smartphone, router. The transmission can be over a wireless connection 405, such as but not limited to Bluetooth, Wi-Fi, LTE. In some embodiments the digital audio representation is received from a transmitting device via a wired connection 405, such as but not limited to Ethernet, Power-Line Communication (PLC) or a standard or proprietary serial communication port or pin.

The physical arrangement of the lighting devices is in some embodiments represented as a plurality of three-dimensional Cartesian coordinates of the center of each lighting device, or of any other consistently defined point of the individual lighting devices.

The Cartesian coordinates are stored in memory and transmitted between modules as part of an array of integer or floating point numbers, where at least one element in the array can be matched to the unique identifiers of the lighting devices.

The physical arrangement of the lighting devices is in some embodiments represented as a connected non-directional graph, where each edge between any two given nodes represents that the two corresponding lighting devices are spatially connected or spatial neighbors. Mathematically the graph can be represented as an adjacency matrix, adjacency list or distance matrix.

These entities are stored in memory and transmitted between modules as arrays of integer or floating point numbers. These arrays can be received through a connection between the physical arrangement and the processing unit 401, where wireless connections include but are not limited to Bluetooth™, Zigbee™, Wi-Fi, LTE, and wired connections include but are not limited to Ethernet, PLC, standard or proprietary serial ports or pins.

The physical arrangement representation can also include global geometry data that applies to the entire assembly. For example, in some embodiments an array defines what the up-down direction is for the entire assembly, as derived from sensing the gravitational force or through a manual configuration via an auxiliary device, such as a laptop, smartphone with touch-screen interface or keyboard input.

Depending on the format the audio data is received in, the data undergoes an initial transformation to a digital representation of the audio wave 104. In some embodiments the representation is a discrete description of the amplitude variation over time 203, which is a standard digital representation of audio in computers, compact discs, digital telephony, commonly but not necessarily obtained through a pulse-code modulation (PCM). The audio is hence described as a finite plurality of ordered frames.

Each frame is an element in an array of integers or floating point numbers, which represents the amplitude of the audio wave at the point in time corresponding to the given frame. The sampling rate for this representation quantifies the number of amplitude samples, or frames, per second. Typical sampling rates for high-fidelity audio include 44.1 kHz, 48 kHz, 24 kHz.

The smaller the sampling rate is, the more compact the representation of the audio is, because the continuous mechanical audio wave is given a sparser discrete representation. For example, the size of, or number of frames in, the array of integer or floating point number amplitudes for audio of a duration of one second is 44100, 48000 and 24000 for the three sampling rates, respectively.

A lower sampling rate also implies greater noise in the representation as compared to the original audio. In particular, a sampling rate at a given value is unable to resolve parts of an audio mechanical wave at a frequency higher than the sampling rate. Hence, sampling rates lower than 20 kHz, such as 5 kHz or 1 kHz, lead to that high-pitch notes or sounds are absent from the discrete representation 203.

As the audio is expected to be comprised of a plurality of waves of different amplitude, frequency and phase, a wave transform 101 is applied to the discrete representation 203. The integer or floating point array received from the pre-processing module 104 is used as input to the transform, and a new representation is obtained in terms of a finite set of orthogonal basis functions and time-dependent multiplicative factors. The multiplicative factors are stored in an array as a set number of integer or floating point numbers.

Depending on the details of the wave transform, the multiplicative factors can be complex numbers. Therefore, the array can in addition to the real-value component of the multiplicative factors also contain elements that define the imaginary component of the complex number. In some embodiments, the integer or floating point magnitudes of the complex number is used in subsequent modules, rather than the multiplicative factors. Therefore, an array can be defined with elements equal to the addition of the real-value element raised to the power of two and the imaginary element raised to the power of two.

The summation of the basis functions, each multiplied by the corresponding factor, produces for any given time an approximative mathematical representation of the input amplitude wave 104. With reasonable settings of the transform and a meaningful selection of basis functions, the approximative audio representation resembles the input to a high degree; details of the transform are given in a subsequent section. The exact method of wave transformation can vary between embodiments, but the magnitude of the multiplicative factors, stored in an integer or floating point array as defined above, can vary with time and be visualized as an audio spectrogram, for example.

Figure 24:
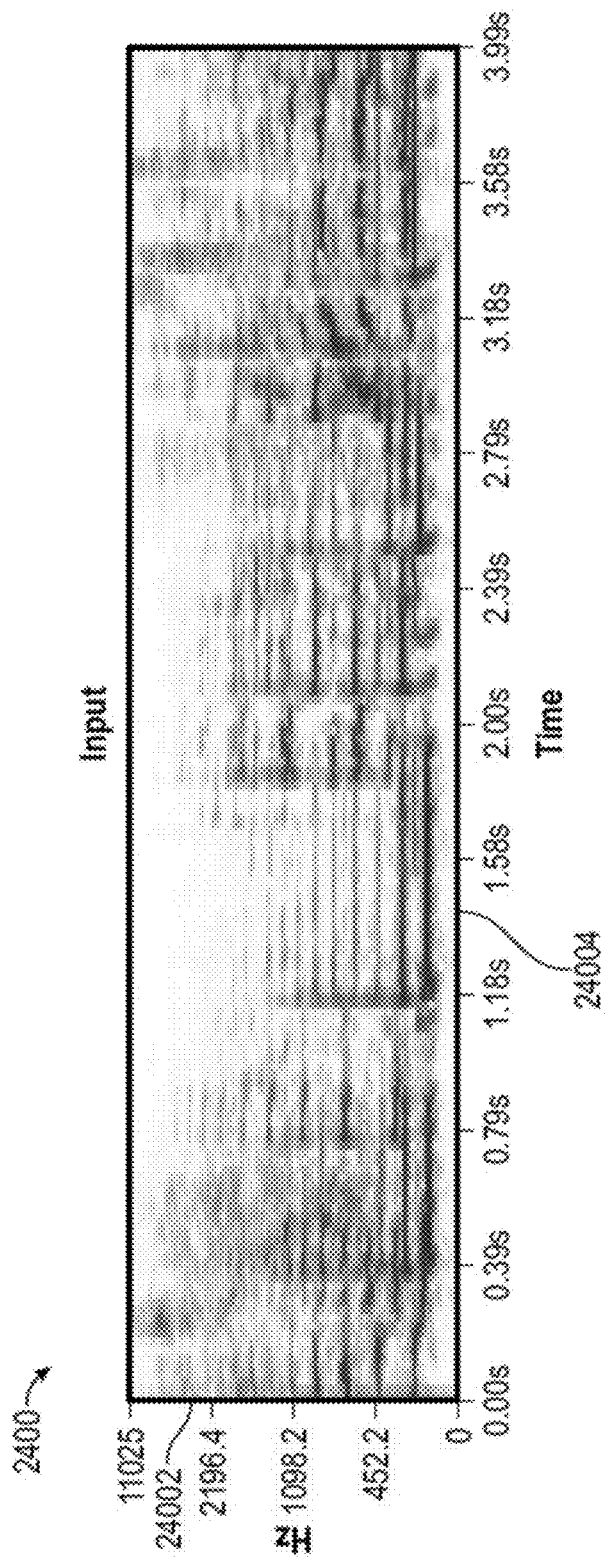
FIG. 24 is a diagram of an audio spectrogram of a short section of music according to some embodiments.

One example of an audio spectrogram 2400 of a short section of music is shown in FIG. 24, where the frequency in Hz (y-axis) is shown at 24002, and the time is shown at the x-axis at 24004. The magnitude of the plurality of multiplicative factors at a given time represents the amplitude of a standard audio wave or waves, and hence the plurality of multiplicative factors is an exact or approximate decomposition of the mixture of audio waves into a set of standard sounds. Based on the magnitude of the multiplicative factors an array of audio activations 202 are computed and transmitted, where the details of their computation and array size are given in a later section.

A representation of this nature offers analytical advantages over the PCM representation, since the audio components of the audio mixture are approximately or fully resolved. In some embodiments the sound transform module evaluates secondary summary metrics for the audio stream processed so far, such as, but not limited to an estimate of the BPM, which are transmitted as arrays as well.

Depending on the format of the representation of the physical arrangement of lighting devices, the representation is converted in a geometry module 103 to a graph adjacency matrix, a distance matrix between lighting devices, or similar representation depending on the embodiment. A variety of geometrical data 205 can further be derived for the physical assembly, details given in a section below. In some embodiments these calculations are performed only once during initial setup, and the resultant arrays of integer or floating point data are stored in memory 311 in order to be retrieved during the processing of the audio 204.

In some embodiments the physical arrangement can change dynamically, either through an intentional rearrangement or through functional failure or damage to one or a plurality of individual lighting devices. In order to detect these changes and re-compute the geometrical data, the method is polling the individual devices for their status 401, including their geometrical data. If a change in status is discovered between two consecutive points in time, the geometry module 103 is triggered and the data is updated in memory.

The audio activations 202 and the geometrical data 204 of the physical assembly are input as integer or floating point arrays to the rendering module 102. The means of transmission can be within a shared memory on a common device with a processor or similar circuitry used for the execution of the different modules; the transmission can also be through a wireless or wired connection. Through a number of algorithms, described in a section below, a set of light activations 201 is derived. The light activations represent what color coordinate at what intensity every single lighting device in the assembly 303 should adopt at that given time point.

The color coordinate system can be RGB, HSL, CMYK or any other transformation of the color space, by which the specified color can be represented and stored in memory as an integer or floating point array, typically but not necessarily with three elements per array. A set of arrays, which includes the light activations, are transmitted to a module 111 that converts the specified color and intensity to a drive current for each individually controllable light-emitting diode (LED) in the plurality of lighting devices.

The drive current can be obtained through a standard pulse-width modulation (PWM) of an alternating current (AC) power source 302 connected through wire to the physical assembly 303 or connected through a wireless transmission of electrical power. The power source 302 can be direct current (DC) from a battery or photovoltaic solar panels. In this case the modulation in 111 can be done with a DC-to-DC converter, for example. The mapping from color to drive current can be done through a lookup table stored in non-volatile or non-transitory memory, calibrated during the manufacturing of the individual lighting devices.

The lookup table is represented as an array of integer or floating point arrays, where at least one element of the array is an array with color coordinates and at least one element of the array is an array of drive currents for one or a plurality of LED within the lighting devices. In case the received array to 111 is not contained in the lookup table, an interpolation between at least two nearby color coordinates present in the lookup table is done. The lookup table can also include a temperature variable, since it is known that LEDs emit less light for a given drive current as the temperature of the diode increases. The mapping can also be dynamically derived through a calibration sequence with a secondary device recording the optical spectrum for a given drive current setting, and transmitting the information back to the system.

Other methods of mapping color to current have been contemplated. In some embodiments, the color to current conversion module 111 is executed on a microprocessor part of each lighting device in the physical assembly. The transmission 403 of the light activations arrays is done either through a wireless connection, such as but not limited to Bluetooth, Zigbee™ or Z-Wave™, or through a wired connection, such as but not limited to Ethernet, PLC, or a standard or proprietary serial port or pin.

The embodiments described thus far process the audio as a real-time, or near real-time, continuous stream of data. This implies the sound transformation module 101 has no information about the sound yet to come, only information on current and possibly past audio data. In the case the audio data is a digital representation of a music tune, the entire audio stream is stored in a database 312, which can be remote and accessed through an Internet connection, or stored on a local disk or in a digital memory.

Figure 23:
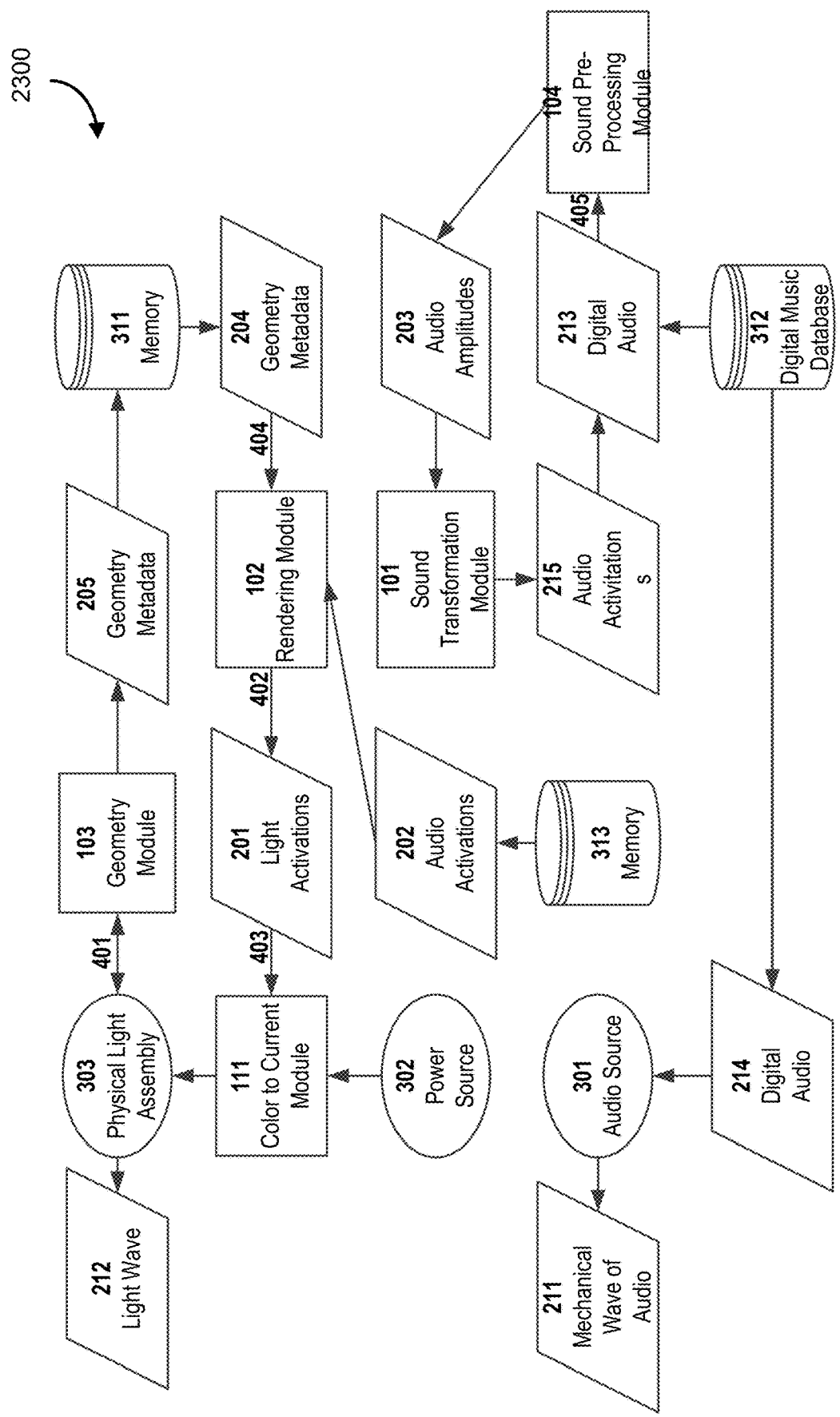
FIG. 23 is a schematic diagram of a system for processing sound according to some embodiments.

In some embodiments this condition is used to perform a batch-processing of the entire digital audio data prior to its visualization, see FIG. 23. The audio activations 215 are stored in memory 313 as arrays as described above in order to retrieve these as a stream of integer or floating point arrays 202 as the audio is played and the rendering is done concurrently. Batch-processing enables other algorithms to be employed in the sound transformation module 101, as described in a section below.

A variation to this embodiment involves computing and storing the light activations 201 in memory as arrays of integer or floating point numbers, and retrieve them as a stream along with playing the audio. This embodiment removes the ability to dynamically change the geometrical properties of the physical assembly as the given music tune is played.

In order to attain the desired co-variation of the perceived audio 211 and the perceived light 212 to the human observer, the audio and light stream must be concurrent or nearly concurrent. For the embodiments described so far this presents different challenges. In the embodiment in FIG. 21, which relies on a microphone or transducer 112 to receive the audio as it is played, all processing and transmission of data up until the lighting devices 303 change their state must be less than some threshold that will be perceived as an appreciable or disturbing lag to the human observer.

The synchronization error has been studied for multimedia, such as video. Below 80 ms lag was undetected by the human observers in one particular study, with an increasing detection probability until a 160 ms lag where the probability of detection is nearly 100%. It is noted that this experiment involved detection of synchronization error in lip movement in a video relative the associated audio.

The light wave produced from the physical assembly in the current embodiments is expected to be of a lower resolution than a computer screen, which suggests the 80 ms lag is a conservative value of an acceptable processing time. In the embodiment in FIG. 22 and FIG. 23, concurrency is in principle easy to attain in case it is the same processing unit or similar electronic circuitry that is processing the stream of light activations 201 to the physical assembly 303 as is processing the stream of audio 213 and 214 to the audio source 301, such as loud speakers or headphones.

The streaming mechanism would in these embodiments execute the transmission of light activations and the transmission of audio data to the audio source immediately following each other, or sufficiently close in the execution such that the synchronization error remains below the acceptable threshold. In other embodiments, it is not the same processor that is handling the light activations and the audio data to be played by the audio source.

This includes the case where the computer or smartphone that retrieves the digital audio from a local or remote database, sends the data to a processing unit that runs the method described in FIG. 22 and FIG. 23, and to a third-party speaker system outside detailed programmatic control by the current method.

As long as the processing time of the digital audio stream is sufficiently quick in both the third-party speaker system and the current method, no significant synchronization error may occur. If one of the two independent audio processing algorithms is much slower than the other, the fastest of the two can programatically be delayed by a set amount.

Sound Transformation Module

The sound transformation module 101 computes a set of quantities to describe key features of the audio at the given point in time. In some embodiments, the evaluations part of the sound transformation module are done without any dependency of the particular physical lighting assembly 303.

Furthermore, it is the sound pre-processing module 104 that handles the variety of audio formats that can be input to the system, and converts them into the PCM representation. The sound transformation module can therefore also be independent of the specific input format of audio.

The sound pre-processing module 104 uses published specifications of standard digital audio formats to convert from a variety of input format to a consistent output format. Input formats include, but are not limited to: WAV, MP3, MPEG, AIFF, AU, TTA, Opus,™ Vorbis™, Musepack™, AAC, ATRAC. The conversion implies that any file header is stripped and only the audio data is kept. The output can be a raw headerless audio PCM representation at a specified sampling rate.

The output is hence stored as an array of integer or floating point numbers, with each element representing the audio amplitude at the corresponding point in time. The initial conversion can imply no loss of audio fidelity compared to the input file. However, the sound pre-processing can in some embodiments also include a resampling of the audio, specifically to reduce the sampling rate. Published methods and implementations in the field of signal processing can be employed for this task.

Two example methods can be used in different embodiments: simple downsampling, which only keeps a subset of the discretized amplitudes of the array; decimation, which keeps a subset of the discretized amplitudes of the array after they have been transformed or filtered to mitigate temporal aliasing distortion. A reduced sampling rate implies a loss of audio fidelity. At this stage in the processing, the audio signal is not meant to be converted to a mechanical wave to interact with the human hearing, rather to act as input to a visualization of the audio.

Hence, the conventions with respect to sampling rate for audio storage and retrieval do not necessarily translate. Through calibrations, lower values of the sampling rate can be used for certain audio, with values such as 1 kHz, 2 kHz, 5 kHz, 10 kHz. The lower sampling rates imply that high frequency sounds are removed from the representation. In particular for, but not limited to, music that contains a defined beat, this loss of data on variations at high audio frequencies is not consequential to a visually meaningful representation of the audio as it is perceived by the human observer.

Some digital audio data encodes stereo sound. In this case each time point is represented by two or more amplitude values in the integer or floating point arrays described above. Stereophonic sound is a means to create a perception of directionality of the audio as it interacts with the human hearing. In some embodiments the sound pre-processor converts any stereo input into a mono output. This is done through the summation and uniform scaling of the two or more integer or floating point numbers representing the signal per point in time. In other embodiments the two or more audio streams are processed independently and two arrays of the PCM representations of audio are transmitted to the sound transformation module.

In embodiments where the audio input is obtained through a microphone or transducer that interacts with the mechanical audio wave, the transducer contains an analog to digital conversion. Any microphone can be used that captures the vibrations of a mechanical audio wave of at least frequencies and amplitudes encompassing a meaningful range of human hearing, such as 20 Hz to 20 kHz, or 250 Hz to 8 kHz, and above −10 dB for at least frequencies around 4 kHz, though a higher lower bound is acceptable for frequencies higher or lower than this; a human audiogram provides detailed ranges of audible sound.

Typically the membrane of the microphone moves along, or resonates with, the varying pressure of the mechanical wave, and the motion of the membrane is turned into a varying electrical current and voltage through a generating element attached to the membrane. The electrical variations are converted into a digital and discrete representation of the amplitude variations at a set sampling rate. An array of integer or floating point numbers are thus obtained. Identical considerations about the selection of sampling rate as described above for the digital audio format applies in embodiments that uses a microphone.

There are many wave transforms available, with applications in physics and signal processing among others. They decompose a continuous or discrete function of one or higher dimension into a finite or infinite linear combination of wave basis functions. The types of basis functions, and the mathematical method to derive the scalars to each basis function in the linear combination is different between methods. For the transformation of the discrete PCM representation of the audio amplitudes, the signal is discrete and one-dimensional along the time-axis. The discrete-time Fourier transform (DTFT) decomposes a sequence of amplitude values, x[n], said to exist in the time-domain, as obtained from the sound pre-processor into a set of complex-valued coefficients in the frequency domain.

$$X(\omega) = \sum_{n=-\infty}^{\infty} x[n] \cdot \exp(-in\omega)$$

Through an inverse transform, the signal can be obtained again. The signal constructed through the inverse transform can be an approximate representation in case the sequence of coefficients, X, is truncated, or in other words that a reduced number of set frequencies, $\omega$, are used as the above equation is evaluated.

The finite set of frequencies can be conceptualized as centers of a set of frequency windows. Since the audio signal changes with time, so will the coefficients. A variation of the DTFT that addresses this is the short-time Fourier transform (STFT).

$$X(\omega, m) = \sum_{n=-\infty}^{\infty} x[n] \cdot W[n-m] \cdot \exp(-in\omega)$$

The variable m is a sequence identifier of the discretized time variable, and W is a window function, that assumes its maximum value at zero, and approaches zero symmetrically as the argument to the function increases or decreases. The exact functional form can be calibrated, and common types are a rectangular function, triangular function, cosine function, Welch function, Gaussian function, Hann function. The STFT summarizes the signal in the frequency domain at the given point in time, m, as a property of the signal in the time-domain in the neighborhood of m, rather than the entire time range.

The finite set of times for which coefficients exist can be conceptualized as a set of time windows. The sampling rate of the signal, x, defines the highest resolution of time windows. However, the transform can be configured such that it further reduces the resolution, and hence makes the number of time windows less than the number of frames in the input audio signal.

The execution of arithmetic and logical operations on a microprocessor or central processing unit, can be done as follows in order to perform the wave transforms as mathematically defined above: (1) A segment of consecutive elements from the array of integers of floating point numbers transmitted from the pre-processing module is retrieved and stored in memory. (2) Each element in this segment is multiplied by a floating point number defined by the window function; the floating point number can be unity. (3) Each element in the array thus obtained is multiplied by a set of complex numbers defined by the basis wave, where the wave is defined as a multiple of a frequency $\omega$; the values thus obtained are summed into a single complex number, which is stored in memory as an element of an array. (4) Another set of complex numbers are defined by another frequency, and the array defined above is appended with a number obtained by repeating the third step. (5) The previous step is repeated for a set number of distinct frequencies, and an array of complex numbers is obtained where the number of elements is equal to the set number of distinct frequencies, or frequency windows.

The coefficients of the wave transform are formally complex numbers with one real and one imaginary component. In the current application, the magnitude of each basis function is of interest, while the phase is not. The absolute value, or mode or magnitude, of the complex coefficient is a real number and it can be shown to be equal to the desired magnitude. The varying magnitude of the coefficients over time and frequency can be visualized with a spectrogram, which is a form of heatmap, where element (x,y) is shaded proportionally to $|X(x,y)|^2$. The magnitudes are stored as an array of integer or floating point numbers, with number of elements equal to the set number of distinct frequencies or frequency numbers. An example of a spectrogram as obtained from a short section of music by the music artist Justin Bieber is given in FIG. 24.

Sections of rhythmic beats, harmonies or of a reduced or increased total audio intensity are evident in this visualization. Areas of a highly saturated shading represent a large element at the corresponding time and frequency in the array of magnitudes, while areas of no or weak saturation represent an element equal to zero or nearly zero at the corresponding time and frequency in the array of magnitudes.

Another wave transform of interest is the constant-Q transform. It is related to the STFT, but specifies a sequence of frequency windows that are of changing width and separation. Specifically, the size of the frequency windows grows as the frequency increases. This complicates the practical evaluation of the transform. It also provides a reduced resolution at higher frequencies.

As described above, this fits the resolution of human hearing with respect to frequency. Other wave transforms can be contemplated as long as they represent a time-varying amplitude signal as a finite set of time-varying coefficients to a set of basis functions in the frequency domain. Other transforms include, but are not limited to, Laplace transform, Mellin transform, Z-transform and cosine transform.

In some embodiments the absolute value of the amplitudes is itself not of interest, rather it is the relative value of the magnitude compared to a reference. A transformation to reflect this is an amplitude normalization.

$$\Upsilon(\omega,m) = |X(\omega,m)|^2 / N(\omega,m)$$

The choice of reference can be: (1) A constant calibrated once and applied across all frequency and time windows, in other words $N(\omega,m)=N$. (2) Several constants calibrated once and applied across different frequency windows, but all time windows, in other words $N(\omega,m)=N(\omega)$. (3) A variable changing with time according to some function, but applied uniformly across all frequency windows, in other words $N(\omega,m)=N(m)$. (4) Several variables changing with time according to some function, and applied across different frequency windows. The second normalization approach is suitable to scale amplitudes to better correspond to human perception of sound intensity.

As described above, human hearing is more sensitive to amplitudes at certain frequencies, for example 4 kHz, than at the outer limits of hearing, for example 100 Hz and 10 kHz. Therefore a scaling that increases the numeric representation of audio in frequency windows near frequencies of excellent human hearing, relative the numeric representation of audio in frequency windows near frequencies of poor human hearing, is a step towards representing the audio closer to how it is perceived, rather than with respect to its physical attributes. The third and fourth normalizations are helpful when absolute music or audio volume differences are not meaningful to visualize. For example, for an embodiment that receives audio through a microphone, a sudden increase in volume can increase the amplitudes uniformly.

Since there is a practical upper bound for how intensely to display light, or what wavelength of light to use in a visualization, a uniform increase of amplitudes can end up masking any variations in the light visualization. The function that control the time dependency of the normalization can be an aggregate value or summary statistic of the amplitudes observed so far. In some embodiments the summary statistic is the maximum non-normalized amplitude found up to a given point in time, either across all frequency windows, or for each frequency window by itself. In some embodiments the summary statistic is the maximum value, as above, multiplied by a decay function. The decay has the effect that the normalization function decreases with time, unless a new high amplitude value is encountered again.

The latter construction controls for the possibility of a uniform decrease in amplitudes, as a lowering of music volume would generate. In embodiments where the audio is received as a digital audio file and batch-processed, the normalization can be computed with knowledge of the entire track. Functional forms similar or identical to the ones listed above are contemplated, however where parameter values are chosen with full knowledge of what audio variations, such as the maximum amplitudes, are present in the audio.

The normalized amplitudes $\overline{Y}(\omega,m)$ at a given point in time m are in the an embodiment referred to as the audio activations 202, and are transmitted to the rendering module. They are represented as an array of integer or floating point numbers, where the size of the array at a given point in time, m, is equal to the set number of frequency windows. As time progresses, the element values are either updated in memory to reflect the change to the input audio, the normalization or both. The array can also be appended to a larger array of arrays, which can be the case for a batch-processing data flow.

In embodiments where audio is received via a microphone, there may be noise in the signal from ambient sounds, such as engine noise, conversations, or other human vocalizations. Random noise can in part be removed by discarding high frequency components of the audio signal.

This is a simple filter to apply in embodiments of the current method, since the Fourier transform decomposes the input signal into windows of different frequencies. For audio and music with its most distinctive features at lower frequencies, such as a defined drum beat, the loss of higher frequency data is not a problem to a meaningful visualization. For audio and music for which this is not true, such as an opera soprano aria, a filter that fully discards high frequency data is detrimental to a visualization. More advanced methods for noise removal can involve a secondary microphone, which is placed in the space, such that it predominantly receives the ambient noise, rather than the music.

The noise audio is then subtracted from the signal obtained from the primary microphone, either in its raw amplitude variation representation, or following the wave transform.

As described above, the perception of sound and music can be described in units other than ordered categories of frequencies or pitches. The audio activations as defined above are an ordered set of categories in this regard. For music that contains a distinctive chord progression, vocal harmonies or varied but recurring percussion, the units that best represents how the music is perceived can involve a plurality of well-separated and distinct bands of audio frequencies. The set of basis functions in the wave transform, such as the $\exp(-in\omega)$ functions in the Fourier transform, can be combined linearly to form a new basis to represent the audio in; this is akin to how a single vector can be represented differently in case the Cartesian coordinate system is rotated.

One way to derive a new linear combination of the basis functions, or differently put, a rotation of the functional coordinate system, is through an analysis of the principal components of the covariance of the different amplitudes in the original basis. This is only possible in embodiments that include a complete batch-processing of the audio, or at least a batch-processing of a significant segment of the audio. A typical procedure to obtain the rotation begins with the evaluation of the set of amplitudes as described above, $X(\omega, m)$, for a set number of frequency windows, $\omega \in \{\omega_1, \omega_2, \ldots, \omega_N\}$, and time windows, $m \in \{m_1, m_2, \ldots, m_k\}$. The covariance of the amplitudes in the frequency windows over time is computed:

$$C(\omega_i, \omega_j) = \frac{1}{K}\sum_{k=1}^{K} [X(\omega_i, m_k) - avg_T(X(\omega_i))] \cdot [X(\omega_j, m_k) - avg_T(X(\omega_j))]$$

The function $avg_1$ evaluates the average amplitude over the entire range of time for a given frequency window.

For example, if two frequency windows contain amplitudes that more often than not increase and decrease in unison, the covariance value will be greater than zero. For example, if two frequency windows contain amplitudes that are varying completely at random relative each other, the covariance value will not be significantly different from zero. The principal components of the covariance are orthogonal linear combinations of the frequency windows, such that the set of linear combinations contains usually a few elements along which a disproportionate amount of the audio variation take place in the music or audio.

In other words, dominant sound themes in the analyzed music tune or segment of audio, that include a plurality of specific frequencies are expected to be represented predominantly as variations along a single principal component. The practical evaluation of the principal components can be done by first representing $C(\omega_i, \omega_j)$ as a matrix, or an array of arrays of integer or floating point numbers. The equation above defines how each element of the matrix is computed by processing the multiplicative factors stored in arrays as defined in previous paragraphs.

This includes in particular the computation of deviation of an array element for a given frequency window from its average value over all time windows. Methods in numerical matrix algebra, implemented as a finite set of operations on the arrays of integer or floating point numbers, can be used to ascertain the eigenvectors to the matrix, conventionally sorted by their corresponding eigenvalue. Once the eigenvectors are obtained, the amplitudes $X(\omega,m)$ are linearly transformed and a new set is obtained, $X(\pi,m)$, where instead of frequency windows, the values are split over principal windows. The number of principal windows can be identical to the number of frequency windows. The number of principal windows can be smaller than the number of frequency windows, where principal windows with associated eigenvalues less than some threshold are discarded. The principal window amplitudes can be normalized as described above and turned into audio activations passed to the rendering module.

Arrays of integers or floating point numbers are thus obtained, where each element represents the activation of the corresponding principal sound at the given point in time. Other methods to derive a transformation to an informative set of basis functions can be contemplated.

The practical evaluation of the wave transforms must be quick when executed as a set of logical and arithmetic commands on a central processing unit, microprocessor or other electronic circuitry. If this condition fails, the synchronization error will exceed acceptable thresholds. A way to practically compute a Fourier transform is through the Fast Fourier Transform (FFT) implementation.

The summations involved in computing the coefficients in the frequency domain, as defined in a previous paragraph, imply a quadratic scaling of the computational effort as the size of the problem increases. In other words, as the number of elements increases in the integer or floating point number arrays that describe the audio amplitudes and the amplitudes per frequency windows, as defined above, the number of operations to execute on the central processing unit, microprocessor or other electronic circuitry increases quadratically. A variety of FFT methods, the Cooley-Tukey being the most common, have been formulated and published, which exhibit a no worse than $N \cdot \log N$ scaling of the computational effort as the size of the input arrays increases.

Most FFT methods are exact in the sense that they do not involve any arithmetic approximation to the transformation equations. In a finite-precision implementation, numeric errors accumulate as the number of operations on the integer or floating point array elements increases. However, benchmark studies have concluded that FFT, and Cooley-Tukey in particular, are "remarkably stable" to this type of error as well. In some embodiments the FFT algorithm is therefore used to evaluate the coefficients rather than the direct numerical evaluation of the equations as defined by the array element algebra described in a previous paragraph. The normalization, and linear transformations and their implementations are otherwise the same as above.

The audio activations offers a compressed representation of a possibly complex audio stream. In some embodiments it is useful to derive summary statistics of the audio, which numerically represents even coarser features of the audio. A common metric in music is beats-per-minute (BPM). In embodiments that rely on batch-processing of an entire digital audio file, advanced and accurate methods that discover onset of audio and its periodicity over the entire tune can be implemented in order to derive the BPM. In embodiments that process audio in real-time, the method can only employ shorter segments of past or current amplitude data. A beat is characterized by its high relative intensity and that it spans a short amount of time.

A point in time that therefore meets the following two criteria can in some embodiments be classified as containing a beat: (1) The total amount of audio energy, as defined by a summation of all amplitudes, or the magnitude of the raw audio wave, exceeds the average energy in the temporal neighborhood of the given point in time by some set threshold; (2) The point is a peak in terms of energy, as determined by a peak detection method. The peak detection can be implemented as nested conditions with respect to the positive difference between the energy of the given point and the energy of points in the immediate neighborhood of said point. The separation between consecutive beats is evaluated, and accumulated as the audio is processed.

A summary static of the accumulated beat separations is evaluated, such as the mode or the median. From the summary separation, a BPM is estimated. This method can sometimes fail to identify a beat if many instruments are active at that section of audio. The accuracy can increase by limiting the above computations to lower frequency windows, as rhythmic beats tend to be at lower frequencies relative to other instruments. The BPM is represented as an integer or floating point value, which is transmitted along with the audio activations to the rendering module.

Another example coarse characterization of music is its genre, such as pop, rock, hip-hop, grunge, grindcore, deep house. In an embodiment that relies on audio from a remote or local database 312, the genre can be coded as metadata to the digital file. If so, this information can be retrieved and passed directly to the rendering module.

In case this metadata is absent or not retrieved, it can be predicted from the output of the transforms done in the sound transformation module, or from the PCM representation of the audio. There are methods of varying accuracy and precision.

In some embodiments an audio-based classification method is used and the predicted genre class, defined as a string or integer index, is transmitted to the rendering module as well.

Geometry and Physical Assembly

The physical light assembly 303 is comprised of one or a plurality of individually addressable lighting devices. The term addressable implies that to each lighting device there is a unique identifier associated, and can be implemented as an integer value, for example. The lighting devices are assumed to be tunable at least with respect to their luminous flux, and in some embodiments with respect to their emitted spectrum of light. This means one or a plurality of the lighting devices can emit different colors, not necessarily every possible color in the visible spectrum, though.

The lighting devices can be of a variety of form factors and generate a light distribution of different angular distributions. This includes but is not limited to devices such as, omnidirectional light bulbs, parabolic reflector lamps with a directional light distribution commonly described in terms of a beam angle, linear light tubes either by themselves or installed in a partially reflective troffer, decorative light bulbs such as candelabra lamps that produce a mostly omnidirectional light, custom luminaires in planar or curved shapes, or in shapes and constructions that transforms the distribution of the light emission into a highly varied pattern. The source of the light can be incandescent, halogen, fluorescent or from a light-emitting diode (LED). Some embodiments use the latter due to the relative ease in which the emitted spectrum can be tuned.

Figure 25:
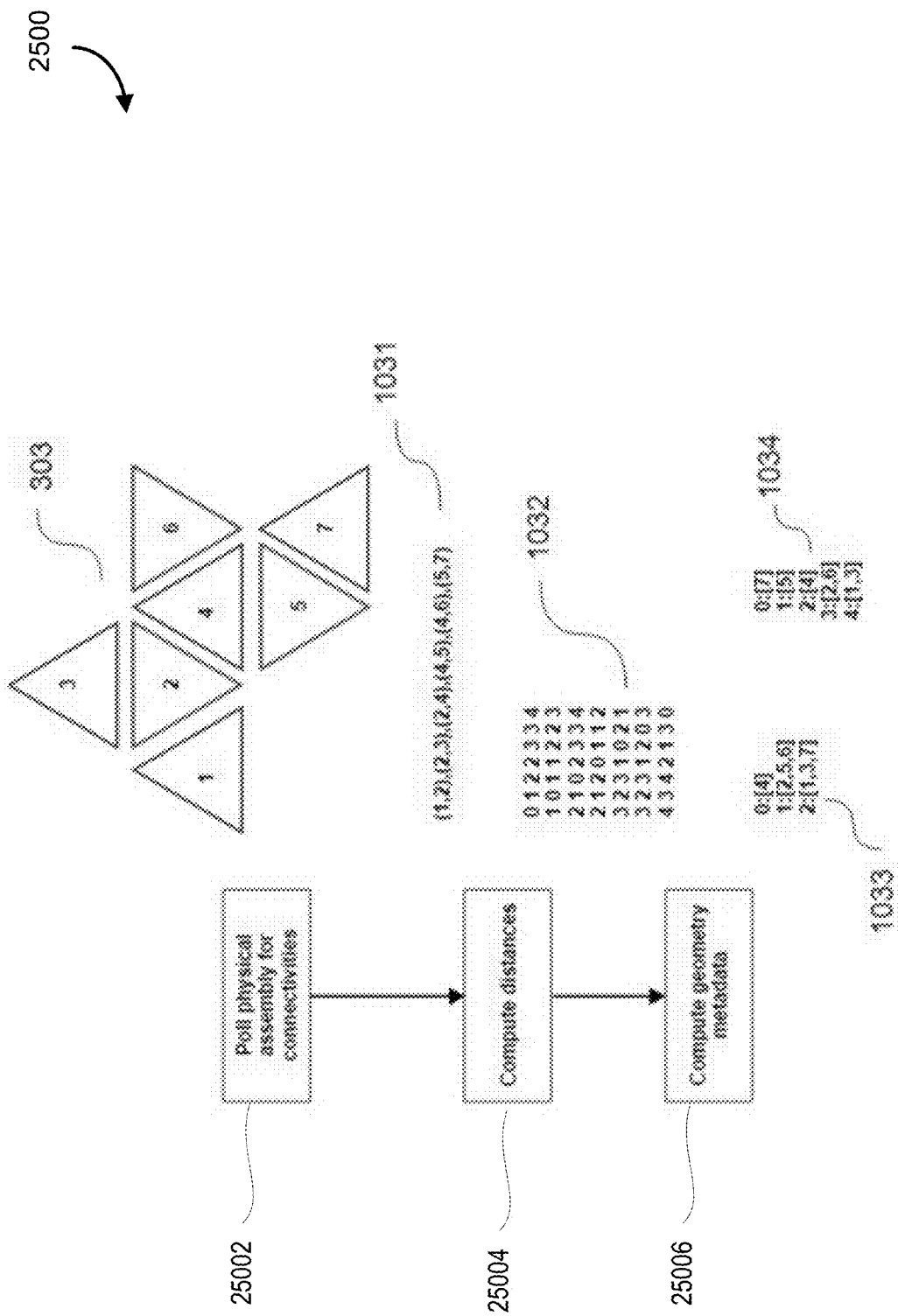
FIG. 25 is a diagram of an assembly is a union of individually addressable panels of LED lighting units, where each panel is of a polygonal shape and joined to neighboring panels through a wired connection, according to some embodiments. Graphs, matrices, and workflows are also depicted in FIG. 25.
Figure 26:
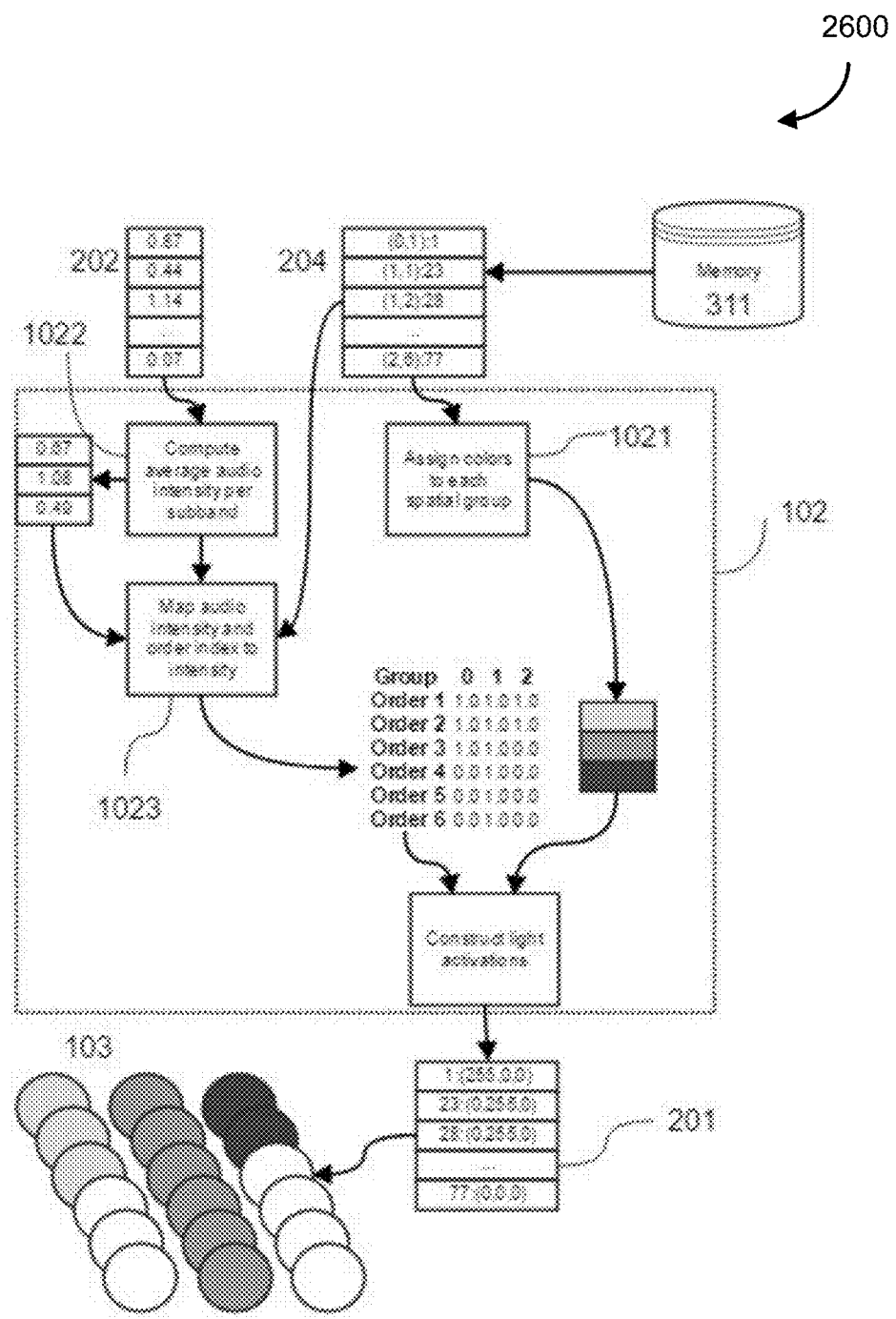
FIG. 26 is a workflow diagram of a rendering mechanism according to some embodiments.

In some embodiments the assembly is a union of individually addressable panels of LED lighting units, where each panel is of a polygonal shape and joined to neighboring panels through a wired connection, see 303 in illustration 2500 of FIG. 25, showing an example connection and associated determination of geometry (e.g., steps 25002, 25004, 25006). The wired connection includes at least data transmission through an Ethernet connection, PLC or a serial port or pin. The connection can also transmit electrical power and provide mechanical support. In this embodiment each lighting panel has a unique identity and can obtain the identity of the panels connected to it. It is hence possible for a geometry module 103 to query a given light assembly 303 for its connectivity graph 1031. The graph can be mathematically represented as an adjacency matrix, an adjacency list or any equivalent exhaustive representation of a non-directional graph.

In a more specific embodiment, the panels are mechanically and electrically connected as described in an earlier section either by a rigid block inserted from one panel to the other by an attractive magnetic force, or by a secondary piece of printed circuit board, which bridges the two or more panels. The wired connection is therefore comprised of a bidirectional pin formed by a conductive connection between the rigid block of the one panel and the corresponding indentation of the other panel, or by conductive traces part of the bridging piece of printed circuit board. The connectivity graph thus obtained is either identical to or trivially derived from the layout detection method as defined earlier. The light is emitted from the appreciably flat panel into the environment through the scattering of the light injected into the panel as the light encounters microscopic particles or surface imperfections that are part of the panel.

In a computer memory, the adjacency matrix and adjacency list are stored as an array or an array of arrays of integer values, where the values either represent a Boolean variable that denotes presence of absence of connection between devices, or pairings of lighting device identifiers that are connected. In this embodiment every lighting device part of the assembly is assumed to be connected to at least one other lighting device; in other words, degree at least one.

As per these examples, the graph is connected. The maximum degree is determined by the physical structure of each lighting device. In case each lighting device is in the form of a triangle with a single connector per side, the maximum degree is three; in case each lighting device is in the form of a square with a single connector per side, the maximum degree is four. The geodesic distance between any two nodes in the graph, that is the number of vertices on the shortest path between the two nodes, can be computed and put in the form of a distance matrix 1032.

From a graph representation, two-dimensional coordinates can be derived through standard trigonometry. The coordinates will thus be defined in a local frame of the assembly. The coordinates can be joined into a coordinate dictionary, with each entry keyed on the unique identifier of the lighting devices. In a computer memory, the coordinate dictionary is stored as an array of arrays where at least one value of the array enables a matching of an array to a particular lighting device, defined by its unique identifier, and the other values in the array are integer or floating point numbers that define a Cartesian coordinate in the local frame of the assembly.

In some embodiments the assembly is a union of lamps or luminaires not directly joined through a wired connection. They can instead be wirelessly connected to each other in a mesh network, or to a central control hub in a star network, where the wireless communication protocol can be, but not limited to, Bluetooth™, Zigbee™ and W-Fi. The wireless connection can enable the determination of distance or proximity between individual lighting devices.

Instead of a graph adjacency matrix, a matrix with elements that denotes proximity in a Euclidean sense is obtained, or a distance matrix. Through an agglomerative clustering, a connectivity graph can be derived that defines in a consistent sense if two lighting devices are neighbors. A coordinate dictionary, as defined above in terms of an array of integer or floating point arrays, can also be obtained from this data. It should be noted that the accuracy of the geometrical properties derived this way can be lower than for the embodiment that uses wired data connections.

This can be due to imprecisions in translating a network node-to-node connection strength or transmission speed to distance, which can derive from physical obstacles that make said connection strength or transmission speed lower than a the spatial separation alone would create. For most applications described in the following sections, this reduced accuracy is expected to still allow a meaningful visualization, although some inconsistencies cannot be ruled out for every embodiment.

It is also contemplated that the coordinate dictionary is manually input to the method through a touch screen interface or keyboard input. The user can provide the integer or floating point numbers comprising the array of the coordinate dictionary by manually enumerating them on a keyboard connected to a memory, or by using interactions via a touch screen and an emulation of the physical light assembly on said screen to define relative coordinates.

This process requires a greater manual effort by the person installing the physical light assembly, and precludes dynamic changes of the assembly after initial setup. Also in this case the alternative geometric representations, such as the connectivity graph and distance matrix, can be evaluated.

The geometrical data obtained from either of the methods described above, from either of the light sources above, is used to construct a plurality of geometry metadata 205, which subsequently are stored in memory for retrieval 204 by the rendering module 102 in order to spatially map audio activations in a varied, meaningful or artistic manner to the physical light assembly. Specific geometry metadata and methods to derive such data are described in the following sections. It is understood that the enumeration is not exhaustive and other types of geometry metadata can be contemplated.

The center of geometry of the physical light assembly can be evaluated from the coordinate dictionary through an arithmetic average of the coordinates, $C_k^l$:

$$c_k^{CG} = \frac{1}{M} \sum_{l=1}^{M} c_k^l$$

For a planar assembly the coordinates are two-dimensional; for a non-planar physical assembly the coordinates are three-dimensional. The coordinates of the lighting devices are represented in memory as an array of integer or floating point number arrays, as defined above, and the center of geometry is evaluated through arithmetic additions, one for each geometric axis, across all lighting devices of the coordinate array elements, followed by division of the total number of elements in the addition.

After these operations are carried out on a processor, an array of integer or floating point numbers is obtained containing the coordinates for the center of geometry. The lighting device with coordinates closest to the center of geometry is assigned as the center device. The other devices in the assembly can be assigned an index based on their separation from the center. In some embodiments this index is assigned by determining the number of edges on the shortest path from the center device to the given device, or the geodesic distance.

There are processing operations to evaluate the shortest path between two nodes in a graph through a set of logical and arithmetic operations on the array representation of the graph connectivity that can be carried out on a processor; these algorithms include, but are not limited to, Dijkstra's method. In some embodiments the graph of lighting devices is relatively small (less than thousand nodes) and sparse, which implies finding the shortest path requires a relatively small number of logical and arithmetic operations. Consequently a relatively small amount of time is required to evaluate these paths in the connectivity graph on typical processing components and electronic circuitry available The indices can be arranged in a dictionary where the key is the number of edges from the center device, where an index zero refers to the center device itself, and the value associated with each key is an array of lighting device identifiers. In some embodiments, the dictionary is stored in memory as an array of arrays, in which at least one element can be matched against an integer or floating point value that denotes the distance relative the center device, and to that element an array of integer or floating point numbers is associated, where each element of the array can be matched with the set of unique lighting device identifiers. The dictionary is referred to as the center-out dictionary 1033. A variation to this method is to define the center device as the graph center or Jordan center. The graph center is defined as the node, for which the maximum shortest path to all other nodes is the smallest. All other computations remain the same.

The physical assembly can be approximated as being of an ellipsoid shape (if it is three-dimensional) or ellipse shape (if it is two-dimensional). The method to determine the shape of the ellipsoid or ellipse proceeds by evaluating the covariance of the three or two coordinate elements over the M lighting devices.

$$C(c_k, c_l) = \frac{1}{M} \sum_{n=1}^{M} [c_k^n - avg(c_k)] \cdot [c_l^n - avg(c_l)]$$

For the case of three-dimensional coordinates this produces a 3-by-3 matrix, and for the case of two-dimensional coordinates this produces a 2-by-2 matrix. The matrix is evaluated through a finite set of arithmetic and logical operations applied to the arrays in memory that represent the coordinate matrix, across all devices for each of the two or three spatial dimensions, all executed on a processor or similar electronic circuitry.

The eigenvectors to the matrix can be shown to be the axes of the ellipsoid or ellipse, where the eigenvector associated with the greatest eigenvalue is the major axis, or in other words, the vector that defines the spatially most extended line through the physical light assembly. The eigenvalue problem is solved numerically by method operations executed on a processor. Two or three arrays of integer or floating point numbers are thus obtained comprised of two or three elements, respectively, and to each vector there is an integer or floating point number associated, which represents the eigenvalue. Each lighting device coordinate is projected onto the major axis of the ellipsoid or ellipse.

The array of lighting device identifiers are sorted by the sign and value of the corresponding projected coordinate. The sorted array of lighting device identifiers can be understood as the spatial arrangement of the devices from one outer edge to the other outer edge of the physical assembly when viewed as a collective of lighting devices. The device with the greatest negative value is the first element in the list and named as the long-axis root device. In a manner identical to what is described above, every other device can be assigned an index based on the number of edges in the shortest path to the long-axis root device in the connectivity graph.

The dictionary thus obtained is referred to as the long-axis dictionary 1034. In some embodiments, the dictionary is stored in memory as an array of arrays, in which at least one element can be matched against an integer or floating point distance relative the long-axis root device, and to that element an array of integer or floating point numbers is associated, which can be matched with the set of unique lighting device identifiers.

A variation of the long-axis dictionary can be obtained by further splitting the devices along the eigenvector with second greatest eigenvalue. The coordinates are projected on the second eigenvector as well as the first eigenvector. These values are grouped in a set number of groups that cluster as distinctly as possible around some values. For example, if the projected coordinates on the second eigenvector cluster tightly around either of three values, the devices can be separated into three appreciably parallel lanes along the long axis. Ideally the number of devices in each of the three clusters should be similar, otherwise the lanes will be different in length.

However, if this condition holds, a dictionary can be constructed keyed on two indices: the lane identifier and the number of edges in the shortest path to the long-axis root device of that same lane. The dictionary thus obtained is referred to as the long-axis lane dictionary. In some embodiments, the dictionary is stored in memory as an array of arrays, in which at least one element can be matched against a unique group index, and at least one other element can be matched against an integer or floating point distance relative the long-axis root device in the set of devices associated with the given group index, and with the union of the two types of matching elements there is an array of integer or floating point numbers associated that can be matched with the set of unique lighting device identifiers.

The physical assembly can be comprised of apparent clusters of individual devices. For example, the devices can be spatially organized such that they visually approximate the shape of a dumbbell, that is two large groups of devices with only a small and spatially narrow assembly of devices between the two groups. For example, the devices can be spatially organized such that they form concentric rings of an increasing diameter.

For example, the devices can be organized such that they form an octopus-like shape, that is a center of a high number of clustered devices with a number of devices forming long but narrow offshoots from the center. Other spatial arrangements can be contemplated where to a human observer the individual devices form a larger structure that in turn can be comprised of loosely connected sub-structures or clusters; the human visual perception has been shown to be predisposed to discover patterns and shapes in collective assemblies of visually distinct components.

Based on either the coordinate dictionary or the graph connectivity, a variety of clustering algorithms can be used in order to group the devices such that their assignment to a group corresponds to what appears as an intuitive spatial grouping to a human observer. Clustering methods and their implementations for execution on a processor or similar electronic circuitry include, but are not limited to, k-means clustering, agglomerative clustering, spectral clustering, Ward clustering, DBSCAN clustering.

Clustering methods can require parameters to control how they perform the grouping, and some methods are less suitable to discover clusters of non-spherical shapes, or clusters that are only moderately separated. The choice of method require testing or another means of automatic or manual configuration. Since the lighting devices are represented by at most a three-dimensional coordinate, and that the number of devices is in typical application small (less than one thousand), the computational effort is relatively small to execute the clustering algorithms on a processor with access to a memory in which arrays of integer or floating point numbers representing the device coordinates are available.

Once a grouping has been obtained, any of the previous methods to assign an ordering of the devices within the groups can be done, such as the index of separation from the center device in that group, or the index of separation from the long-axis root device in that group. In some embodiments, the dictionary thus obtained is stored in memory as an array of arrays, in which at least one element can be matched against a unique group index defined by a clustering method, and at least one other element can be matched against an integer or floating point distance relative some root device in the set of devices associated with the given group index, and to the union of the two matching elements there is an array of integer or floating point numbers associated that can be matched with the set of unique lighting device identifiers.

In some applications the user has spatially arranged the individual lighting device in a very specific manner to resemble some figure or shape of cultural or personal significance, and where the user desires to specifically define a root or center device as the origin of a sorting order for the other devices. The user may also desire to manually group devices to resemble specific shapes or figures when illuminated. A grouping that assumes the shape of a heart symbol when illuminated can be contemplated, where the entire physical arrangement otherwise lacks such a shape.

In some embodiments the user can define such groupings or root devices through a touch-screen interface. The coordinate dictionary, as obtained from the physical light assembly as described above, enables a graphical emulation or rendition of the physical assembly on a screen.

The user can interact with said emulation or rendition, through touch or voice commands for example, and thus define groups of custom arrangements. It increases the effort required by the user upon installation, but enables an arrangement as specific as desired. In some embodiments the system can access relative coordinates to culturally significant shapes from an external or local database.

A matching search can be run against the actual coordinates of the physical light assembly and if a match is found within some threshold, metadata on nodes of significance can be accessed and used to determine groupings and root or central devices. The representation in memory in terms of integer or floating point arrays of the manually defined groups can be identical in structure to the previous representation that employs clustering algorithms to derive the groups of lighting devices.

For completeness, some embodiments assign group or order or root device or other geometric variable or a plurality thereof randomly. This is for cases where the exact spatial arrangement is considered irrelevant to the desired visualization, or where the random nature of the varying light is a desired feature. The assignment can furthermore change with time in a deterministic or random manner, which leads to additional dynamic qualities to the visualization.

The specific embodiments described above sort or group the individual devices in the physical light assembly on basis of some geometric property of the entire assembly. Other methods of sorting and grouping can be contemplated. The common quality is that the sorting or grouping enables a mapping of audio to light in the rendering module that is spatially aware of where each device exists in a larger assembly, and thus the visualization can be played out on a larger visual unit and in forms aware of meaningful spatial groupings as perceived by the human observer, rather than on only a single device of fixed structure and dimensions.

Illustrative embodiments of complete visualizations are provided herein. In some embodiments the mathematical representation is a dictionary keyed on two indices, group and order, with each key associated with a list of device identifiers, where a list can contain one or a plurality of elements, and the group and order indices can take one or a plurality of values.

The dictionary in this general form is referred to as geometry metadata 205. It is stored in a digital memory, or first transmitted to a separate device and there stored to a memory 311 for subsequent retrieval by the rendering module 102. In some embodiments, the dictionary is transmitted and stored as an array of integer or floating point arrays, in which at least one element can be matched against a unique group index, and at least one other element can be matched against an integer or floating point order within a group, and to the union of the two matching elements there is an array of integer or floating point numbers associated that can be matched with the set of unique lighting device identifiers.

In some embodiments the geometry module 103 repeatedly polls 401 the physical light assembly 303 for changes.

When a change to the graph connectivity or coordinate dictionary is detected, either because the user intentionally removed a device during the visualization of audio, or because the device malfunctioned due to electrical or mechanical failure, the geometry module can trigger the event of computing the geometry metadata 205 anew, update its representation in memory, such that the geometry metadata 204 accessed by the rendering module 102 correctly reflects the physical arrangement that is at that time available for control.

The duration between polling events can be configured to balance available computational resources and the urgency of mapping light to the current arrangement. Values such as 10 times per second, 4 times per second, 1 time per second, 12 times per minute have been contemplated.

Rendering Module

The rendering module 102 receives for any given point in time the audio activations 202 from the sound transformation module 101 and has access to the geometry metadata constructed by the geometry module 103 that describes some or all geometrical relations of the physical light assembly 303. The rendering module computes a set of light activations 201, which after a conversion to electrical control commands 111 in a manner as described above, lead to a specific lighting output from the physical light assembly 303. The light activations can be mathematically represented as a dictionary that associate each unique lighting device identifier to a color coordinate and intensity; other mathematical representations can be contemplated. The rendering module 102 includes or controls physical computer hardware to generate discernable effects and lighting visualizations using the light activations 201, for example.

The dictionary is stored in memory as an array of arrays of integer or floating point numbers, where at least one element can be matched to a unique identifier of a lighting device, and to each such element there is associated an array of integer or floating point numbers that fully define an optical spectrum output of a lighting device once processed by the conversion module 111. Because the rendering module has information on both the current sound and the geometry of light sources, more varied visualizations are possible. The geometrical metadata enables a contextually aware creation of light output. In other words, a given segment of music, or audio in general, can be made to correspond to a specific set of optical outputs from a specific set of relative spatial locations or contexts.

A physical light assembly that is comprised of a plurality of lighting devices that are located in unique positions in space, has additional degrees of freedom to employ in order to display the audio visualization. The additional degrees of freedom furthermore imply that the total number of configurations the light wave 212 can assume is very high.

Because of the spatial contextual awareness, transitions between configuration as time evolves can include geometrical transformations of the light sources, which generate a meaningful visualization of audio or audio transitions to the human observer, where the perception of abstract concepts of sound and vision such as shape, speed, mood, intensity, similarity among others can be considered. Hence, highly tailored visualizations of audio, customized to specific, collective or individual needs and preferences can be made.

As described herein, the human perception of sound and light is complex, without a universal optimum that can be applied across cultures, age groups, or individuals without some or significant loss of fidelity. Non-limiting examples of rendering module algorithms are described next.

Without loss of generality, the audio activations are assumed to be at any given point in time an array containing elements corresponding to N frequency windows, obtained by any of the methods described in the previous section. Without loss of generality, the physical light assembly is assumed to be comprised of M individually addressable lighting devices.

For the description below the light output from any given lighting device is represented as three values in the range 0 to 255, where the relative values define a point in the RGB color space, and the magnitude of the three values defines the intensity; as described above, other color spaces can be used. Without loss of generality, the audio activations are assumed to be updated at a rate of F times per second, and the light activations at a rate of G times per second.

In one embodiment of the rendering algorithm, the computation starts with the average audio intensity at the given point in time t.

$$E(t) = \frac{1}{N} \sum_{n=1}^{N} Y(\omega_n, t)$$

The summation is executed on a processor by the addition of all integer or floating point numbers in the array of audio activations for the given point in time, divided by the total number of elements, which is equal to the number of frequency windows, or principal windows or other type of division of the audio decomposition.

The average audio intensity can be transformed to a color point by interpolating along an intersection of the color space. In other words, the average audio intensity selects a value along some color spectrum, S(x), where x is an interpolation variable. Examples of color spectrums include:

Blue-green-red: the blue element of the RGB vector is 255 or near its maximum at low values of the interpolation variable x, and the green and red elements are zero. For increasing x, the blue element decreases monotonically, while the green element increases monotonically. At an intermediate value of x, the green element reaches 255 or near its maximum, while both the blue and red elements are at zero or close to zero. For further increases to x, the green element decreases monotonically and the red element increases monotonically until at high values of x the red element reaches 255 or near its maximum, while both blue and green elements are at zero or close to zero. For even higher values of x, the RGB element remains constant at maximum value for red, and zero or close to zero values for blue and green elements.

Blue-red: the blue element of the RGB vector is 255 or near its maximum at low values of x. Unlike the blue-green-red spectrum, the green element is zero for all value of x, and instead it is the red element, which increases as the blue value decreases with increasing x. As a consequence, at intermediate values of x, the output color is a shade of purple, which is a color absent from the blue-green-red spectrum, as defined above. For even higher values of x, the RGB element remains constant at maximum value for red, and zero or close to zero values for blue and green elements.

Sunset: a black-body radiator generates light along a one-dimensional segment of the color space, ranging from deep red at low surface temperatures to cool-white at high temperatures, and warm-white at temperatures in between. As the sun sets it creates light very close to a black-body radiator that is cooling down from high temperatures. The RGB elements can hence be set such that at low values of x the color point corresponds to a cool-white similar to sunlight as the sun is high in the sky, and with increasing values of x the RGB elements shift to correspond to a color similar to the setting sun until a deep red is achieved.

The elements in the light activation array are set to be equal to the color point obtained by using the average audio intensity as the interpolating variable to any one of the color spectrums defined above, or any other one-dimensional intersection of the color space.

At the next point in time, a new average audio intensity is evaluated, and the visualization is updated.

With this rendering method, audio variations generate uniform changes to color across the entire physical light assembly, with constant intensity. This is a simple rendering, which does not utilize the context awareness.

Figure 6:
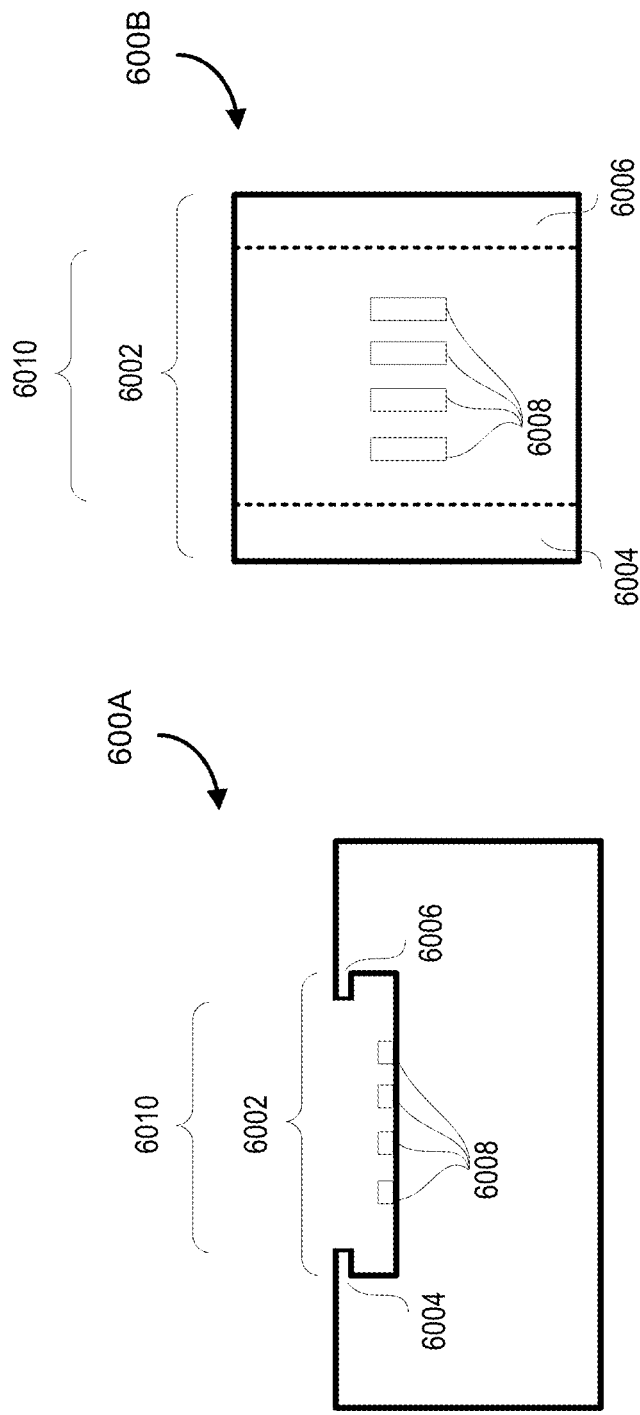
FIG. 6A is a side plan view of an aperture, according to some embodiments.
FIG. 6B is a top plan view of the aperture, according to some embodiments.

In another embodiment of the rendering mechanism, illustrated in FIG. 6, the computation starts with the evaluation 1022 of the average audio intensity per sub band.

$$E^w(t) = \frac{1}{|\Omega(w)|} \sum_{n \in \Omega(w)} Y(w_n, t)$$

where w is a sub band index and $\Omega(w)$ is a disjoint subset of the audio activation indices of set size $|\Omega(w)|$. These subsets can be divided such that low frequency audio activations are grouped together, intermediate frequency audio activations are grouped together, and high frequency audio activations are grouped together. This division can be understood as the bass, midrange and treble of the music or audio.

The summations are executed on a processor by the addition of all integer or floating point numbers in the array of audio activations for the given point in time, on the logical condition that the array elements are part of a defined subdivision of sub bands; the summed values are numerically divided by the total number of elements in the corresponding sub band.

An array of integer or floating point numbers of size equal to the number of sub bands are obtained. The long-axis lane dictionary, a part of the geometry metadata 204, assigns to every lighting device a group and an order within the group, as defined in a section above.

The average audio intensity for the low frequency sub band is used to control the light output of the lighting devices in one of the geometrical groups; the average audio intensity for the intermediate frequency sub band is used to control the light output of another of the geometrical groups; the average audio intensity for the high frequency sub band is used to control the light output of a geometrical group other than both of the previous two groups. For each group a color point is selected 1021 from a spectrum S(x), where the interpolation variable is the normalized group index. For example, if the blue-green-red spectrum is used, the low frequency group can be assigned the color blue, the intermediate frequency group can be assigned the color green, and the high frequency group can be assigned the color red.

The intensity for an individual lighting device, D, in a group, g, is assigned 1023 on basis of its order index, k, and the average audio intensity for the sub band associated with the group as defined by the function:

$$I(D,t)=[1+\exp(k-\gamma \cdot E^g(t))]^{-1}$$

The equation encodes the following relations when executed on a processor or similar electronic circuitry: If a lighting device in a given group at a given time, has a low order index, the average audio intensity of the associated sub band can be anything between relatively low to relatively high, in order for the lighting device to be assigned a high intensity. If a lighting device in a given group at a given time, has a high order index, the total audio intensity of the associated sub band can be relatively high, but not relatively low, in order for the lighting device to be assigned a high intensity; otherwise the intensity is set to a low value.

The reason for these logical relations is: if the value of the exponent in the above equation is a positive number, that is the order index is greater than the scaled audio intensity, the function evaluates to a value near zero; if the value of the exponent is a negative number, that is the order index is smaller than the scaled audio intensity, the function evaluates to a value near one.

Other forms of sigmoidal functions can be used with the same effect, such as but not limited to the Gompertz function and the hyperbolic tangent. The parameter γ is calibrated and in some embodiments depends on the maximum value of the order index in the given geometric metadata. Given the intensities thus defined and the color defined as previously, the light activations 201 are constructed, which describes for each lighting device what RGB elements to display. In memory this is stored as an array of arrays of integer or floating point numbers, where at least one element can be matched to the unique lighting device identifiers, and with each such element an array of integer or floating point numbers is associated with elements that uniquely define a point in color space and a light intensity, which in some embodiments can be an array of three elements, see 201 in FIG. 6 for an illustration.

With this rendering method, three lanes along the longest geometric axis of the physical light assembly 103 will display in distinct colors bars that move up and down depending on the intensity of the pitches of the music; for example, a rhythmic beat created with a bass drum mostly produces a rhythmic motion of colored light up and down one of the plurality of lanes of lighting devices, while a soprano aria produces motion and intensity of another color of light in another of the plurality of lanes of lighting devices. This rendering method utilizes the contextual awareness, in particular what shape the lighting devices create as a collective, as well as how each device is positioned relative the collective shape.

In another embodiment, each audio activation is assigned to a unique lighting device. The assignment is done by order index, in other words, $\overline{Y}(\omega_k, t)$ determines the light output of the lighting device with order index k. The order indices can be computed and stored in a dictionary as described above, for example based on its relative distance to the center of geometry.

The color for each device is assigned based on the order index by using it as the interpolation variable for any spectrum, such as but not limited to the ones defined above.

The intensity for a given lighting device is set by the associated audio activation, in some embodiments following a transformation by a monotonically increasing function. In case there are more lighting devices than audio activations, that is M>N, one or several audio activations are assigned to multiple lighting devices. In case there are fewer lighting devices than audio activations, that is M<N, multiple audio activations are assigned to the same lighting device, and the average of the audio activations are used to assign intensity of light With this rendering method, sections of high audio intensity lead to high light intensity of a plurality of colors, and sections with high audio intensity in only a subset of the frequency sub bands lead to high light intensity in only some parts of the physical light assembly, where color and location within the assembly is determined by which sub band is engaged.

With this rendering method sections that contain a progression of pitches will illuminate only a subset of lighting devices, but to a human observer the light is stepping spatially outwards in the collective shape of the physical light assembly and as the progression reaches higher pitches.

In another embodiment, illustrated in FIG. 7, the average audio intensity is evaluated as above and a color is obtained by interpolating along a color spectrum 1025, for example blue-red, as defined above. The intensity of light is obtained by linearly mapping the average audio intensity to light intensity. At the current time t, only the root device as defined in the geometry metadata is assigned this color and light intensity. The root device can be determined by any of the methods above, for example, minimum distance to the center of geometry of the physical light assembly. The geometry metadata 204 also contains the center-out dictionary, which assigns an order to each device on basis of the geodesic distance between the given lighting device and the root device. The color and intensity of the lighting devices that are associated with an order index greater than the root device are assigned 1026 as follows:

The color of a lighting device of order index k, at time t, is set to the color of lighting devices of order index k−1 at time $t-t_S$, where the previous colors are retrieved as an array of integer or floating point numbers from memory.

The intensity of a lighting device of order index k, at time t, is set to the intensity of lighting devices of order index k−1 at time $t-t_S$, multiplied by a factor, such as but not limited to 1.0, 0.9, 0.8 or 0.75.

In the definitions above $t_S$ is the time between updating the lighting activation, $t_S=1/G$. The color arrays for each plurality of lighting devices of different order indices are merged 1027 into a single array. In this array at least one element can be matched to the unique lighting device identifiers and to each such element a color array as defined above is associated. With the corresponding intensities the light activations are evaluated 1029 and the integer or floating point arrays are transmitted to the physical light assembly 103. The memory is updated 1028 with the array that defines the new set of colors, such that this array can be retrieved at the next point in time. In this embodiment the audio at a given point in time determines instantaneously only the color and intensity of a single lighting device.

However, by a set time lag, the audio determines the color of devices that spatially spread out from the root device. The geometric metadata encodes how the visualization will transition between consecutive points in time. In this embodiment of the rendering module, an extended period of high audio intensity will color the entire physical light assembly in the color associated with high intensity, in a manner where the light appears to a human observer to be transitioning or radiating from a source at the center of the physical light assembly.

On the other hand, audio that consists of rapid periods of high intensity with sections of relatively low intensity between, such as in a music tune with a well-defined drum beat, will produce a progression of light in the physical light assembly as rings of colors, which to the human observer appear to be moving radially outwards from a source device. The temporal audio variations over a longer period of time is hence reflected in the light pattern and in transitions of the light pattern. The lag time, $t_S$, can be equal to the time between audio activation updates. The lag time can also be an integer multiple of the time between audio activation updates in case the frequency of audio activation updates is deemed to produce a too rapidly updating visualization. The lag time can be manually set by the user, or it can be calibrated and set during manufacturing.

The lag time can also be set by secondary metrics that the sound transformation module passes to the rendering module. For example, the BPM quantifies the general speed of the audio, hence the lag time can be set to decrease with increasing BPM, and vice versa.

This rendering method utilizes the contextual awareness, first with respect to what is a meaningful source node, from which expanding rings of color and light will appear to emanate.

Second, the contextual awareness is present in how colors and intensities are transitioning with time over the physical light assembly, in particular such that lighting devices inherit color and intensity from spatially nearby devices.

Pseudocode Rendering Examples

Figure 27:
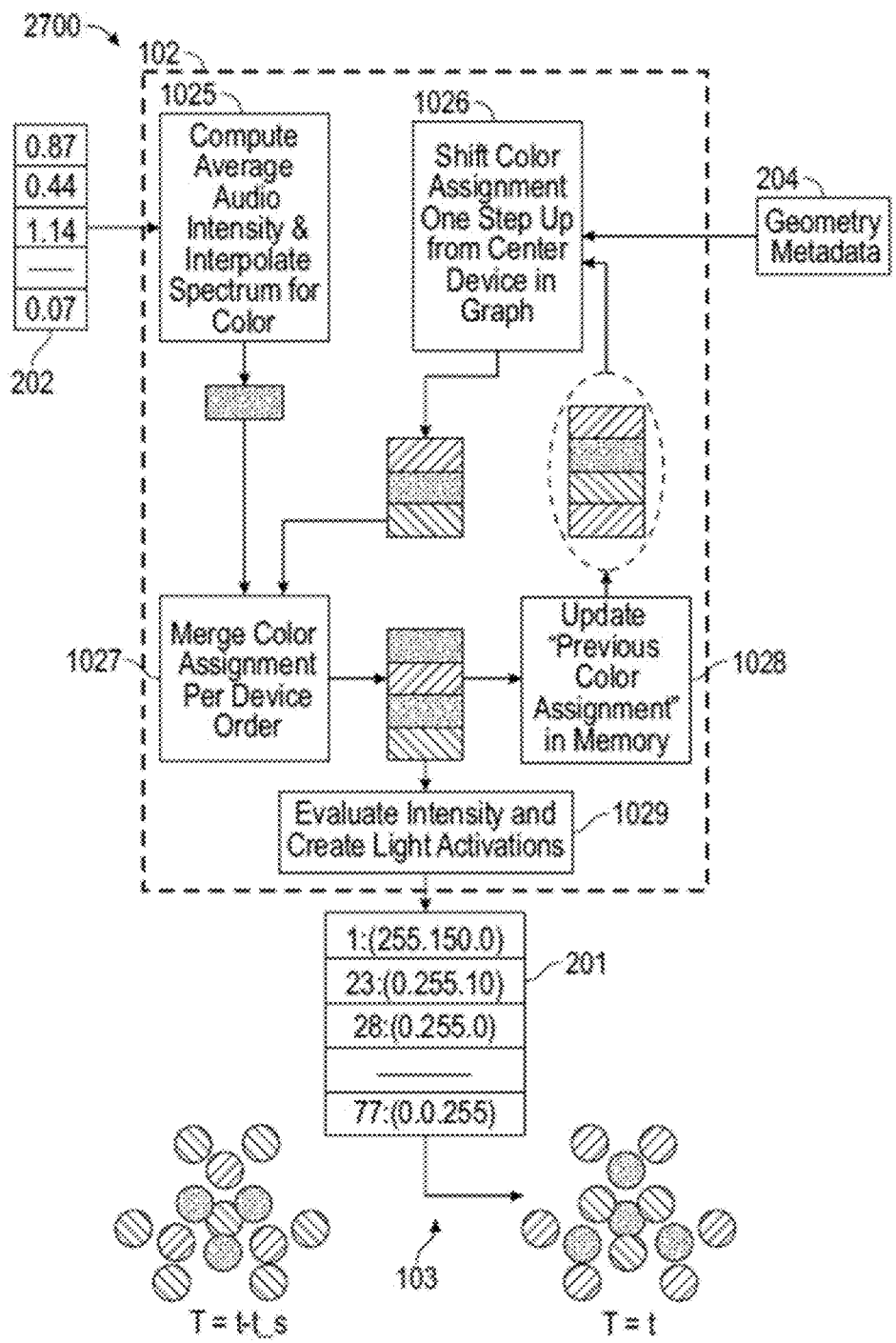
FIG. 27 is a workflow diagram of a rendering mechanism according to some embodiments.

In order to further illustrate the embodiment described above and illustrated in FIG. 27, as well as outline other embodiments described above, pseudocode is provided in Code examples 1 to 3 and described in detail next.

The pseudocode in example 1 represents a high-level software routine that initially determines how the light device assembly is put together by calling lower-level routines that sense the physical connections between the distinct light devices part of the assembly. The array of connections is converted into geometry metadata, which can include several types of data structures. The visualization is run by executing logic at a set interval of time per iteration, as described above. The pseudocode does not specify exactly how the time per iteration is implemented, but it can be a delay function that pauses the execution such that the total time per iteration is equal to the desired duration.

A segment of audio in the basic PCM format is retrieved from calling the lower-level routines of the transducer. In case the audio is obtained as a digital file, this line is replaced by a function that retrieves and converts a segment of digital audio. The audio segment undergoes a wave transform. In an example embodiment this involves a call to an optimized FFT routine, but other wave transforms are possible, as described above. The audio activations are normalized in one of the ways described earlier in order to better map the physical wave characteristics obtained from the wave transform to the psychoacoustical characteristics relevant to the human observer.

Based on the set of audio activations and the available geometry metadata, one of many possible rendering routines are run to obtain light activations. They specify color coordinate and intensity for each individual device in the assembly. This data is stored in a data structure as integers or floating point numbers. This data structure is subsequently passed to lower-level routines, which execute logic that ultimately adjust the drive currents of the plurality of LEDs in the individual light devices.

The commands are iterated until some interruption command is triggered, which can be generated by the pressing of a button in a control software interface, or the physical removal of the transducer from the controller.

Example 2 shows pseudocode for a particular version of the function to compute geometry metadata that is part of the pseudocode in Example 1. This particular version creates the center-out-dictionary.

The first step derives from the connection array an average Cartesian coordinate based on all devices represented in the connection array. This average represents the geometrical center of the physical assembly. The Euclidean distance is computed for all devices relative this center. The second step is to find the device in the assembly that is the closest to said geometrical center, in other words, the device with the minimum Euclidean distance. As defined above, this is referred to as the root device. The graph distance is subsequently computed between all devices and the one assigned as the root device. This step can use any of the methods described in an earlier section. The dictionary can be represented as a data array with the index of the device as an integer key, and the relevant graph distance as an integer value associated with that key. The root device distance value is by definition equal to zero.

In Example 3, pseudocode for one possible way to render the audio activations onto the physical assembly is given. As input the function receives the center-out dictionary, as described above. This is an array of integers or floating point numbers, where each value in the array is a function of how much of the aggregate audio is comprised of audio of the associated sub band or sub bands or other output of a wave transform, as described earlier.

The first step is to compute a total audio intensity, where the sub band values are averaged. Since the audio activations are normalized from the execution of a previous function, they can be assumed to be in most instances in the range zero to one. A light intensity is computed as an integer or a floating point number obtained by a linear mapping of the audio intensity. The mapping can be as simple as the identity transformation.

The color is in this case constructed from a piecewise linear function that maps the total audio activation number into a triple of floating point numbers each in the range zero to one. The exact shape of the function can vary between embodiments, but in the specific example in Example 3 the function works as follows: At very low audio intensities, the floating point number corresponding to blue is close to one, while the other two numbers are zero or near zero. As the audio intensity increases, the blue component of the triple begins to decrease, while the green component increases, thus gradually turning the color into cyan. At intermediate audio intensities the blue component has reached zero, while the green is one. As the audio intensity further increases, the green component decreases and red increases, while blue remains at zero. In other words, the color is gradually turning towards yellow and amber. Finally, at very high audio intensity, the color becomes red. This is one example, many others can be contemplated as described earlier.

Based on the computed light intensity and the color triple, the RGB data array is computed by multiplying the intensity with the color triple as well as multiplying the float numbers with 255. The latter factor is used assuming that is the value a lighting device in the assembly interprets as maximum drive current. Other values can be used.

Each device in the assembly are assigned an RGB data array based on its degree of separation from the geometrical center as well as the RGB data arrays in previous iterations. Specifically, the devices that are separated from the root device by one degree, are assigned the RGB data arrays that were computed as described above, but for the audio activations in the previous point in time (in other words in the previous iteration of the while-loop in Example 1). For two degrees of separation, the RGB data array is the value computed as above, but two steps previous to the current point in time; and so forth. Only the root device is assigned the RGB data array computed from the audio intensity of the current point in time.

The final step is to update the array of previous RGB data arrays by prepending the current one. In the next iteration the RGB data arrays have hence been shifted one step higher in the array.

Example 1

Pseudocode of the highest-level routine to process audio obtained from a transducer in real-time and map it to a geometrically characterized physical assembly of lighting devices.

```
# Analyze and represent layout
connection_array = discover_device_connections( )
geometry_metadata = compute_geometry_data(connection_array)
# Run visualization until interrupted
while True:
# Retrieve audio segment for most recent time window
pcm_segment = transducer_retriever(time_gap)
    # Construct normalized audio activations
    audio_act = wave_transform(pcm_segment)
    audio_act_norm = normalize(audio_act)
    # Map audio activation to light activation
    light_act = render(audio_act_norm, geometry_metadata)
    set_light(light_act)
    if interrupt_received( ) is True:
        break
```

Example 2

Pseudocode for the particular geometry metadata that define how far within the graph of connected lighting devices each device resides relative the one closest to the geometrical center. The returned data structure is referred to as the center-out-dictionary.

```
function compute_geometry_data(connection_array):
    # Derive distance from center for all devices
    coords = compute_coords(connection_array)
    avg_coords = compute_average(coords)
    for device in devices:
        dist_to_center[device] = euclid(coords[device], avg_coords)
    # Set root device and graph distance to all other devices
    dist_min = min(dist_to_center)
    root_device = argmin(dist_to_center)
    for device in devices:
        graph_dists[device] = compute_graph_dist(device,
        root_device,
        connection_array)
    return graph_dists
```

Example 3

Pseudocode for a rendering method in which color and light intensity is set by the total audio intensity, and the mapping of color and light intensity to the devices depend on their proximity to the geometrical center, such that the closer they are their values correspond to a more recent point in the stream of audio. For example, a drum beat would create a pulsating pattern seemingly emanating from the center of the assembly propagating radially outwards.

```
function render(audio_act, geo_data):
    # Audio intensity as average activations of all subbands
    audio_intensity = compute_mean(audio_act)
    # Light intensity linearly increasing with audio intensity
    light_intensity = linear_interpolate(audio_intensity)
    # Set RGB coordinate as function of audio intensity
    red = min(1.0, max(0.0, -1.0 + 2.0 * audio_intensity))
    green = min(max(0.0, 2.0 - 2.0 * audio_intensity),
    max(0.0, 2.0 * audio_intensity))
    blue = min(1.0, max(0.0, 1.0 - 2.0 * audio_intensity))
    rgb_coord = [red, green, blue]
    # Set RGB value for current audio frame
    rgb_current = 255 * light_intensity * rgb_coord
    # Propagate RGB value outwards from center
    for device in devices:
        if geo_data[device] == 0 then
            light_acts[device] = rgb_current
        else then
            light_acts[device] = get_previous_rgb(geo_data[device])
    # Prepend array of previous RGB values with current RGB value
    update_previous_rgb(rgb_current)
    return light_acts
```

Light Activation Control Examples

In another embodiment the audio activations are transformed into parameters to stochastic variables that determine the evolution of the light pattern. The light visualization and its evolution will in these embodiments reflect the audio in a more abstract sense than what a proportional relation between audio activations and light activations creates.

In one such embodiment there are two colors, called the background color and object color, picked as two distinct points from a color spectrum, and stored in memory as two arrays of integer or floating point numbers that define a point in the RGB space, or any other representation of the color space. All lighting devices except one are assigned RGB elements that correspond to the background color. The one remaining lighting device is assigned RGB elements that correspond to the object color. The intensity is set to a constant for all lighting devices. Every instance the light activations are updated, that is once every 1/G seconds, the following logical and arithmetic operations are executed on a processor or similar electronic circuitry.

The average audio intensity is evaluated, E(t), executed on a processor as described above for another embodiment.

A positive random number, v, is drawn from a distribution, such as a uniform, Gaussian or Poisson distribution. This is implemented following any algorithm known in the art to obtain a pseudo-random number or random number by a finite set of logical and arithmetic evaluations on a processor.

If E(t)<v the light activations are set to be identical to the light activations in the previous point in time, $t-t_S$.

If on the other hand E(t)≥v one neighbor lighting device to the lighting device assigned the object color is randomly selected, where the neighbor information is available in the graph connectivity data computed by the geometry module, and available in memory as an array of integer or floating point numbers. The randomly selected lighting device is assigned RGB elements that correspond to the object color, and the lighting device which in the previous point in time, $t-t_S$, was assigned these RGB elements are set to RGB elements that correspond to the background color.

This embodiment of the rendering module can produce a visualization of an apparent object of light that is moving in random directions at random speed through the physical light assembly, where the speed at which the apparent object of light is moving is on average slow in sections of low audio intensity, and on average quick in sections of high audio intensity.

The background and object color, or only one of the two, can also be evolving randomly. The interpolation variable in a given spectrum can evolve such that a step towards higher values is more probable in case the audio is predominantly of high pitch, and conversely in case the audio is predominantly of low pitch. A related embodiment computes the average audio intensity per sub band and apply the identical logic as above to a plurality of independent apparent objects of light. In other words, it is the first of the integer or floating point numbers in the array of average audio intensities per sub band, which sets the probability of transition for the first apparent object of light, and the second of the integer or floating point numbers in the array of average audio intensities per sub band, which sets the probability of transition for the second apparent object of light, and so on for all elements in the array of average audio intensities per sub band. In this embodiment, audio of mostly one pitch will create an apparent motion of one object of light at high speed while the other apparent objects of light transition between lighting devices at low speed.

The above embodiments are a particular form of a random walk, a well-studied mathematical object. Other particular variants of a random walk can be used to govern the spatial or optical transitions of the apparent objects of light and the background. The context awareness is required in order to make the evolution of light activations appear as a changing visualization to the human observer where one and the same object is moving in a background of color, rather than as a random switching of color of a plurality of individual lighting devices.

In some embodiments the rendering module employs the secondary metric, such as audio mood or genre, obtained as described in a previous section. The audio mood is mapped to a color, either from a lookup table, which tabulates associations between mood and color, or from the interpolation of a particular spectrum, with the interpolation variable being an ordered strength of the mood or emotion. The mood is expected to be constant for a given music tune, or at least a significant portion thereof, hence the color is constant as the tune, or at least a significant portion thereof, plays as well. The intensity variations over time can be set in a number of ways either identical to the embodiments described so far, or where the interpolation variable for a given color spectrum instead adjusts the intensity. In a specific embodiment the average audio intensity is evaluated E(t). The intensity of light is obtained by linearly mapping E(t) to light intensity.

At the current time t, only the root device as defined in the geometry metadata is assigned this intensity. The root device can be determined by any of the methods above, for example, minimum distance to center of geometry of the physical light assembly. Furthermore, the geometry metadata contains the center-out dictionary, which assigns an order to each device on basis of number of edges in the connectivity graph that separates the given lighting device from the root device on the shortest path between them.

The intensity of the lighting devices one order index or greater from the root device is assigned as follows: A lighting device of order index k, at time t, is set to the intensity of lighting devices of order index k−1 at time $t-t_S$, multiplied by a factor such as but not limited to 1.0, 0.9, 0.8 or 0.75. In the definitions above $t_S$ is the time between updating the lighting activation, $t_S=1/G$. In this embodiment the audio at a given point in time determines the intensity of a single device. However, by a set time lag, the audio determines how the intensity of the color, set by the mapping of the music mood, spreads out from the root device.

In another embodiment, the left and right parts of stereophonic audio are processed in parallel by the sound transformation module by any of the methods described above, and two sets of audio activations are transmitted to the rendering module. The geometry metadata can be configured such that the lighting devices are separated into two groups.

These can be obtained by the user installing the lighting devices in a shape similar to a dumbbell where the two dominant clusters of lighting devices are situated above the left and right audio speakers, respectively. The audio activations that derive from the left audio track are used in the rendering module to create light activations for the first geometric group; the audio activations that derive from the right audio track are used in the rendering module to create light activations for the second geometric group. For a given group, the RGB elements and intensity can be set according to a method described above, for example by evaluating the average audio intensity for the given track and map it to a color by interpolating along a color spectrum, and an intensity either set to a constant or set to be proportional to the average audio intensity.

This rendering method reflects the spatial qualities of stereophonic audio in the spatial arrangement of the physical light assembly.

Further Non-Limiting Illustrative Embodiments

The method to create a contextually aware visualization of audio described herein can be implemented in many different ways with respect to computing, transmission and display hardware.

In this section, illustrative embodiments are described with respect to the hardware that can be used to construct a physical embodiment of the above example method. Other example hardware embodiments are contemplated.

The data flow and processing described above and illustrated in an example 2100 shown at FIG. 21, FIG. 22 and FIG. 23 are illustrative of systems and corresponding flows 2200, 2300 that can be implemented following the design principle of separation of concerns (SoC), such that the sound pre-processing module 104 and the sound transformation module 101 require no information on the physical light assembly 303, instead they only require information on the audio data, such as if it is in the form of a mechanical wave 211 or a digital audio format 213.

Following the same principle, the geometry module 103 can be implemented to operate without any information on the audio, only with information on the physical light assembly 303. The rendering module 102 is the component, which through the audio activations 202 and the geometry metadata 204 combines information on both the audio and the light assembly in order to derive lighting control commands. However, the audio activations and the geometry metadata can be implemented to be considerably compressed relative the raw audio and geometry data, such that only the necessary information in the form of integer or floating point arrays of relatively small sizes are transmitted between modules.

Finally, the color to current module 111 is the only module, which require information on the electrical hardware of the individual lighting devices in the physical light assembly 303. A number of illustrative hardware embodiments take this separations into account.

In FIG. 28A a computing device 501 with a graphical user interface, such as a laptop, desktop computer, or smartphone, is connected to the Internet through a wired or wireless connection, such as Wi-Fi, LTE or Ethernet. Through that connection 601 a digital audio file is retrieved.

The computing device contains at least a processor and a digital memory. The computing device executes on its processor the logical instructions part of the pre-processing module, the sound transformation module and the rendering module. The particular light installation 502 is also connected to the computing device. This connection can be wireless, where the protocol can be Wi-Fi, low-power Bluetooth™ or Zigbee™, or wired where PLC or a serial port connection. Through this connection 602 the computing device sends the stream of integer or floating point arrays that represents the light activations; these arrays include at least one element, the key, that can be matched to the unique lighting device identifiers, and associated with that element an array that encodes the color and light intensity.

Part of the light installation is one or a plurality of microprocessors. They execute the logic of the color to current module in order to adjust the electrical configuration of the individual lighting devices as a function of the elements in the light activation arrays, after a matching has been done between the unique lighting device identifier and the matching element, or key, of the array transmitted from the computing device. The geometrical configuration of the light installation is also transmitted 603 to the computing device in order to execute the geometry module on the computing device. This is a simple embodiment from a hardware perspective, since it executes most of the modules on a single device.

In FIG. 28B a computing device 501 with a graphical user interface, such as a laptop, desktop computer, or smartphone, is connected to the Internet in a manner identical to the embodiment described in relation to FIG. 28A. However, the computing device is only used to execute the pre-processing module and the sound transformation module. The audio activations thus obtained are transmitted 604 as integer or floating point arrays to a separate computing hub 503.

The hub contains a processor and digital memory, and can receive data from the computing device 501 over a wireless connection or wired connection, where protocols such as Wi-Fi, Bluetooth™, Zigbee™, Ethernet, serial ports or PLC can be used. The hub can be a smart-home hub, which is designed to be stationary within the home, and hence always in proximity to the light installation.

The hub is connected to the light installation through a wireless or wired connection, where protocols like the ones above can be used. The hub executes the logic instructions of the geometry module and the rendering module and generates a stream of integer or floating point arrays that represents the light activations; these arrays include at least one element, the key, that can be matched to the unique lighting device identifiers, and associated with that element an array that encodes the color and light intensity. The arrays are transmitted 605 to the lighting devices.

The execution of logic in order to obtain the electrical configuration of the individual lighting devices is identical to the previous embodiment. This embodiment separates the hardware congruent to the SoC of the software, as described above. The embodiment in FIG. 28C is comprised of the identical connections and separations of software execution over hardware, except the audio data is retrieved from a microphone or transducer 504 rather than from the Internet.

The embodiments described so far all rely in part on computation done on the computing device 501. In case this is a mobile device, the functionality of audio visualization risks breaking if the mobile device is removed outside the range of at least one of the wireless or wired connections. In FIG. 28D the control hub 503 executes the sound pre-processing module, the sound transformer module, the rendering module and the geometry module.

The hub transmits over a wireless or wired connection 605 the light activations to the light installation 502 in a manner identical to embodiments described above. The audio data is obtained either from a microphone or transducer 504 or as a digital file through a connection 601 to the Internet. The hub is stationary and can lack a graphical user interface. Therefore the hub is connected 607 to another computing device 501 that contains a graphical user interface. The purpose of this connection is to enable a user-friendly configuration of the execution of the software on the hub, such as the Internet address to download the audio file from, the choice of rendering method parameters, or to communicate a manual grouping of lighting devices.

This data is stored in memory on the hub, and retrieved as a given audio is processed. The audio visualization is in this embodiment not dependent on a mobile device 501 to execute the logic commands and arithmetic described above. Only the stationary hub 503 performs any computations as the audio is played. In particular if the hub is connected 605 through wire to the light installation 502 this embodiment can transmit the audio and light activations between software modules with minimal overhead that can be part of standard wireless protocols, which causes delays and risks increasing the synchronization error above acceptable levels.

In the illustrative embodiment that includes a connection to the Internet, it is possible to execute some modules remotely to the light installation. For example, In FIG. 8(d), the sound pre-processing module and the sound transformation module can be executed on a remote computing device and only the audio activation are transmitted as integer or floating point arrays over the connection 601 to the control hub 503. In these embodiments there is an increased risk of transmission overhead that exceeds acceptable limits for the synchronization error. In these cases the audio can be batch-processed, rather than processed in real-time, and the entire set of audio activations transmitted to the hub, stored in memory, then retrieved and further processed in concurrency with the audio being played.

Non-Limiting Example Kits and Components

Figure 29:
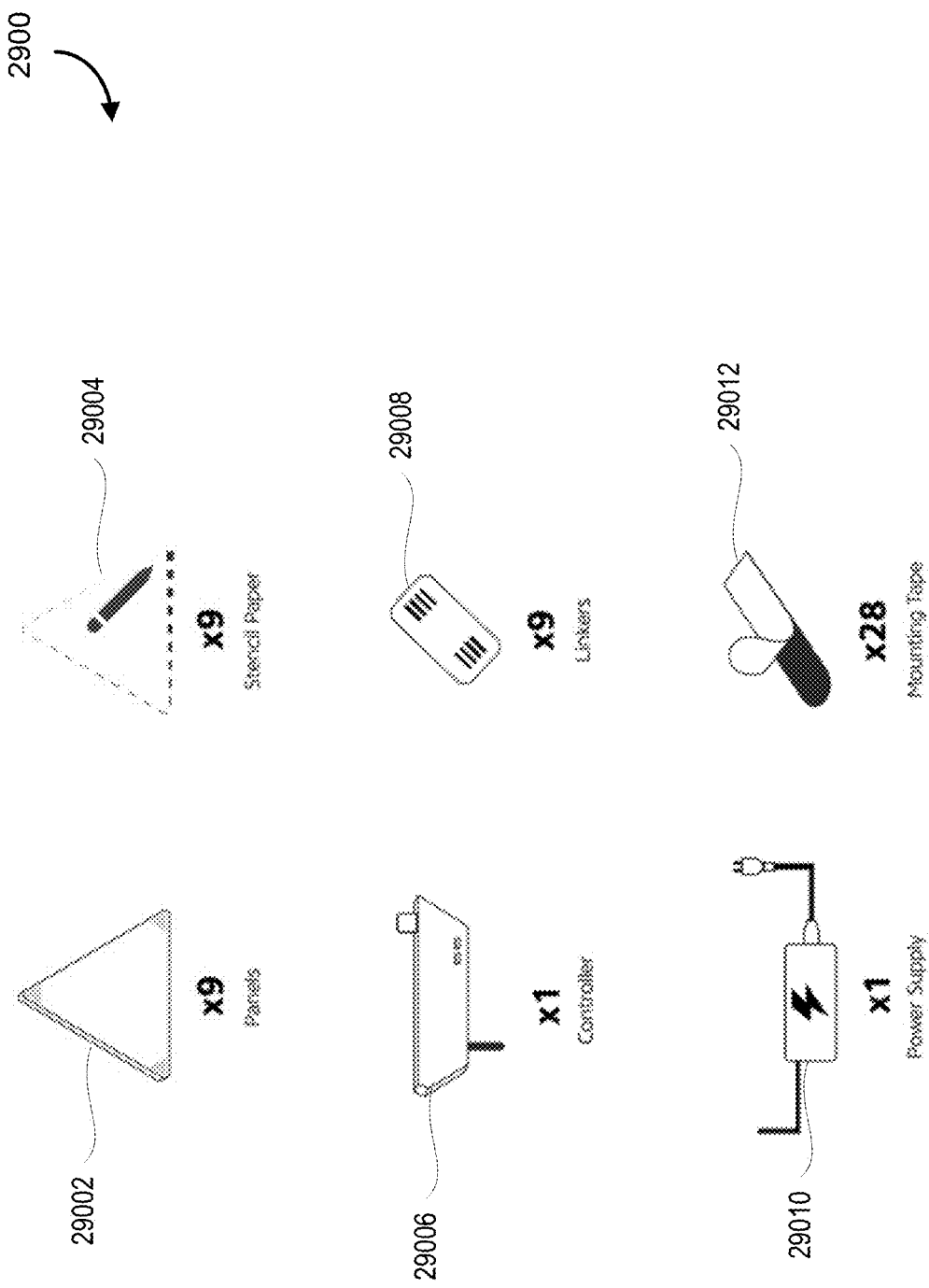
FIG. 29 illustrates example components of a kit of the system, according to some embodiments.

FIG. 29 is illustrative of the components of a potential kit 2900, having configurable lighting units (e.g., panels) 29002, stencil paper for aiding in wall placement/protection during transport 29004, a controller 29006, one or more connectors 29008 (shown as male/male linkers), a power supply 29010 (which, in some embodiments, can be part of the controller 29006), and mounting tape 29012 that can be used to remove-ably mount the lighting units on various surfaces. These components can be combined together to form a system for controlling and coordinating luminance from a plurality of configurable lighting panels.

Figure 30B:
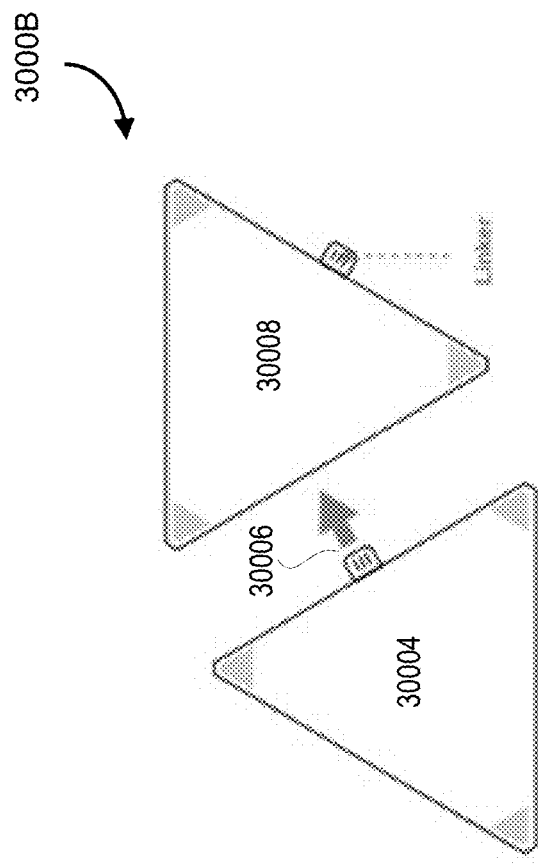
FIG. 30B illustrates two configurable lighting units being coupled together, according to some embodiments.
Figure 30A:
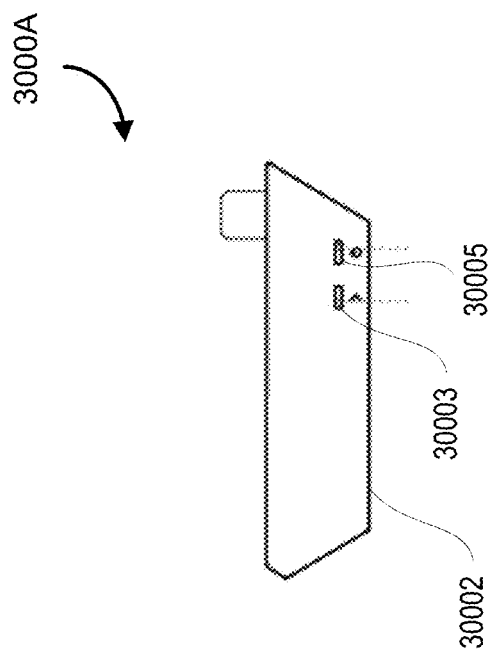
FIG. 30A illustrates an example controller, according to some embodiments.

FIG. 30 is a top plan view 3000A of an example connector 30002. The connector 30002 may have one or more interactable elements (e.g., buttons 30003 and 30005). Buttons 30003 and 30005 can be used, for example, to control power delivery (e.g., on and off), transitions between lighting effects, etc. In some embodiments, the layout detection is advantageously utilized to cause smoother transition between lighting effects. Various visualizations that can be cycled through, for example, may reside on non-transitory computer readable memory present on the controller (or in attached cloud storage, "hub", HomeKit™ settings, etc.).

Figure 31:
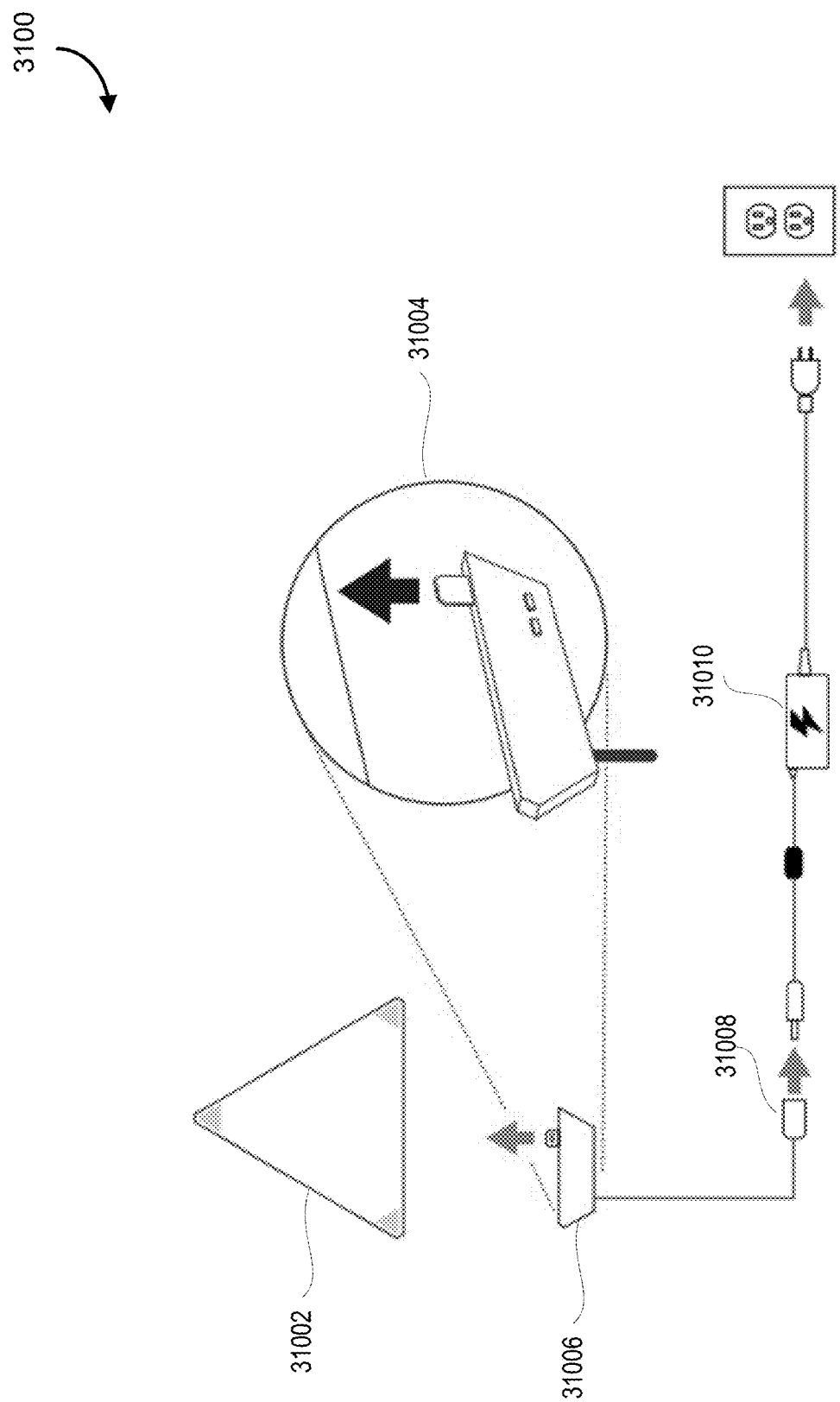
FIG. 31 illustrates an example setup of a configurable lighting panel with the controller, according to some embodiments.

FIG. 31 is a graphical rendering 3100 illustrative of steps in connecting the controller 31006 to a configurable lighting unit 31002. A close-up is shown at 31004, and this direct connection allows configurable lighting unit 31002 to propagate electricity (and/or data) to other lighting units such that a single power connection from 31008, 31010, is able to power an entire assembly.

Figure 32:
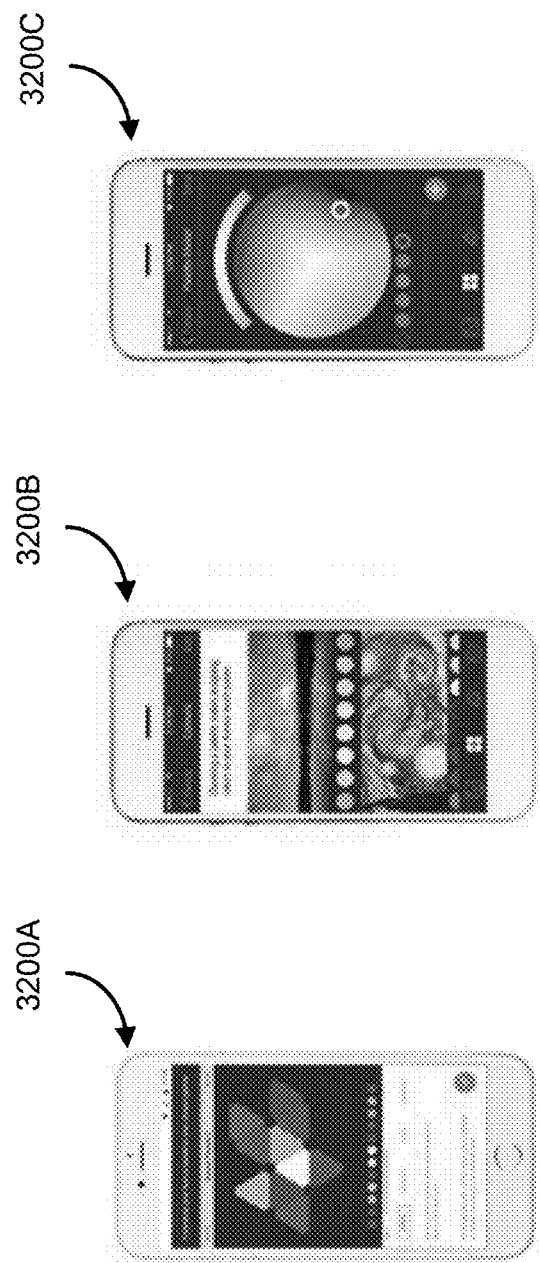
FIG. 32A, FIG. 32B, FIG. 32C are example screenshots of interfaces using a mobile device, according to some embodiments.

FIGS. 32A, 32B, and 32C are example screenshot renderings 3200A, 3200B, and 3200C of different interfaces that can be provided. Each of these different interfaces can be utilized to control various features of the system and the lighting. For example, 3200A shows control of individual panels, 3200B shows control based on a particular theme (e.g., Starry Night), and 3200C shows a custom color mixer panel.

Figure 33:
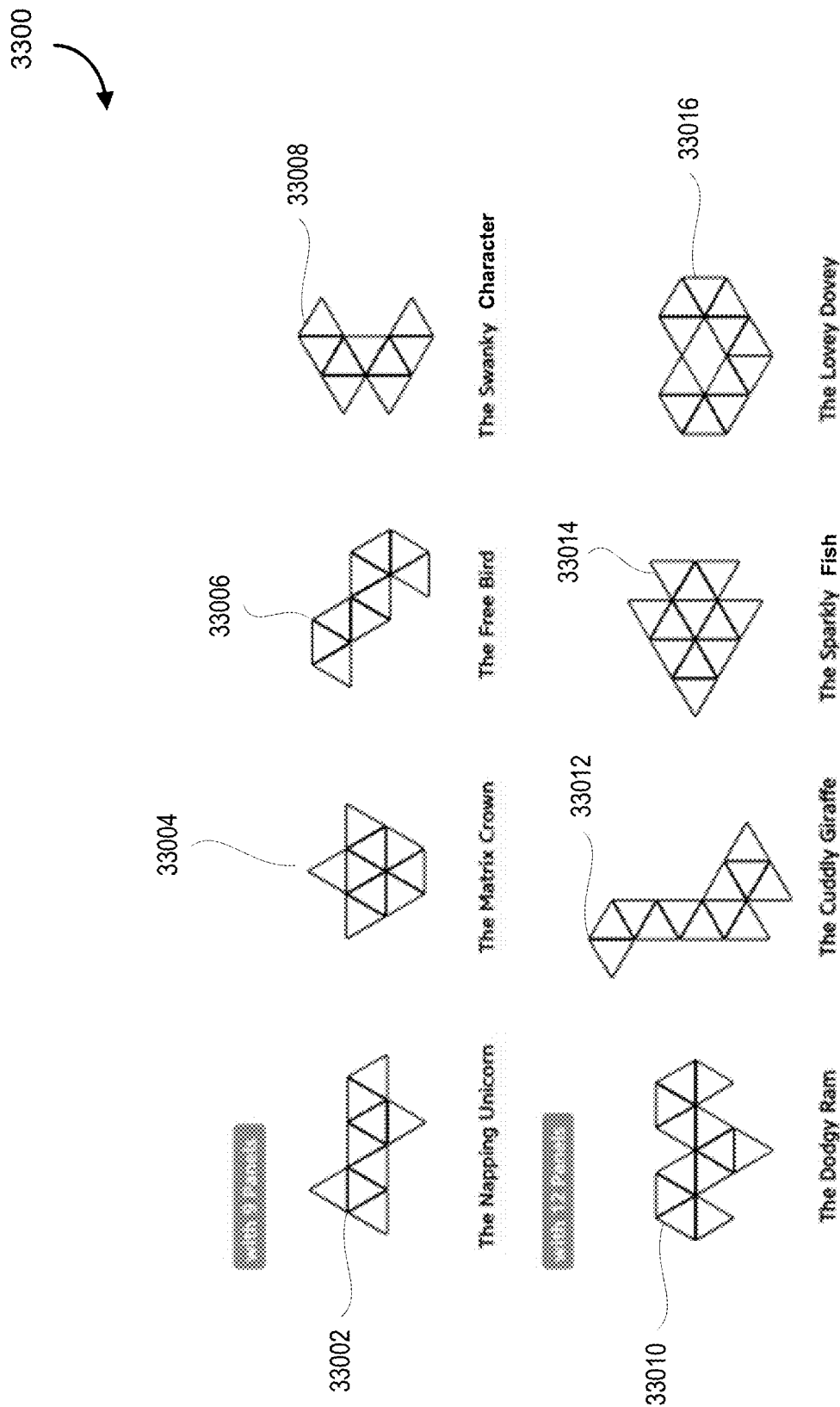
FIG. 33 and FIG. 34 show example continuous/contiguous shapes possible by arranging and/or rearranging the configurable lighting units, according to some embodiments.
Figure 34:
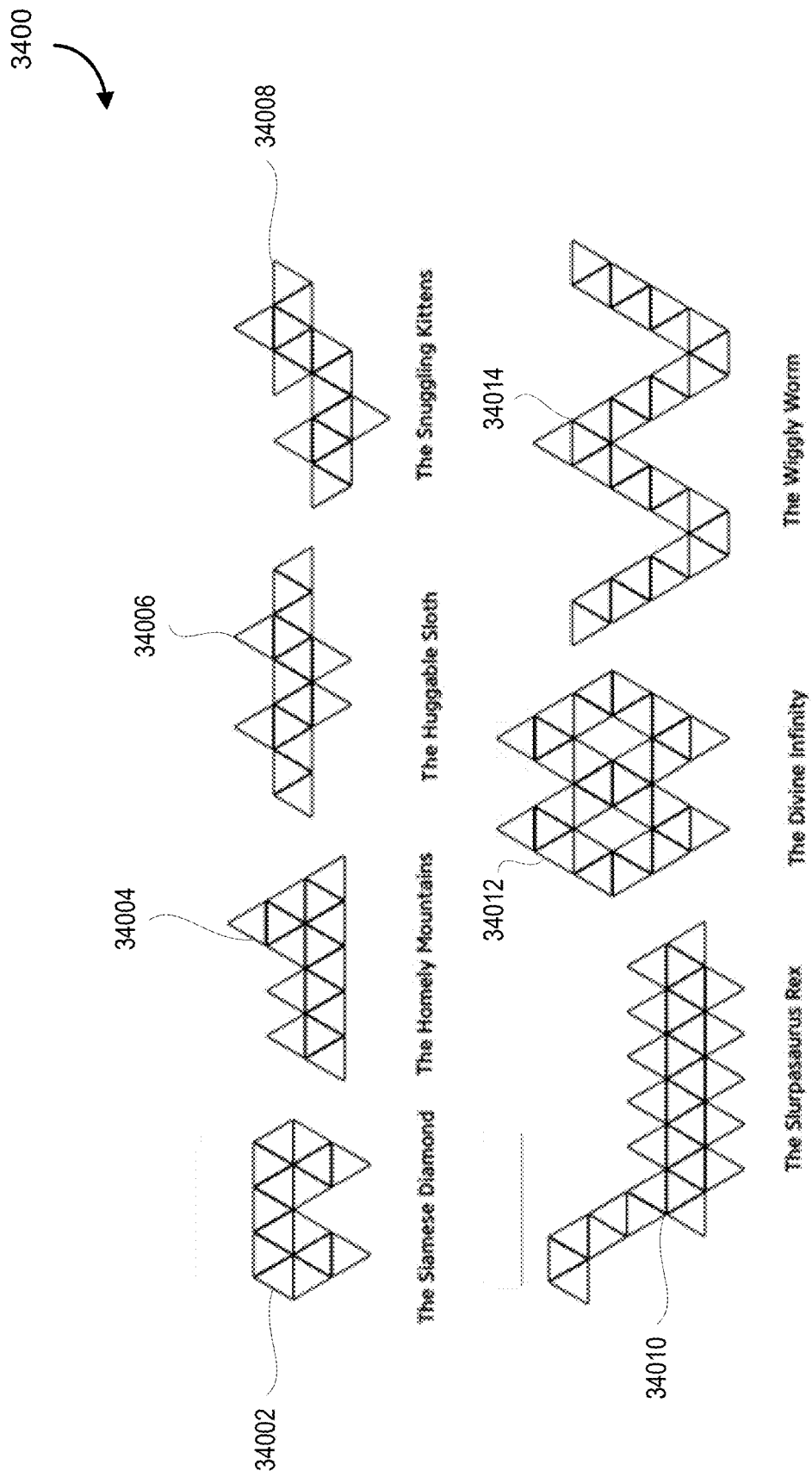

FIG. 33 and FIG. 34 are renderings 3300 and 3400 showing example continuous shapes 33002, 33004, 33006, 33008, 33010, 33012, 33014, 33016, 34002, 34004, 34006, 34008, 34010, 34012, 34014. These shapes are all possible using various configurations of the configurable lighting units. Embodiments described herein relate to systems and methods for layout detection performed by a controller coupled to an assembly of configurable lighting units. The layout may refer to a continuous shape of the configurable lighting units in that the configurable lighting units have a particular layout to define the continuous shape. The configurable lighting units are re-configurable to generate different continuous shapes and layouts.

If a user is no longer satisfied with a particular continuous shape, the user can simply rearrange the units and reconnect the units accordingly to create a new continuous shape (having a different layout). Not all of the units need to be directly connected as the units are able to transfer power and/or data to indirectly connected units. This allows for flexibility in power cord placement (e.g., to minimize the effects of unsightly cords). In some embodiments, units can be put on or removed without switching off power flow, as the layout detection automatically updates and maintains a data structure representative of the current shape, orientation, and layout of units. This information may be transferred to the controller, for example, such that the controller is able to more accurately determine the power consumption needs of an assembly.

Embodiments described herein derive an array of integers based on data indicative of coupling characteristics between individual configurable units of the assembly arranged in a particular continuous shape through a set of one or more physical connections. Two potential assemblies that are geometrically distinct apart from translation or rigid-body rotation generate distinct arrays of integers. Two potential assemblies that are geometrically indistinct following translation or rigid-body rotation can generate identical arrays of integers.

storing the array of integers in a data structure encapsulated in non-transitory computer readable media residing on or in communication with the controller.

The embodiments of the devices, systems and methods described herein may be implemented in a combination of both hardware and software. These embodiments may be implemented on programmable computers, each computer including at least one processor, a data storage system (including volatile memory or non-volatile memory or other data storage elements or a combination thereof), and at least one communication interface.

Program code is applied to input data to perform the functions described herein and to generate output information. The output information is applied to one or more output devices. In some embodiments, the communication interface may be a network communication interface. In embodiments in which elements may be combined, the communication interface may be a software communication interface, such as those for inter-process communication. In still other embodiments, there may be a combination of communication interfaces implemented as hardware, software, and combination thereof.

The term "connected" or "coupled to" may include both direct coupling (in which two elements that are coupled to each other contact each other) and indirect coupling (in which at least one additional element is located between the two elements). In the context of the configurable lighting units, the coupling may, in some embodiments, include magnetic, mechanical connections whereby two (or more) adjacent configurable lighting units are otherwise connected to one another.

The technical solution of embodiments may be in the form of a software product. The software product may be stored in a non-volatile or non-transitory storage medium, which can be a compact disk read-only memory (CD-ROM), a USB flash disk, or a removable hard disk. The software product includes a number of instructions that enable a computer device (personal computer, server, or network device) to execute the methods provided by the embodiments. The software product may be executed by a processor of a controller, in some embodiments.

The embodiments described herein are implemented by physical electronic/computer hardware, including computing devices, servers, receivers, transmitters, processors, memory, displays, and networks. The embodiments described herein provide useful physical machines and particularly configured computer hardware arrangements. Controllable lighting is provided that can be reconfigured and rearranged, and embodiments described provide for methods of layout detection, control, power/data sharing, among others.

Specific data structures are provided to aid in the computation of rendering and storage of layouts. These data structures can be maintained over a period of time and/or periodically updated (e.g., by polling) or updated in response to stimuli (e.g., the receipt of an interrupt signal).

Although the embodiments have been described in detail, it should be understood that various changes, substitutions and alterations can be made herein.

Moreover, the scope of the present application is not intended to be limited to the particular embodiments of the process, machine, manufacture, composition of matter, means, methods and steps described in the specification. As one of ordinary skill in the art will readily appreciate from the disclosure, processes, machines, manufacture, compositions of matter, means, methods, or steps, presently existing or later to be developed, that perform substantially the same function or achieve substantially the same result as the corresponding embodiments described herein may be utilized. As can be understood, the examples described above and illustrated are intended to be exemplary only.

What is claimed is:

1. A lighting system comprising:
   an assembly formed by a plurality of configurable lighting units remove-ably coupled together using one or more connectors to form one or more continuous shapes that are reconfigurable through re-arrangement of the plurality of configurable lighting units;
   each configurable lighting unit of the plurality of configurable lighting units having one or more connectable subsections including at least an aperture for receiving a corresponding connector of the one or more connectors;
   each connector of the one or more connectors insertable into a first aperture of a first configurable lighting unit and a second aperture of a second configurable lighting unit, the connector including:
   one or more mechanical connections that cooperate with structural characteristics of the first aperture or the second aperture to couple the first configurable lighting unit and the second configurable lighting unit; and
   one or more electrical connections enabling a flow of electricity between the first configurable lighting unit and the second configurable lighting unit; and
   a power source connectable to a configurable lighting unit of the assembly, the plurality of configurable lighting units electrically coupled together through the one or more connectors such that the power source is only required to be connected to the configurable lighting unit to provide power to the plurality of configurable lighting units of the assembly;
   wherein at least one connector of the one or more connectors includes circuitry for enabling data transmission between two or more configurable lighting units;
   wherein the one or more mechanical connections are formed by frictional engagement of the connector with either the first aperture or the second aperture, the structural characteristics resisting shearing movement of the connector and permitting movement along an insertion axis that is perpendicular to the shearing movement; and
   wherein both the first aperture and the second aperture include one or more protrusions adapted to impart a force between the connector and the first aperture and the second aperture, improving the frictional engagement to resist removal of connector from either the first aperture or the second aperture along the insertion axis.

2. The lighting system of claim 1, wherein the one or more mechanical connections are configured to resist shear forces with a plane of the connectable subsections up to a threshold of irreversible damage of either the mechanical connection or the corresponding connectable subsection.

3. The lighting system of claim 1, wherein the one or more mechanical connections are each configured to, responsive to a separating force perpendicular to the plane of the connectable subsections greater than a resistive force formed by cooperation of the one or more mechanical connections with the structural characteristics of the first aperture or the second aperture, permit reversible separation of the two or more connected configurable lighting units by a user.

4. The lighting system of claim 1, wherein the data transmission includes a signal that instructs one or more of the configurable lighting units in the assembly to change one or more drive currents to one or more light-emitting diodes of the plurality of configurable lighting units.

5. The lighting system of claim 1, wherein the data transmission includes a signal that encodes audio retrieved by a transducer.

6. The lighting system of claim 1, wherein the one or more mechanical connections are formed by magnetic attraction between one or more magnets that are configured to move between discrete compartments within each configurable lighting unit, and the one or more magnets exerting magnetic force through each configurable lighting unit being formed of a material of magnetic permeability nearly identical to air such that an attractive force is formed between two or more configurable lighting units in near proximity to each other.

7. The lighting system of claim 1, wherein each configurable lighting unit is a substantially flat surface of a transparent or semitransparent material shaped as a polygon; and wherein each side of the polygon are flat subsections that form the one or more connectable subsections.

8. The lighting system of any claim 7, wherein light is injected into the substantially flat surface by a plurality of light-emitting diodes;
   wherein the light is diffused throughout the material of the flat surface by scattering; and
   wherein a subset of the scattering events causes the light to exit the substantially flat surface into an environment.

9. A lighting system comprising:
   an assembly formed by a plurality of configurable lighting units remove-ably coupled together using one or more connectors to form one or more continuous shapes that are reconfigurable through re-arrangement of the plurality of configurable lighting units;
   each configurable lighting unit of the plurality of configurable lighting units having one or more connectable subsections including at least an aperture for receiving a corresponding connector of the one or more connectors;
   each connector of the one or more connectors insertable into a first aperture of a first configurable lighting unit and a second aperture of a second configurable lighting unit, the connector including:
   one or more mechanical connections that cooperate with structural characteristics of the first aperture or the second aperture to couple the first configurable lighting unit and the second configurable lighting unit; and one or more electrical connections enabling a flow of electricity between the first configurable lighting unit and the second configurable lighting unit; and a power source connectable to a configurable lighting unit of the assembly, the plurality of configurable lighting units electrically coupled together through the one or more connectors such that the power source is only required to be connected to the configurable lighting unit to provide power to the plurality of configurable lighting units of the assembly;

wherein each connector is configured to further include circuitry to sequentially propagate electricity flow and control signals between sets of coupled configurable lighting units; and wherein the sequential propagation of the electricity flow and the control signals is utilized to transmit control signals to and from a controller, the controller being directly coupled to only one of the configurable lighting units.

10. The lighting system of claim 9, wherein the sequential propagation of the electricity flow transmits electricity from the power source, housed within the controller.

11. The lighting system of claim 10, wherein the controller further comprises a visualization unit configured for generating control signals including lighting characteristic instructions for rendering one or more visualization effects across the assembly, the one or more visualization effects based at least on a detected layout of the assembly, and the control signals, upon propagation to the each configurable lighting unit, causing each configurable lighting unit to modify one or more characteristics of illumination provided by the corresponding configurable lighting unit.

12. The lighting system of claim 11, wherein the controller includes one or more interactive physical elements which, upon actuation, initiate or modify the rendering of the one or more visualization effects.

13. The lighting system of claim 12, wherein the controller includes a networking interface, the networking interface coupled to one or more remote computing systems; and wherein upon receiving one or more electronic instructions from the networking interface, the controller initiates or modifies the rendering of the one or more visualization effects.

14. A connector for physically coupling two or more configurable lighting units, each of the two or more configurable lighting units having a corresponding aperture for receiving the connector, the connector comprising:
one or more mechanical connections for insertion into the corresponding aperture to provide stable physical coupling between the two or more configurable lighting units for a threshold damage or force level before separation;
one or more electrical connections enabling a flow of electricity from a first configurable lighting unit to other configurable lighting units of the two or more configurable lighting units, The first configurable lighting unit directly or indirectly receiving power from a power source; and
wherein each configurable lighting unit of an assembly of configurable lighting units is electrically coupled such that no more than one configurable lighting unit is required to be connected to the power source when powering the two or more configurable lighting units;
wherein the connector includes circuitry for enabling data transmission between the two or more configurable lighting units; and
wherein the data transmission is a digital signal modulation, transmitted as a power line communication adapted to operate in cooperation with one or more electrical connections between the coupled two or more configurable lighting units.

15. A connector for physically coupling two or more configurable lighting units each, of the two or more configurable lighting units having a corresponding aperture for receiving the connector, the connector comprising:
one or more mechanical connectors for insertion into the corresponding aperture to provide stable physical coupling between the two or more configurable lighting units for a threshold damage or force level before separation;
one or more electrical connections enabling a flow of electricity from a first configurable lighting unit to other configurable lighting units of the two or more configurable lighting units, the first configurable lighting unit directly or indirectly receiving power from a power source;
wherein each configurable lighting unit of an assembly of configurable lighting units is electrically coupled such that no more than one configurable lighting unit is required to be connected to the power source when powering the two or more configurable lighting units;
wherein the connector includes circuitry for enabling data transmission between the two or more configurable lighting units; and
wherein the data transmission is a digital signal modulation transmitted over a bidirectional serial pin of the connector, the bidirectional serial pin being physically distinct to the one or more electrical connections.

16. A connector for physically coupling two or more configurable lighting units, each of the two or more configurable lighting units having a corresponding aperture for receiving the connector, the connector comprising:
one or more mechanical connections for insertion into the corresponding aperture to provide stable physical coupling between the two or more configurable lighting units for a threshold damage or force level before separation;
one or more electrical connections enabling a flow of electricity from a first configurable lighting unit to other configurable lighting units of the two or more configurable lighting units, the first configurable lighting unit directly or indirectly receiving power from a power source;
wherein each configurable lighting unit of an assembly of configurable lighting units is electrically coupled such that no more than one configurable lighting unit is required to be connected to the power source when powering the two or more configurable lighting units;
wherein the connector includes circuitry for enabling data transmission between the two or more configurable lighting units; and
wherein the data transmission includes a signal that indicates one or more unique identifiers, each unique identifier identifying the connectable subsections of the two or more configurable lighting units at which the coupled two or more configurable lighting units are connected.

17. A connector for physically coupling two or more configurable lighting units, each of the two or more configurable lighting units having a corresponding aperture for receiving the connector, the connector comprising:
one or more mechanical connections for insertion into the corresponding aperture to provide stable physical coupling between the two or more configurable lighting units for a threshold damage or force level before separation;

one or more electrical connections enabling a flow of electricity from a first configurable lighting unit to other configurable lighting units of the two or more configurable lighting units, the first configurable lighting unit directly or indirectly receiving power from a power source;

wherein each configurable lighting unit of an assembly of configurable lighting units is electrically coupled such that no more than one configurable lighting unit is required to be connected to the power source when powering the two or more configurable lighting units;

wherein the connector includes circuitry for enabling data transmission between the two or more configurable lighting units; and wherein the data transmission includes a signal that instructs one or more of the configurable lighting units in the assembly to change one or more drive currents to one or more light-emitting diodes of the coupled two or more configurable lighting units.

18. A connector for physically coupling two or more configurable lighting units, each of the two or more configurable lighting units having a corresponding aperture for receiving the connector, the connector comprising:

one or more mechanical connections for insertion into the corresponding aperture to provide stable physical coupling between the two or more configurable lighting units for a threshold damage or force level before separation;

one or more electrical connections enabling a flow of electricity from a first configurable lighting unit to other configurable lighting units of the two or more configurable lighting units, the first configurable lighting unit directly or indirectly receiving power from a power source;

wherein each configurable lighting unit of an assembly of configurable lighting units is electrically coupled such that no more than one configurable lighting unit is required to be connected to the power source when powering the two or more configurable lighting units;

wherein the connector includes circuitry for enabling data transmission between the two or more configurable lighting units; and wherein the data transmission includes a signal that encodes audio retrieved by a transducer.

19. A connector for physically coupling two or more configurable lighting units, each of the two or more configurable lighting units having a corresponding aperture for receiving the connector, the connector comprising:

one or more mechanical connections for insertion into the corresponding aperture to provide stable physical coupling between the two or more configurable lighting units for a threshold damage or force level before separation;

one or more electrical connections enabling a flow of electricity from a first configurable lighting unit to other configurable lighting units of the two or more configurable lighting units, the first configurable lighting unit directly or indirectly receiving power from a power source;

wherein each configurable lighting unit of an assembly of configurable lighting units is electrically coupled such that no more than one configurable lighting unit is required to be connected to the power source when powering the two or more configurable lighting units;

wherein the connector includes circuitry for enabling data transmission between the two or more configurable lighting units; and wherein the data transmission includes a signal that encodes for motion detection by perturbation to an expected radiation pattern.

* * * * *

UNITED STATES PATENT AND TRADEMARK OFFICE
CERTIFICATE OF CORRECTION

PATENT NO. : 10,531,542 B2
APPLICATION NO. : 16/095637
DATED : January 7, 2020
INVENTOR(S) : Tomas Rodinger et al.

It is certified that error appears in the above-identified patent and that said Letters Patent is hereby corrected as shown below:

In the Specification

At Column 17, Line number 48, delete "nave approach" and replace with --naïve approach--.
At Column 45, Line number 41, delete "nave about layout" and replace with --naïve about layout--.
At Column 45, Line number 45, delete "nave" and replace with --naïve--.
At Column 56, Line number 47, insert --Wi-Fi,-- after "Bluetooth,".
At Column 65, Line number 67, delete "W-Fi" and replace with --Wi-Fi--.

In the Claims

At Column 87, Claim number 11, Line number 24, delete "The lighting system of claim 10," and replace with --The lighting system of claim 9,--.
At Column 87, Claim number 13, Line number 38, delete "The lighting system of claim 12," and replace with --The lighting system of claim 11,--.
At Column 88, Claim number 15, Line number 7, delete "lighting units each, of the two or more" and replace with --lighting units, each of the two or more--.

Signed and Sealed this
Twenty-first Day of September, 2021

Drew Hirshfeld
*Performing the Functions and Duties of the*
*Under Secretary of Commerce for Intellectual Property and*
*Director of the United States Patent and Trademark Office*